US006417280B2

(12) United States Patent
Effenberger et al.

(10) Patent No.: US 6,417,280 B2
(45) Date of Patent: Jul. 9, 2002

(54) FLUOROPOLYMERIC COMPOSITION

(75) Inventors: John A. Effenberger, Bedford; Christopher M. Comeaux, Merrimack; Lawrence D. David, Dover; Timothy P. Pollock, Manchester, all of NH (US); Katherine M. Sahlin, Somerville; Laura A. Socha, Westford, both of MA (US); Richard L. Stone, Manchester, NH (US); John W. Verbicky, York Beach, ME (US)

(73) Assignee: Chemfab Corporation, Merrimack, NH (US)

( * ) Notice: Subject to any disclaimer, the term of this patent is extended or adjusted under 35 U.S.C. 154(b) by 0 days.

(21) Appl. No.: 09/828,403

(22) Filed: Apr. 6, 2001

Related U.S. Application Data

(62) Division of application No. 09/096,700, filed on Jun. 12, 1998, now Pat. No. 6,239,223.
(60) Provisional application No. 60/058,054, filed on Sep. 5, 1997.

(51) Int. Cl.$^7$ .......................... C08L 27/12; C08L 35/00; C08L 39/04; C08F 14/18; C08F 114/18
(52) U.S. Cl. .................. 525/199; 523/206; 523/223; 524/401; 524/439; 524/520; 524/544; 524/545; 525/200; 525/205; 525/206; 525/326.2; 525/326.3
(58) Field of Search .............................. 525/199, 200, 525/205, 206, 326.2, 326.3; 523/206, 223; 524/401, 439, 520, 544, 545

(56) References Cited

U.S. PATENT DOCUMENTS

| | | |
|---|---|---|
| 3,019,206 A | 1/1962 | Robb |
| 3,723,577 A | 3/1973 | Stivers |
| 3,859,259 A | 1/1975 | Harrell et al. |
| 3,872,065 A | 3/1975 | Schmiegel |
| 3,876,616 A | 4/1975 | Tang |
| 3,876,654 A | 4/1975 | Pattison |
| 3,879,044 A | 4/1975 | Estes |
| 3,884,877 A | 5/1975 | Kolb |
| 3,886,108 A | 5/1975 | Snow, Jr. |
| 3,898,361 A | 8/1975 | Bjerk et al. |
| 3,933,732 A | 1/1976 | Schmiegel |
| 3,951,913 A | 4/1976 | Kometani et al. |
| 3,962,169 A | 6/1976 | Arruda et al. |
| 3,987,126 A | 10/1976 | Brodoway |
| 4,115,481 A | 9/1978 | Finlay et al. |
| 4,123,603 A | 10/1978 | Stewart, Jr. |
| 4,131,726 A | 12/1978 | Martin |

(List continued on next page.)

FOREIGN PATENT DOCUMENTS

| | | | |
|---|---|---|---|
| EP | 0106180 | 9/1983 | ............... C08J/5/10 |
| EP | 0159268 | 4/1985 | ............ C08L/27/12 |
| EP | 0173270 | 3/1986 | |
| EP | 0439734 | 8/1991 | |
| EP | 0526003 | 7/1992 | ............ A61L/31/00 |
| EP | 0574319 | 12/1993 | |
| EP | 0063535 | 1/1995 | |
| WO | 8804982 | 1/1988 | ............... B27J/5/00 |

OTHER PUBLICATIONS

Schroeder, H. "Fluorocarbon Elastomers" In: Rubber Technology, 3$^{rd}$ ed., M. Morton, Editor. Van Nostrand Reinhold Pub., N.Y. 1987, pp. 410–436.

*Primary Examiner*—Patrick D. Niland
(74) *Attorney, Agent, or Firm*—White & Case LLP

(57) ABSTRACT

A blended solid composition is provided containing a fibrillatable microparticulate PTFE polymer in an unfibrillated state and at least one elastomeric and/or fluoroplastic component. The composition is useful in making microfiber-reinforced solid compositions and articles produced therefrom.

14 Claims, 35 Drawing Sheets

U.S. PATENT DOCUMENTS

| | | |
|---|---|---|
| 4,132,845 A | 1/1979 | Covington, Jr. et al. |
| 4,146,532 A | 3/1979 | Kometani et al. |
| 4,177,223 A | 12/1979 | Arhart et al. |
| 4,188,352 A | 2/1980 | Suzuki et al. |
| 4,192,519 A | 3/1980 | Buggele |
| 4,196,255 A | 4/1980 | Suzuki et al. |
| 4,233,421 A | 11/1980 | Worm |
| 4,234,427 A | 11/1980 | Boehme |
| 4,251,399 A | 2/1981 | Tomoda et al. |
| 4,260,698 A | 4/1981 | Tatemoto et al. |
| 4,271,275 A | 6/1981 | MacLachlan |
| 4,287,320 A | 9/1981 | Kolb |
| 4,293,663 A | 10/1981 | Stivers |
| 4,316,836 A | 2/1982 | Aufdermarsh, Jr. |
| 4,335,030 A | 6/1982 | Concannon |
| 4,339,553 A | 7/1982 | Yoshimura et al. |
| 4,358,559 A | 11/1982 | Holcomb et al. |
| 4,394,489 A | 7/1983 | Aufdermarsh |
| 4,395,462 A | 7/1983 | Polmanteer |
| 4,413,094 A | 11/1983 | Aufdermarsh, Jr. |
| 4,423,183 A | 12/1983 | Close |
| 4,424,197 A | 1/1984 | Powell et al. |
| 4,433,847 A | 2/1984 | Weinberg |
| 4,446,270 A | 5/1984 | Guenthner et al. |
| 4,467,074 A | 8/1984 | Oka et al. |
| 4,469,846 A | 9/1984 | Khan et al. |
| 4,482,476 A | 11/1984 | Yoshimura et al. |
| 4,485,062 A | 11/1984 | Dawes et al. |
| 4,496,682 A | 1/1985 | Schmiegel |
| 4,507,439 A | 3/1985 | Stewart |
| 4,514,541 A | 4/1985 | Frances |
| 4,517,378 A | 5/1985 | Vasta |
| 4,520,170 A | 5/1985 | Kitto |
| 4,529,759 A | 7/1985 | Ojakaar |
| 4,530,881 A | 7/1985 | Santoso et al. |
| 4,530,970 A | 7/1985 | Morozumi et al. |
| 4,531,010 A | 7/1985 | Vasta |
| 4,543,394 A | 9/1985 | Finlay et al. |
| 4,547,311 A | 10/1985 | Sako et al. |
| 4,555,543 A | 11/1985 | Effenberger et al. |
| 4,560,176 A | 12/1985 | Hoff |
| 4,596,839 A | 6/1986 | Peters |
| 4,596,855 A | 6/1986 | Stewart |
| 4,600,651 A | 7/1986 | Aufdermarsh et al. |
| 4,603,175 A | 7/1986 | Kawachi et al. |
| 4,610,918 A | 9/1986 | Effenberger et al. |
| 4,613,636 A | 9/1986 | Ojakaar |
| 4,654,235 A | 3/1987 | Effenberger et al. |
| 4,673,715 A | 6/1987 | Caywood, Jr. |
| 4,694,045 A | 9/1987 | Moore |
| 4,713,418 A | 12/1987 | Logothetis et al. |
| 4,742,126 A | 5/1988 | Moggi et al. |
| 4,745,165 A | 5/1988 | Arcella et al. |
| 4,770,927 A | 9/1988 | Effenberger et al. |
| 4,786,442 A | 11/1988 | Krespan |
| 4,810,760 A | 3/1989 | Strepparola et al. |
| 4,816,339 A | 3/1989 | Tu et al. |
| 4,826,731 A | 5/1989 | Wagner et al. |
| 4,831,083 A | 5/1989 | Geri et al. |
| 4,840,994 A | 6/1989 | Moggi et al. |
| 4,857,598 A | 8/1989 | Moggi et al. |
| 4,868,234 A | 9/1989 | Tabb et al. |
| 4,882,390 A | 11/1989 | Grootaert et al. |
| 4,894,418 A | 1/1990 | Strepparola et al. |
| 4,912,166 A | 3/1990 | Stewart |
| 4,912,171 A | 3/1990 | Grootaert et al. |
| 4,925,892 A | 5/1990 | Tabb et al. |
| 4,943,473 A | 7/1990 | Sahatjian et al. |
| 4,946,936 A | 8/1990 | Moggi et al. |
| 4,948,852 A | 8/1990 | Moore |
| 4,948,853 A | 8/1990 | Logothetis |
| 4,956,419 A | 9/1990 | Kolb et al. |
| 4,957,975 A | 9/1990 | Carlson et al. |
| 4,962,136 A | 10/1990 | Peters |
| 4,972,038 A | 11/1990 | Logothetis |
| 4,973,633 A | 11/1990 | Moore |
| 4,983,680 A | 1/1991 | Ojakaar |
| 5,006,594 A | 4/1991 | Rees |
| 5,010,130 A | 4/1991 | Chapman, Jr. et al. |
| 5,023,362 A | 6/1991 | Krespan |
| 5,026,786 A | 6/1991 | Marchionni et al. |
| 5,032,655 A | 7/1991 | Moore |
| 5,035,950 A | 7/1991 | Del Rosario |
| 5,037,921 A | 8/1991 | Carlson |
| 5,041,480 A | 8/1991 | Kawachi et al. |
| 5,045,143 A | 9/1991 | Arcella et al. |
| 5,061,759 A | 10/1991 | Tommasi et al. |
| 5,071,609 A | 12/1991 | Tu et al. |
| 5,077,359 A | 12/1991 | Moore |
| 5,086,123 A | 2/1992 | Guenthner et al. |
| 5,102,965 A | 4/1992 | Carlson |
| 5,115,026 A | 5/1992 | Visca et al. |
| 5,137,771 A | 8/1992 | Lofe et al. |
| 5,173,553 A | 12/1992 | Albano et al. |
| 5,175,223 A | 12/1992 | Brinati et al. |
| 5,177,148 A | 1/1993 | Arcella et al. |
| 5,194,335 A | 3/1993 | Effenberger et al. |
| 5,202,372 A | 4/1993 | Moggi et al. |
| 5,219,964 A | 6/1993 | Albano et al. |
| 5,230,937 A | 7/1993 | Effenberger et al. |
| 5,284,920 A | 2/1994 | Carlson |
| 5,324,785 A | 6/1994 | Noda et al. |
| 5,356,986 A | 10/1994 | Stewart et al. |
| 5,371,143 A | 12/1994 | Novak et al. |
| 5,399,434 A | 3/1995 | Katz et al. |
| 5,409,998 A | 4/1995 | Chiodini et al. |
| 5,412,034 A | 5/1995 | Tabb |
| 5,418,270 A | 5/1995 | Peters |
| 5,430,103 A | 7/1995 | Ohata et al. |
| 5,447,993 A | 9/1995 | Logothetis |
| 5,451,625 A | 9/1995 | Fukushi |
| 5,459,202 A | 10/1995 | Martinez et al. |
| 5,461,107 A | 10/1995 | Amin et al. |
| 5,478,652 A | 12/1995 | Grootaert et al. |
| 5,500,042 A | 3/1996 | Grootaert et al. |
| 5,502,115 A | 3/1996 | Chiodini et al. |
| 5,527,861 A | 6/1996 | Logothetis |
| 5,548,028 A | 8/1996 | Tabb |
| 5,549,276 A | 8/1996 | Pittman et al. |
| 5,549,968 A | 8/1996 | Byers et al. |
| 5,554,680 A | 9/1996 | Ojakaar |
| 5,560,279 A | 10/1996 | Connors et al. |
| 5,578,681 A | 11/1996 | Tabb |
| 5,585,449 A | 12/1996 | Arcella et al. |

WAXS RESULTS FOR TPP5-64 (50/50 WT% PTFE/THV) SAMPLE FROM EXTRUDED ROD

UNDEREXPOSED POSITIVE TO SHOW WEAK REFLECTIONS

SLOT 3-74.5 mm FROM SAMPLE

FLUOROPOLYMERIC COMPOSITION

CROSS-REFERENCE TO RELATED APPLICATIONS

This application is a divisional of U.S. patent application Ser. No. 09/096,700, filed Jun. 12, 1998, now U.S. Pat. No. 6,239,223, which claims the benefit, under 35 U.S.C. §119 (e), of Provisional Patent Application No. 60/058,054, filed on Sep. 5, 1997.

BACKGROUND OF THE INVENTION

1. Field of the Invention

The present invention generally concerns fluoropolymeric compositions. In particular, the invention concerns an improved composition that is isolated from an aqueous blend of fluoroelastomer and microparticulate fluoroplastic materials. The improved composition is particularly useful as a manageable intermediate in the development of microfiber-reinforced fluoropolymeric components.

2. Description of the Prior Art

Polytetrafluoroethylene (PTFE) is in many respects an unusual polymer. It is exceptional in its chemical inertness as a result of the strength of its carbon-fluorine bonds and shielding of its carbon-carbon bonds by the bulky fluorine atom. PTFE is exceptionally useful for high temperature applications because it has a high melting point and remains chemically inert at high temperatures. In addition, PTFE's unusually low frictional coefficient, surface free energy, and dielectric constant all testify to its unusual morphological structure. While these extremely attractive properties cause PTFE to be useful in a broad array of end use applications, they also lead to an unusual set of problems in characterizing some properties of PTFE as well as to difficulties in processing compositions based on PTFE.

The inertness and insolubility of PTFE make it virtually impossible to characterize the molecular weight of a PTFE component by direct, conventional means such as osmometry. The prior art typically resorts to indirect means, such as the determination of specific gravity after recrystallization from a melt at a controlled rate of cooling, as an indicator of molecular weight. The higher the molecular weight of the PTFE, the longer its chain length and the more difficult it is to recrystallize to a highly ordered (crystalline) and, therefore, dense structure. Consequently, the specific gravity of PTFE at any given crystallinity level is an indirect measure of molecular weight. Crystallinity may be independently assessed by X-ray crystallography or calorimetry, and the specific gravity obtained upon cooling (recrystallizing) a PTFE melt at a prescribed rate (referred to as the standard specific gravity (SSG)) is a commonly employed measure of molecular weight.

It is well established that certain physical behavior of PTFE is a strong function of molecular weight and crystallinity (Blair, John A., *Fluorocarbons, Polymers*, "Encyclopedia of Industrial Chemical Analysis," vol. 13, pps. 73–93). For example, most commercial molding powders of PTFE have a very high molecular weight corresponding to an SSG of between about 2.16 and 2.25, depending on crystallinity. High molecular weight is needed to develop adequate tensile strength and the elongation required for typical end uses of an essentially waxy polymer.

At lower molecular weight, PTFE becomes very weak and brittle while retaining its low coefficient of friction. Low molecular weight PTFE is typically a friable powder, which can be very highly crystalline, and enjoys use as a dry lubricant.

An important distinction in behavior between low molecular weight and high molecular weight PTFE lies in the propensity of the high molecular weight PTFE to fibrillate when in its highly crystalline, as-polymerized condition upon being subjected to mechanical shear stresses. Low molecular weight PTFE, on the other hand, simply reaches its ultimate elongation at low stress and disintegrates into a lubricating (low coefficient of friction) powder while highly crystalline high molecular weight PTFE substantially transforms its morphological character under shear and forms an extensive network of fibers. This is most obvious in the case of aqueous, dispersion-polymerized, high molecular weight PTFE in which the growing polymer chains are highly organized into dense, tightly packed spheres or rods with a very high degree of crystallinity. The rod-shaped particles, when present, typically have a length to diameter ratio (L/D) of 2–3:1 and the diameter is typically on the order of 0.1 micron ($\mu$). The spherical particles typically have a diameter of approximately 0.2–0.3$\mu$, as measured by light scattering. Because of their very high crystallinity and high molecular weight, it is possible for these particles to fibrillate into rod-like structures when subjected to a relatively low mechanical shear force, forming fibers having a very high L/D ratio. These PTFE fibers have the ability to form aggregated structures in which the rod-like aggregates of high molecular weight PTFE serve as a microfiber reinforcement within the polymer mass of fibrillated and unfibrillated PTFE. The presence of such structures results in an increase in the tensile modulus and strength of the polymer matrix in which they are present and for this reason may be referred to as a microfiber reinforcement. The ease with which such fiber formation occurs is such that one must take great care to control the level and direction of applied shear forces to avoid uncontrolled entanglement of propagating fibers which can result in physical unmanageability during subsequent processing.

Melt viscosity is another commonly measured surrogate for molecular weight of polymers such as PTFE. Commonly measured at 380° C., the melt viscosity of high molecular weight PTFE is typically about $10^{10}$ to $10^{12}$ poise. High molecular weight PTFE readily forms fibers of the type discussed above when at a high level of crystallinity. As the melt viscosity at 380° C. decreases (indicating lower molecular weight), however, PTFE's ability to fibrillate falls off markedly. Below about $10^9$ poise, PTFE becomes a much more brittle, friable material.

Many attempts have been made in the prior art to combine PTFE with other polymeric compounds, such as elastomers, to form multicomponent systems. Fairly sophisticated processes have been developed to control the properties of such multicomponent systems, and skilled artisans have been able to enhance various desirable properties of final products created from such multicomponent systems. "Rubber-toughened" plastics are a good example of such an enhancement.

In creating these multicomponent systems, skilled artisans have used with some success "microparticulate polymers", i.e., emulsions and dispersions of elastomeric and plastic polymers, as coating and casting fluids. Various processes have been developed for applying such fluids, blended in the microparticulate state, enabling skilled artisans to thermally consolidate thin films in an extremely short duration of time and at surprisingly high temperatures, if necessary. Short interval thermal processing yields surprisingly compatible blends of microparticulates, even those with greatly disparate melt flows. For example, these processes have been used to combine polymers perceived to be non-extrudable due to their high viscosity or molecular weights or to combine non-melt-processible polymers, such as PTFE, with other more flowable polymeric components. Short interval thermal processing has also been used to combine materials with vastly different melting points (ranging from 150° C. to 335° C.). The absence of substantial mechanical shear during the high temperature phase of the thermal consolidation avoids mechanically-induced thermal deterioration of molecular weight in the materials, such as might occur during a melt-extrusion process.

Despite all of these efforts, the prior art has not been able to develop blended solid compositions containing fluoroplastics at particularly high useful levels into fluoroplastic/fluoroelastomer blends, while maintaining facile processibility of the blends.

Polymeric intermediates (for example, gum rubbers) must first be isolated before they can be compounded into a processible composition that can incorporate fillers, such as carbon or talc. The initial isolation of the polymeric intermediate generally involves the steps of coagulating the polymer from a polymerization medium, followed by washing the polymer, drying the polymer, and compacting the polymer into a slab. This polymeric slab is then mixed with desired curing additives and fillers on a high shear mill, such as a Banbury mill, keeping the mixture below temperatures that would initiate localized or premature cure of the rubber compound. Such premature cure is known in the art as "scorch." Other additives may be incorporated in a similar manner. Fillers are generally incorporated before the curatives because the incorporation process generates heat, which would cause scorch if the curative were present. The amount of such additives is limited because additional space in the compound is needed to accommodate the presence of the curative. Additives and curatives are added sequentially, which overall affects the workability of the gum. Once the additives and curatives are added, the compound is stored at a cool temperature until used. The compounded formulation is then typically "freshened" on a mill or calender and extruded at non-scorching conditions to yield a form that may be compression-molded, transfer-molded, or injection-molded to produce a shaped, cured part such as an "o"-ring or seal. Cured parts may then be demolded and post-cured at elevated temperatures to develop maximal mechanical properties or chemical resistance.

The prior art evidences substantial effort to identify desirable fillers and curing additives that improve end properties. PTFE has been identified as an excellent filler because of its desirable tribological properties. The prior art processes incorporating milled PTFE, however, have been limited to filler loadings below 25 parts per hundred rubber by weight to avoid problems both during milling and in subsequent processing. Furthermore, the prior art has also been constrained to employ low molecular weight PTFE micropowder, such as DuPont's MP 1000, as a filler. For this reason, users of such blends have not been able to exploit the benefits of high molecular weight PTFE related to its tendency to fibrillate under applied mechanical shear. Thus, the prior art processes have not generally been able to achieve a processible composition as a blended solid containing a high filler loading of PTFE, and particularly with high molecular weight PTFE. The potential benefits of a homogeneously distributed, high molecular weight PTFE at a high filler loading in the compositions have been, consequently, forgone.

The present invention achieves the desirable benefits discussed above through the use of an essentially non-fibrillating, low-shear isolation process that incorporates in excess of 25%, and typically 40–50%, and as high as 80% by weight of a plastic (particularly high molecular weight PTFE, a perfluoroplastic) into the rubber (based on total polymer weight). The process yields compositions containing the plastic PTFE in an unfibrillated form, yet the PTFE is fibrillatable and may be fibrillated by subsequent processing. The range of the substantial benefits obtained are described as follows.

SUMMARY OF THE INVENTION

It is a prime objective of the invention to produce a curable, solid composition containing (i) an elastomer, preferably a fluoroelastomer, and (ii) a fluoroplastic at greater than 25% by weight based on total polymer, wherein the fluoroplastic is in an unfibrillated yet fibrillatable state. Fluoroplastics useful in the invention include: perfluoroplastic(s), such as PTFE or copolymers of tetrafluoroethylene (TFE) with hexafluoropropylene (HFP); perfluorovinyl ethers; or, other halogenated ethylenic monomers, such as vinylidene fluoride ($VF_2$), chlorotrifluoroethylene (CTFE), or vinyl fluoride (VF). Ethylene and propylene copolymers of TFE and HFP are also envisioned as applicable plastics in this invention. The particulate fluoroplastic and elastomers have a particle size in the range of 0.00 $1\mu$ to $1.0\mu$, i.e., "micron-sized," thus their designation or definition as "microparticulate."

A further objective of this invention is to obtain curable compositions isolated directly from aqueous blends of the elastomer and plastic microparticulates. Such isolation may be as a thin film or as a powder that may be extruded well below the melting point or softening point of the plastic component and above the glass transition temperature of the elastomeric component. The curable composition may also take the form of a gel. The solid forms, which can contain curatives, may be directly molded by, for example, compression molding methods to directly produce cured elastoplastic parts such as diaphragms or "o"-rings.

It is yet a further objective of this invention to demonstrate the superior performance properties of cured compounds or parts created from compositions of the invention in regard to mechanical behavior (notably, retention of high elongation, reduced coefficient of friction, reduced wear rate), as well as very good resistance to swell in solvents or fuels. It is also an objective to demonstrate good capability for high temperature end use for such parts.

It is also an objective to show that the useful properties of parts processed from these blends may be tailored through selective choice of process temperatures to achieve selectively crosslinked or melted morphological domains specific to the melting points or cross-linking propensities of the various plastic or elastomeric components.

Lastly, it is an objective to demonstrate that such solids isolated from these aqueous blended polymers may be subsequently subjected to mechanical forces to induce fiber formation by the particulates, particularly of the high molecular weight PTFE component, to obtain microfiber-reinforced composites with unique mechanical behavior.

Importantly, the process described to achieve these excellent or superior properties employs the least costly form of the selected polymers. Polymerized emulsions and dispersions, in principle, represent a preferred lowest cost position for the resin. Particularly for materials-intensive components, such as those based on fluoropolymers, this may be a decisive advantage. The compounds and processes of the invention provide for the use of PTFE as a filler, which can be more cost-effective than conventional fillers because the PTFE can be filled to a higher loading than is normally practiced. The PTFE filler of the invention is a polymer with its own strength potential and elongation potential through fibrillation—as well as temperature and chemical resistance properties that can exceed those of a hydrogen-containing fluoroelastomer.

DETAILED DESCRIPTION OF THE INVENTION

Figure 1:
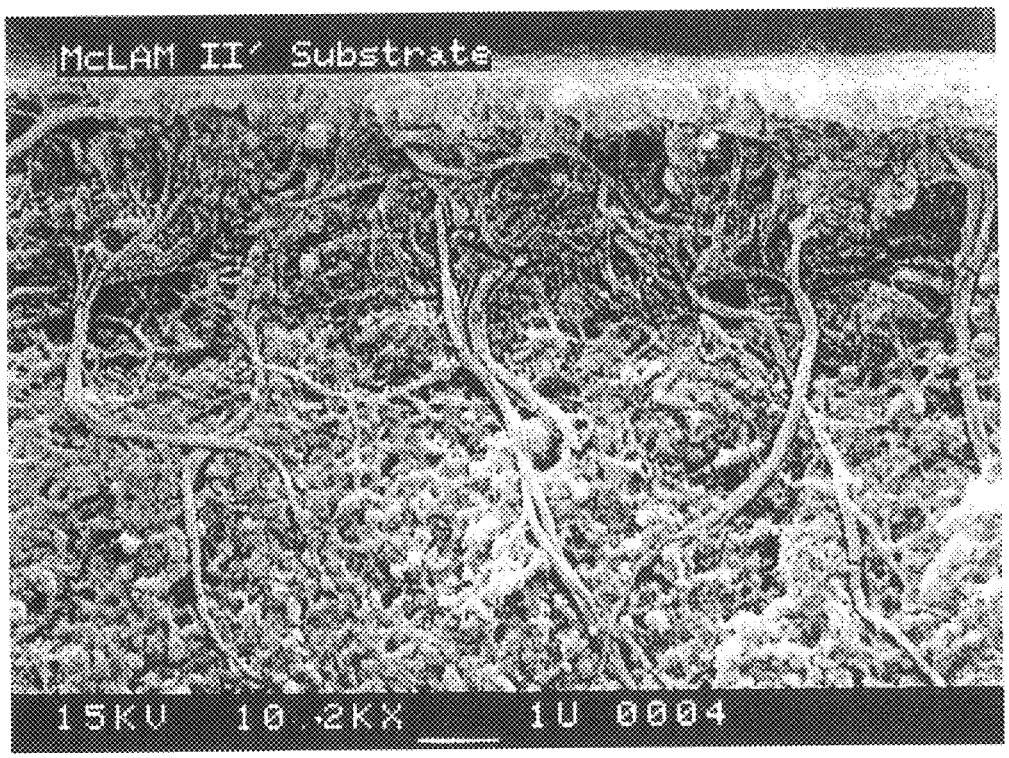
FIG. 1 shows a scanning electron micrograph illustrating fiber formation of a PTFE laminate.

The invention relates to a blended solid composition of polymeric components, comprising one or more microparticulate fluoroplastic components distributed homogeneously throughout the composition and at least one elastomeric component. At least one of the fluoroplastic components is a fibrillatable PTFE polymer in an essentially unfibrillated state. The PTFE has a high molecular weight (a melt viscosity at 380° C. of greater than $10^9$ poise, and preferably greater than $10^{11}$ poise) and has been prepared using an aqueous dispersion process. The microparticulate components of the compositions are composed of particles having a size of $1.0\mu$ or less in diameter. The elastomeric component of the composition is preferably selected from fluoroelastomers or perfluoroelastomers, which have been preferably prepared in an aqueous dispersion process. The preferred elastomers may be selected from the group consisting of polymers and copolymers of TFE, $VF_2$, HFP, fluorovinyl ethers including perfluorovinyl ethers, CTFE, ethylene, and propylene, and are preferably of high molecular weight.

The compositions may further comprise at least one elastomeric component which is uncured. In this aspect of the invention, the composition may also comprise a curative capable of curing said uncured elastomer(s). A curative is a substance which can induce any degree of crosslinking of the polymers in the compositions. Curatives are known in the art of polymer chemistry and include: amines, acid acceptors, bisphenols, quaternary onium salts, peroxides, persulfates, triallyl imidazole, triallyl isocyanurate, and photoexcitable ketones. In one aspect of the invention, the composition may be provided wherein at least one elastomeric component has undergone curing, that is, some degree of crosslinking.

The compositions may further comprise one or more additives, such as metallic, mineral, ceramic, and carbonaceous materials for modifying the physicochemical properties of the compositions.

The invention also relates to a blended solid composition of polymeric components, comprising first a microparticulate fluoroplastic component distributed homogeneously throughout the composition, and one or more additional microparticulate fluoroplastic components, each of which has a melting or softening point below the melting point of the fibrillatable PTFE. In this aspect of the invention, the fluoroplastic (including the fibrillatable PTFE polymer) is in an essentially unfibrillated state, the PTFE is highly crystalline and preferably of high molecular weight, polymerized as an aqueous dispersion, and the fluoroplastic component other than PTFE may include at least one amorphous fluoropolymer. In a preferred embodiment of this aspect of the invention, the amorphous fluoropolymer is a CTFE-containing copolymer with $VF_2$.

The invention further relates to a microfiber-reinforced solid composition produced by a process comprising subjecting a blended solid composition of the invention to a shear force that induces the PTFE component to fibrillatablete and create a microfibrous reinforcement within the blended composition. In this aspect of the invention, the shearing process is conducted at a temperature chosen to selectively melt or soften one or more of the components of the composition other than the PTFE, and the composition is free of, or may contain curatives. Alternatively, the microfiber-reinforced composition is produced by subjecting the blended solid composition to a shearing process at a temperature below the melting point of any of the components of the composition.

The compositions may also be provided wherein the microfibrous PTFE reinforcement is aligned with and extended parallel to the direction of the applied shear force or may be oriented uniaxially or multiaxially. In this aspect of the invention, the microfiber-reinforced solid composition comprises a plurality of uniaxially-oriented microfibrous PTFE reinforcements which are layered as lamellae in varying orientations to create multiaxially-reinforced lamellae. In this embodiment, the individual lamellae may be co-cured during thermal consolidation, and the resulting microfiber PTFE-reinforced polymeric system can then serve as the polymeric matrix system for conventional textile-based reinforced composites. Compositions containing unfibrillated PTFE, however, may also serve as a matrix system for textile-based reinforced composite. The textile-based reinforcement may be a yarn, monofilament, or a system of yarns such as a woven, knitted, or nonwoven fabric, such as fiberglass, carbonaceous, graphitic, polyester, polyamide, or polyolefinic materials.

The invention also relates to a method of making the blended solid compositions composed of unfibrillated, yet fibrillatable PTFE. The method comprises isolating the blended composition of the invention from an aqueous system by a low shear process that does not induce fibrillation or fiber propagation in the PTFE. The low shear process may comprise a co-coagulation method comprising a freeze-drying method or a desiccation method. In this aspect of the invention, the composition is sheared at a temperature chosen to selectively melt or soften one or more of the components in the composition other than the PTFE, and curatives may be incorporated into the composition after isolation of the blended polymers from the aqueous dispersion. Many types of articles of manufacture may be produced by this process.

The invention also relates to a blended, homogeneous, solid composition, comprising a low molecular weight, nonfibrillatable PTFE and an elastomeric polymer, wherein the PTFE is present at greater than 35% by weight based on total polymer solids of the composition.

The invention also relates to a film made by the method of the invention, comprising an unsintered and unfibrillated, yet fibrillatable high molecular weight PTFE and an elastomeric polymer, wherein the PTFE is present at a loading level up to 80% by weight PTFE based on total polymer solids. The elastomeric polymer of the film is preferably a fluoroelastomer or a perfluoroelastomer.

Following the methodologies of U.S. Pat. Nos. 4,555,543 and 5,194,335 (coating and casting fluids based on blends of fluoroplastic and fluoroelastomeric dispersions to produce cast films, which disclosures are incorporated herein by reference), it has been surprisingly found that a cohesive film or "leaf stock" based on dispersion-blended polymer based on PTFE and TFE/$VF_2$/HFP elastomer, or other elastomer, such as $VF_2$/HFP, can be obtained at very modest temperatures. In fact, the process can be viewed as simply drying and eliminating the water at temperatures near its boiling point (100° C.) while maintaining a homogeneous mixture. This temperature is low enough that curatives may actually be incorporated into the aqueous blend so that the dried "leaf stock" may be considered to be a direct feedstock for compression molding. It has been found by scanning electron microscopy (SEM) examination that the PTFE in such a processed blend was, in fact, essentially free of fibrous PTFE.

The as-cast leaf stock, typically about 5 mils in gauge, can be easily handled to prepare a multilayer sheet of about 20–30 mils by simple compression molding, taking care to allow venting of gaseous byproducts. A cured elastomer is readily developed at a pressure of 200 psi at 350° F. after 30 minutes in a press when Diak #3 (N,N'dicinnamylidene-1,6-hexanediamine, purchased from DuPont Dow Elastomers, Elkton, Md.) is employed as a curative and zinc oxide as an acid acceptor, and when both are included in the casting fluid.

This process may also be conducted with non-fiber-forming fluoroplastics, such as FEP, and their blends with PTFE. Additionally, other non-polymeric additives such as carbon black, or other finely divided minerals and the like, may also be blended directly into the casting fluids.

Thus, the degree of uniformity and homogeneity of additives and fillers obtainable in the finished part is exceptionally great. It is believed that the exceptional properties related to coefficient of friction, wear resistance, and the retention of outstanding extensibility after high temperature exposure derives from the choice of filler (high molecular weight PTFE) and, particularly, its small particle size (less than 1 micron) and its ability to remain unfibrillated in the isolation process, and importantly, to the extremely high loading levels attainable in a molded part. While other fluoroplastics do not commonly have an equivalent tendency to form fibers but may be as readily processed by this methodology, PTFE is a preferred filler from the viewpoint of the development of resistance to chemically induced stress-cracking and the utmost in thermal capability for end use and cost.

In a preferred embodiment, the high molecular weight PTFE suitable for making the microfiber reinforcement of the present invention is a PTFE having a melt viscosity at 380° C. of greater than $10^9$ poise and preferably greater than $10^{11}$ poise. High molecular weight PTFE can be obtained from various companies and is sold under various trademark names, for example, TEFLON-T30B (E.I. Dupont de Nemours and Company, Inc., Wilmington, Del.); ALGOFLON-D6027 (Ausimont USA, Thorofore, N.J.) and FLUON AD1LN and FLUON CD123 (ICI Americas, Bayonne, N.J.).

The following examples are not intended to be limiting to the basic concept of this invention. The examples show that the blended aqueous microparticulates of the invention may be used as a feedstock for isolation through casting or other non-fibrillating coagulation techniques to a moldable solid form (e.g., agglomerated powder). The examples also show that rubber curatives may be incorporated into the blended microparticulate casting fluid, prior to isolation, and show the use of such feedstocks as molding intermediates.

EXAMPLE 1

Raw fluoroelastomer and perfluoroelastomer latexes used in the following examples are detailed in Table 1. One particularly novel aspect of this approach to blending materials is that the components are mixed at a microparticulate level, as contrasted with the aggregate mixing accomplished with conventional rubber mills and mixers. Average particle size for these aqueous latexes varies from $0.01\mu$ to almost $1.0\mu$ it as seen in Table 1. The particle size for PTFE as well as other fluoroplastic latexes used in these experiments averaged around $0.2\mu$. Particle size was determined in the aqueous state using a Leeds & Northrup Microtrac Ultrafine Particle Size Analyzer, which operates via dynamic light scattering. Measurements were made on the material directly or on a dilution which did not exceed 3 parts water to 1 part latex.

Fluorine content was disclosed to us by the manufacturer. Those skilled in the art of fluoroelastomer formulation realize the improvement in chemical resistance provided by increasing fluorine content as well as changes in physical properties which also result. Applications currently served by fluoroelastomers can be envisioned using materials prepared as detailed here, as well as applications not currently served due to limitations in conventional rubber formulation, or applications which can be served well through a microparticulate-reinforced matrix. Therefore, a range of materials was evaluated in order to make comparisons to the range which is commercially available.

Solids content was disclosed by the manufacturer in the case of Tecnoflon TN1 latex. In all other cases the solids content was determined by differential weight loss after drying off water at 110° C. to a constant weight. A hand-held digital meter was used to determine pH. Standard hydrometers were used to determine specific gravity. Viscosity was measured with a Brookfield Model LV viscometer with the indicated spindle at the indicated speed.

Glass transition temperatures were determined using a Perkin Elmer DSC7 differential scanning calorimeter at a rate of 20° C. per minute. The glass transition temperature, like fluorine content, will have some bearing on potential applications of these materials.

Creaming of a latex to higher solids was performed in order to generate a latex with the convenient potential for higher build during casting (as described in Example 4). Latex at lower solids (as polymerized) can also be used for casting and has been used in examples of other isolation procedures, such as co-coagulation. Creaming was generally accomplished by addition of Rhodofac RE-610 surfactant (Rhone-Poulenc, Cranbury, N.J.) at 4% by weight of polymer solids, then addition of aqueous NaOH to a pH of 6.4–6.5. Aqueous ammonium alginate was then added with thorough mixing in the range of 0.5% to 1.0% by weight of polymer solids, then the mixture was allowed to settle at room temperature for 3–7 days until the creamed latex attained a stable separation. Separated supernatant water was then siphoned from the top and the creamed latex was used in various blends as described in the following examples.

TABLE 1

Fluoro and Perfluoroelastomer latex materials

| Elastomer | Dyneon L10180 | Tecnoflon TN-1 latex | Dyneon E14674 | Dyneon E14674-2 | Dyneon E14673 | Dyneon E14734 | Dyneon E6582 | Dyneon E14897 | Ausimont PFR94 | DuPont VTX-5307 |
|---|---|---|---|---|---|---|---|---|---|---|
| Description | terpolymer | terpolymer | terpolymer | terpolymer | terpolymer | TFE/P | HFP/VF2 | Dynamine TFE/PVF2 | FFKM | terpolymer |
| % Fluorine | 68 | 68 | 68 | 68 | 70.2 | 54 | 65.9 | 57 | ? | NK |
| pH | 6.8 | 5.1 | 6.6 | 4.3 | 4.7 | 3.8 | 5.2 | 3.8 | 6.5 | 5.5–6.5 |
| % solids as received | 20.5 | 66.5 | 20.2 | 28.3 | 26.4 | 24.5 | 31.6 | 23.7 | about 28% | 60–65% |
| viscosity (cp) - spindle 1, 60 rpm | 3.4 | 48.8 | 3.1 | 4.3 | 3.5 | <10 | 4 | 3.4 | 4.3 | 200–400 |
| specific gravity | 1.10 | 1.42 | 1.10 | 1.15 | 1.15 | 1.09 | 1.16 | 1.106 | 1.186 | 1.41 |
| particle size ($\mu$) | 0.31 | irregular 0.34 | 0.10 | 0.10 | 0.11 | 0.06 | 0.1 | 0.05+ | about 0.01 | 0.87 |
| Tg (° C.) | −11 | −13.2 | −15.0 | −12.0 | −5.2 | 5.5 | −18 | −1 | −1 | NK |
| Creamed solids (%) | 69.9 | NA | 56.0 | 59.3 | 51.1 | 51 | 54.1 | 44.8 | NA | NA |

NA denotes not applicable
NK denotes not known
* Terpolymer of $VF_2$, HFP, and $VF_2$ (FKM)
P = propylene

EXAMPLE 2

In preparation for fluoroplastic/fluoroelastomer dispersions, two ball mill mixtures were prepared. What will be referred to as the Diak mix was prepared with 100 parts (by weight) of Diak #3 mixed with 30 parts of a 10% aqueous solution of Daxad 11 (Hampshire Chemical Corp., Deer Park, Tex.), 30 parts of a 10% aqueous solution of ammonium caseinate (obtained from Technical Industries, Inc., Peace Dale, R.I.) and 140 parts deionized water. This was charged to a ball mill with ⅜" ceramic media and was ground to a Hegman value of 2.5 to 3.0. The Diak is the elastomer curative and other components are present to effect aqueous dispersion of the curative.

EXAMPLE 3

What will be referred to as the Black mix was prepared by mixing 100 parts (by weight) Thermax Stainless Medium Thermal Carbon Black ("MT Black") (obtained from R. T. Vanderbilt Co., Inc., Norwalk, Conn.), 50 parts of a 10% aqueous solution of Marasperse N-22 (obtained from Ligno-Tech USA, Rothschild, Wis.), 5 parts of a 10% aqueous solution of sodium hydroxide, and 145 parts deionized water. This was charged to a ball mill with 3/8" ceramic media and was ground to a Hegman value of 2.5 to 3.0. MT Black is an elastomer filler and other components are dispersants for the filler.

EXAMPLE 4

The first fluoroplastic/fluoroelastomer dispersion was prepared starting with L-10180 (see Example 1), which was concentrated to 69.9% solids. With gentle stirring, a 25% aqueous solution of surfactant Triton X-100 (Union Carbide, Danbury, Conn., 2 parts dry weight on rubber) and a zinc oxide paste (60% solids, obtained from Technical Industries, Inc., Peace Dale, R.I., 10 parts dry weight on rubber were mixed with the concentrated elastomer, along with the Diak mix (Example 2, 5 parts dry weight on rubber and high molecular weight PTFE (T30B, 60% by weight polymer solids, from E. I. DuPont de Nemours and Company, Inc., Wilmington, Del., 67 parts by dry weight on rubber). The mixture was vacuum-deaerated for one hour at a rating of 20 inches of mercury. The resulting mixture had a specific gravity of 1.46 and a viscosity of 85 centipoise measured at 72° F., using a Brookfield Model LV viscometer with the number 2 spindle at 60 rpm.

The composition was vertically cast on a polyester carrier film (5 mils, ICI Films, Wilmington, Del.) by dipping the carrier in the fluid at a rate of 2 feet per minute and drying at 195° to 210° F. for a total of 8 minutes per pass in accordance with the method described in coassigned U.S. Pat. No. 4,883,716, which disclosure is incorporated herein by reference. The coating thickness on each face of the carrier was 1 mil per pass. The coated carrier was interleaved with butcher paper in the take-up roll to accommodate the blocky nature of the dried film on the carrier. The casting was repeated for a total of five passes and a total thickness of 5 mils per face. It was necessary to remove and replace the interleaf with each pass. The film was flexible and cohesive such that it could be readily stripped from the carrier in a continuous manner.

EXAMPLES 5–8

Compositions described in Table 2 below were generated in similar fashion to that set forth in Example 4. The data for Example 4 are also shown in the table. The table describes the formulations in relative dry parts, using the convention of the elastomer portion fixed at 100 parts. The fluoroelastomer used in these examples was L10180, the plastic used was high molecular weight PTFE (T30B).

TABLE 2

Dispersion Compositions
phr - per hundred rubber (elastomer)

| Component | Example 4 | Example 5 | Example 6 | Example 7 | Example 8 |
|---|---|---|---|---|---|
| Fluoro-elastomer | 100 | 100 | 100 | 100 | 100 |
| PTFE | 67 | 100 | 0 | 67 | 0 |

TABLE 2-continued

Dispersion Compositions
phr - per hundred rubber (elastomer)

| Component | Example 4 | Example 5 | Example 6 | Example 7 | Example 8 |
|---|---|---|---|---|---|
| Diak #3 | 5 | 5 | 5 | 5 | 5 |
| MT Black | 0 | 0 | 0 | 17 | 67 |
| Zinc Oxide | 10 | 10 | 10 | 10 | 10 |
| Triton X-100 | 2 | 2 | 2 | 2 | 2 |
| Plastic/Elastomer Ratio (based on weight) | 40/60 | 50/50 | 0/100 | 40/60 | 0/100 |

In formulations where the Black mix (Example 3) was incorporated, this was added after Triton and before zinc oxide. Specific gravity of finished formulations ranged from 1.325 to 1.460. Viscosity of finished formulations ranged from 27 to 90 centipoise, as measured in Example 4. Films were cast according to the methods of Example 4 at rates ranging from 2 to 5 feet per minute with a temperature range of 195°F. to 215° F. Interleaving was required in all examples due to the blocky nature of the film. All examples were run in multiple passes to a final film thickness of 5 mil±0.5 mil. All examples stripped from the carrier maintained integrity as continuous free films.

Scanning electron microscopy (SEM) of Examples 5, 6 and 7 at a range of 500 to 10,000×magnification showed well-dispersed zinc oxide as well as dispersed particles of PTFE at a size of 0.2 microns. It should be noted that a composition as high as 100 phr PTFE (using a standard low molecular weight additive such as DuPont MP 1000) in fluoroelastomer, such as Example 5, could not be accomplished with conventional rubber mixing.

EXAMPLE 9

Compositions in Examples 4–8 were cured by laying up sufficient plies of the composition to produce a total thickness of 25–40 mils. The dimension of the article was small enough to fit in one of two Carver presses (Fred S. Carver Inc., Wabash, Ind. Model M:25 tons, dimensions 9"×9"; Model CMV50H-13-C:50 tons, dimensions 18"×18") used to cure the sheet. Curing conditions for these five examples were 30 minutes at 300° F. and 100–300 psi. Some later samples were cured for 30 minutes at 350° F. and up to 600 psi, or were cured in a shorter 15 minute cycle at 400° F. Post-curing was conducted in an oven at 400–450° F. for 24 hours.

EXAMPLE 10

In this example, tensile characteristics, including tensile properties at break, tensile set, and stress at elongation, were measured for each of Examples 4–8. Tensile properties at break are shown in Table 3, tensile set is shown in Table 4, and stress at elongation is shown in Table 5. A comparative analysis of the characteristics is set forth below.

Die C was used to cut out ultimate tensile and elongation samples (Table 3) and these pulls were also used to generate stress at elongation data which did not involve liquid immersion (Table 5). Tensile set tests used ½ inch wide rectangular samples which were at least 6 inches in length. All tensile samples in this group were cured for 30 minutes at 300° F. and 100 psi, then post-cured for 24 hours at 400° F.

Tensile properties (Table 3) of post-cured materials were measured according to ASTM D412 and were monitored after air aging at 400° F. as well as after immersion in two chemical agents, methanol and Reference Fuel C. In general air aging did not cause drastic loss in tensile properties in any of the five compositions.

The most dramatic property loss was exhibited in stress at elongation (Table 5), resulting from methanol exposure, as expected from published data of commercial fluoroelastomers exposed to methanol. Example 8 in Table 5 shows a complete loss of sample integrity which would not permit tensile testing of the samples of this composition which had been immersed in methanol. The remaining four compositions exhibited the most dramatic tensile loss after methanol exposure with the PTFE-filled compositions (4, 5, 7) retaining slightly more of their original strength than the unfilled sample (Example 6).

Tensile properties at break (Table 3) show that a heavily carbon black-filled composition (Example 8, Table 3) has a much higher tensile strength and lower elongation than the other filled compositions and more closely resembles a plastic. Example 6 in Table 3 shows unfilled fluoroelastomer to have the most elastomeric character in terms of ultimate elongation. The examples containing PTFE (4, 5, and 7), however, all have retained elastomeric elongation that is much closer to that of the unfilled fluoroelastomer than Example 8 (a combination elastomer/MT Black mixture). In fact, Examples 4 and 8 have the same loading (67 parts per hundred rubber) of their respective fillers, PTFE and carbon black, yet the first is still elastomeric and the second is quite stiff and plastic.

TABLE 3

Tensile Properties at Break

| Property | Units | Example 4 | Example 5 | Example 6 | Example 7 | Example 8 |
|---|---|---|---|---|---|---|
| Plastic/Elastomer | polymer wt. % | 40/60 | 50/50 | 0/100 | 40/60 | 0/100 |
| Plastic filler | phr | 67 | 100 | 0 | 67 | 0 |
| MT Black filler | phr | 0 | 0 | 0 | 17 | 67 |
| Ultimate Tensile Strength | psi | 1227 | 827 | 2828 | 1073 | 1970 |
| Change after 48 hrs. @ 400° F. | % of original | 105 | 103 | 112 | 97 | 86 |
| Change after 96 hrs. @ 400° F. | % of original | 91 | 86 | 100 | 72 | 100 |
| Change after 192 hrs. @ 400° F. | % of original | 104 | 79 | 95 | 77 | 87 |
| Ultimate Elongation | % | 381 | 317 | 440 | 251 | 108 |
| Change after 48 hrs. @ 400° F. | % of original | 99 | 94 | 103 | 91 | 86 |
| Change after 96 hrs. @ 400° F. | % of original | 90 | 103 | 105 | 50 | 109 |
| Change after 192 hrs. @ 400° F. | % of original | 105 | 99 | 99 | 62 | 98 |

Tensile set (Table 4) is a measure of elastic recovery. At 50% elongation, all compositions exhibit a tensile set of less than 10% and therefore good elastic recovery. At 100% elongation all filled compositions (Examples 4, 5, 7, 8) exhibit a tensile set from 14 to 16%, while the unfilled elastomer still exhibits a value less than 10%. At an elongation of 200% the heavily carbon black-filled composition (Example 8) will not survive such an elongation and breaks, while compositions filled with plastic to comparable levels and higher (Examples 4, 5, 7) retain elastomeric recovery. It is expected that an unfilled elastomer will exhibit greater recovery than a companion sample with filler, as seen in Table 4 (Example 6). Air aging did cause increases in tensile set (Table 4), indicating loss of elastomeric recovery upon air aging, again for all five compositions. Increase in tensile set upon air aging represents continued curing in these samples. This is a courtology trend based on the state of elastomer and cure. The air aging data for the tensile set of these samples do not show clear trends based on filler levels.

TABLE 4

Tensile Set

| Property | Units | Example 4 | Example 5 | Example 6 | Example 7 | Example 8 |
|---|---|---|---|---|---|---|
| Plastic/Elastomer | polymer wt. % | 40/60 | 50/50 | 0/100 | 40/60 | 0/100 |
| Plastic filler | phr | 67 | 100 | 0 | 67 | 0 |
| MT Black filler | phr | 0 | 0 | 0 | 17 | 67 |
| Tensile Set @ 50% elongation | % | 7 | 8 | 3 | 8 | 5 |
| Change after 48 hrs. @ 400° F. | % of original | 115 | 94 | 167 | ND | 107 |
| Change after 96 hrs. @ 400° F. | % of original | 99 | 87 | 162 | 172 | 153 |
| Change after 192 hrs. @ 400° F. | % of original | 110 | 125 | 187 | 95 | 141 |
| Tensile Set @ 100% elongation | % | 15 | 16 | 8 | 15 | 14 |
| Change after 48 hrs. @ 400° F. | % of original | 136 | 125 | 121 | ND | ND |

TABLE 4-continued

Tensile Set

| Property | Units | Example 4 | Example 5 | Example 6 | Example 7 | Example 8 |
|---|---|---|---|---|---|---|
| Change after 96 hrs. @ 400° F. | % of original | 109 | 103 | 126 | 116 | ND |
| Change after 192 hrs. @ 400° F. | % of original | 140 | 125 | 145 | 124 | 101 |
| Tensile Set @ 200% elongation | % | 35 | 44 | 15 | 37 | NE |
| Change after 48 hrs. @ 400° F. | % of original | 112 | 94 | 112 | ND | NE |
| Change after 96 hrs. @ 400° F. | % of original | 88 | 82 | 116 | 101 | NE |
| Change after 192 hrs. @ 400° F. | % of original | 122 | 113 | 162 | 111 | NE |

ND denotes no data available
NE denotes that the material will not elongate to that percent

TABLE 5

Stress at Elongation

| Property | Units | Example 4 | Example 5 | Example 6 | Example 7 | Example 8 |
|---|---|---|---|---|---|---|
| Plastic/Elastomer | polymer wt. % | 40/60 | 50/50 | 0/100 | 40/60 | 0/100 |
| Plastic filler | phr | 67 | 100 | 0 | 67 | 0 |
| MT Black filler | phr | 0 | 0 | 0 | 17 | 67 |
| Stress @ 50% elongation | psi | 454 | 507 | 331 | 645 | 1750 |
| Change after 48 hrs. @ 400° F. | % of original | 92 | 95 | 92 | 90 | 100 |
| Change after 96 hrs. @ 400° F. | % of original | 101 | 73 | 94 | 90 | 99 |
| Change after 192 hrs. @ 400° F. | % of original | 95 | 69 | 85 | 93 | 89 |
| Stress @ 100% elongation | psi | 472 | 499 | 451 | 705 | 1959 |
| Change after 48 hrs. @ 400° F. | % of original | 94 | 98 | 93 | 95 | ND |
| Change after 96 hrs. @ 400° F. | % of original | 102 | 73 | 95 | 95 | 98 |
| Change after 192 hrs. @ 400° F. | % of original | 96 | 71 | 96 | 97 | 84 |
| After 70 hrs MeOH @ RT | % of original | 51 | 48 | 55 | 56 | NE |
| After 70 hrs MeOH @ 50° C. | % of original | 56 | 48 | 54 | 54 | NE |
| After 70 hrs Ref Fuel C @ RT | % of original | 70 | 60 | 84 | 78 | 58 |
| After 70 hrs Ref Fuel C @ 50° C. | % of original | 60 | 54 | 64 | 56 | 43 |
| Stress @ 200% elongation | psi | 611 | 578 | 806 | 926 | NE |
| Change after 48 hrs. @ 400° F. | % of original | 99 | 105 | 97 | 103 | NE |
| Change after 96 hrs. @ 400° F. | % of original | 103 | 78 | 96 | 99 | NE |
| Change after 192 hrs. @ 400° F. | % of original | 96 | 75 | 106 | 102 | NE |

ND denotes no data available
NE denotes that the material will not elongate to that percent

EXAMPLE 11

In this example, the swelling effects of two chemical agents were determined according to ASTM D471 using methanol and Reference Fuel C at room temperature and at 50° C. Compositions were tested in triplicate for 70 hours using a sample size of 1"×2" by 20–35 mils thick. All swell samples were cured for 30 minutes at 300° F. and 100 psi, then post-cured for 24 hours at 400° F. Data are expressed in volume percent increase over the original dimensions. Samples air-aged at 400° F. for 48, 96, and 192 hours were also subsequently subjected to these immersion tests, as shown in Table 6. Improvements in volume swell after air aging have occurred due to completion of cure in these samples. Later samples subjected to these tests were cured at 350° F. to improve cure and test results. In general, the unfilled 100% fluoroelastomer sample (Example 6) was the most dramatically swollen in these tests, as expected. Samples filled with PTFE (Example 4, 5, and 7) swelled less than the unfilled elastomer and to a similar degree. The sample filled with carbon black only (Example 8) swelled the least. While low swelling is desirable, it is important that the composition also retain elastomeric properties, which has been discussed with reference to Example 8 in Tables 3, 4, and 5.

TABLE 6

Swelling Due to Liquid Immersion

| Property | Units | Example 4 | Example 5 | Example 6 | Example 7 | Example 8 |
|---|---|---|---|---|---|---|
| Plastic/Elastomer | polymer wt. % | 40/60 | 50/50 | 0/100 | 40/60 | 0/100 |
| Plastic filler | phr | 67 | 100 | 0 | 67 | 0 |
| MT Black filler | phr | 0 | 0 | 0 | 17 | 67 |
| Volume swell in MeOH @ Room Temperature | % | 12.95 | 11.38 | 18.12 | 12.82 | 3.14 |
| after 48 hrs. @ 400° F. | % | 10.70 | 10.27 | 15.30 | 10.88 | 8.01 |
| after 96 hrs. @ 400° F. | % | 11.23 | 9.53 | 19.93 | 11.15 | 7.48 |
| after 192 hrs. @ 400° F. | % | 10.69 | 10.08 | 20.77 | 11.35 | 7.08 |
| Volume swell in MeOH @ 50° C. | % | 12.52 | 11.63 | 16.91 | 12.76 | 12.69 |
| after 48 hrs. @ 400° F. | % | 11.45 | 10.45 | 16.73 | 11.31 | 9.44 |

TABLE 6-continued

Swelling Due to Liquid Immersion

| Property | Units | Example 4 | Example 5 | Example 6 | Example 7 | Example 8 |
|---|---|---|---|---|---|---|
| after 96 hrs. @ 400° F. | % | 11.79 | 10.28 | 19.71 | 11.83 | 8.81 |
| after 192 hrs. @ 400° F. | % | 12.01 | 10.70 | 20.28 | 11.20 | 8.71 |
| Volume swell in Fuel C @ Room Temperature | % | 6.84 | 10.12 | 4.9 | 6.03 | 10.52 |
| after 48 hrs. @ 400° F. | % | 2.78 | 3.31 | 3.26 | 2.50 | 2.45 |
| after 96 hrs. @ 400° F. | % | 2.96 | 2.52 | 4.71 | 2.85 | 2.25 |
| after 192 hrs. @ 400° F. | % | 2.75 | 2.94 | 4.80 | 2.88 | 1.71 |
| Volume swell in Fuel C @ 50° C. | % | 12.08 | 11.44 | 14.74 | 10.16 | 8.33 |
| after 48 hrs. @ 400° F. | % | 9.74 | 8.49 | 14.65 | 9.04 | 6.46 |
| after 96 hrs. @ 400° F. | % | 9.59 | 8.24 | 15.33 | 8.77 | 6.14 |
| after 192 hrs. @ 400° F. | % | 9.28 | 8.02 | 14.98 | 8.88 | 5.41 |

EXAMPLE 12

For the purpose of comparing the present compositions to a conventionally prepared PTFE-filled fluoroelastomer, a sample of conventionally compounded Viton B terpolymer (HFP/VF$_2$/TFE, from E. I. DuPont de Nemours and Company, Inc., Wilmington, Del.) from Rainbow Master Mixing (Akron, Ohio) was obtained. The conventional sample was formulated to contain 72% by weight Viton B, 21.6% by weight MP1000 (PTFE micropowder from E. I. DuPont de Nemours and Company, Inc., Wilmington, Del.), 2.2% by weight zinc oxide, 1.8% by weight Diak #7 (polyfunctional triazine coagent useful in peroxide cure, manufactured by E.I. DuPont de Nemours), 1.8% Varox DBPH 50 (peroxide curative, R.T. Vanderbilt Co., Norwalk, Conn.), and 0.007% by weight carnauba wax (a processing aid). The material was received premixed and was freshened on a two roll rubber mill before curing in a 6"×6"×75 mil mold for 15 minutes at 350° F. at 555 psi. The sample was post-cured at 450° F. for 23 hours.

EXAMPLE 13

In this example, wear and abrasion testing was performed on a model LRI-1a tribometer (Lewis Research, Inc., Lewes, Del.), using the elastomer sample as the rotating specimen and a stationary stainless steel thrust bearing as the wear surface. The instrument monitors thickness changes, dynamic coefficient of friction, and temperature at 4–7 minute intervals based on test duration. The velocity was fixed at 10 ft/min throughout all tests, while the pressure range was from 30 to 100 psi for different tests. The increasing pressure is reflected in the data found in Tables 7 through 10 (where the pressure used was 30, 50, 75, and 100 psi, respectively). With all other test conditions constant, raising the pressure applied to the sample rendered the unfilled composition (Example 6) incapable of enduring the test. The sample became totally deformed at higher pressure. Filled samples were run successfully up to 100 psi, with the two Chemfab compositions testing similarly through 75 psi. At 100 psi the PTFE/Black filled composition (Example 7) exhibited a lower wear rate as well as a much lower coefficient of friction than the more conventionally formulated composition (Example 12).

TABLE 7

Wear and Abrasion Testing At 30 psi (PV = 300 psi·ft/min)

| Property | Units | Example 4 | Example 6 | Example 7 | Example 12 |
|---|---|---|---|---|---|
| Plastic Elastomer | polymer wt. % | 40/60 | 0/100 | 40/60 | 23/77 |
| Plastic filler | phr | 67 | 0 | 67 | 30 |
| MT Black filler | phr | 0 | 0 | 17 | 0 |
| coefficient of friction | | 0.409 | 0.87 | 0.342 | ND |
| Wear Rate | × 10$^{-7}$ in/min | 0.79 | 50.3 | 0.44 | ND |
| Wear Factor | | 158 | 10,100 | 88 | ND |
| Total Wear | mils | 1.9 | 22.8 | 1.0 | ND |
| Duration | hours | 167 | 96 | 167 | ND |
| Temperature | ° F. | 83.6 | 83.9 | 75.5 | ND |

ND denotes no data

TABLE 8

Wear and Abrasion Testing at 50 psi (PV = 500 psi·ft/min)

| Property | Units | Example 4 | Example 6 | Example 7 | Example 12 |
|---|---|---|---|---|---|
| Plastic/Elastomer | polymer wt. % | 40/60 | 0/100 | 40/60 | 23/77 |
| Plastic filler | phr | 67 | 0 | 67 | 30 |
| MT Black filler | phr | 0 | 0 | 17 | 0 |
| coefficient of friction | | 0.479 | FT | 0.418 | ND |
| Wear Rate | 10$^{-7}$ in/min | 1.4 | FT | 0.54 | ND |
| Wear Factor | | 170 | FT | 64 | ND |

TABLE 8-continued

Wear and Abrasion Testing at 50 psi (PV = 500 psi·ft/min)

| Property | Units | Example 4 | Example 6 | Example 7 | Example 12 |
|---|---|---|---|---|---|
| Total Wear | mils | 0.5 | FT | 0.2 | ND |
| Duration | hours | 50 | FT | 50 | ND |
| Temperature | ° F. | 88.5 | FT | 81.1 | ND |

FT denotes sample failure at these test conditions
ND denotes no data

TABLE 9

Wear and Abrasion Testing at 75 psi (PV = 750 psi·ft/min)

| Property | Units | Example 4 | Example 6 | Example 7 | Example 12 |
|---|---|---|---|---|---|
| Plastic/Elastomer | polymer wt. % | 40/60 | 0/100 | 40/60 | 23/77 |
| Plastic filler | phr | 67 | 0 | 67 | 30 |
| MT Black filler | phr | 0 | 0 | 17 | 0 |
| coefficient of friction | | 0.589 | FT | 0.504 | ND |
| Wear Rate | $10^{-7}$ in/min | 3.9 | FT | 1.8 | ND |
| Wear Factor | | 314 | FT | 144 | ND |
| Total Wear | mils | 3.2 | FT | 0.9 | ND |
| Duration | hours | 120 | FT | 94 | ND |
| Temperature | ° F. | 95.8 | FT | 87.0 | ND |

FT denotes sample failure at these test conditions
ND denotes no data

TABLE 10

Wear and Abrasion Testing at 100 psi (PV = 1,000 psi·ft/min)

| Property | Units | Example 4 | Example 6 | Example 7 | Example 12 |
|---|---|---|---|---|---|
| Plastic/Elastomer | polymer wt. % | 40/60 | 0/100 | 40/60 | 23/77 |
| Plastic filler | phr | 67 | 0 | 67 | 30 |
| MT Black filler | phr | 0 | 0 | 17 | 0 |
| coefficient of friction | | 0.471 | FT | 0.547 | 1.094 |
| Wear Rate | $10^{-7}$ in/min | 37.1 | FT | 7.2 | 9.8 |
| Wear Factor | | 2,230 | FT | 433 | 590 |
| Total Wear | mils | 3.3 | FT | 7.8 | 5.8 |
| Duration | hours | 12 | FT | 287 | 68 |
| Temperature | ° F. | 97.0 | FT | 101.2 | 121.4 |

FT denotes sample failure at these test conditions

Additionally, a group of samples was prepared in order to make direct comparisons of high molecular weight PTFE versus low molecular weight PTFE at comparable levels in similar elastomers prepared via casting or conventional milling. The data for these samples are detailed in Table 10A. Control samples of FKM elastomer alone (E14674 for cast samples and FT2481 gum for milled samples, as described in Example 17) as well as samples with a 10 weight percent loading of PTFE were prepared. The high molecular weight PTFE used was FLUON AD1LN (ICI Americas, Bayonne, N.J.) and the low molecular weight PTFE used was DuPont MP1000. Cast samples were prepared as detailed in Example 4, while milled samples were prepared on a two roll mill at Akron Rubber Development Laboratory. All samples were cured with the same relative loading of DIAK #3 and zinc oxide as the acid acceptor. All samples were cured for one-half hour at 350° and 500 psi and post-cured at 400° F. for 23 hours.

The two control samples lacking PTFE (Sample 1 and Sample 2) exhibited similar wear rates and derived wear factors. The coefficient of friction for the cast sample, however, was slightly lower than that of the milled sample. Upon addition of PTFE in either high molecular weight (Sample 3) or low molecular weight (Sample 4) form, the coefficient of friction dropped, with the cast sample lower again than the milled sample, 0.761 vs. 0.921, respectively. Despite the addition of the same level of PTFE, however, the wear rates of the two were dramatically different. While addition of low molecular weight PTFE (Sample 4) improved the wear rate by a factor of 5 relative to the 100% elastomer control, the addition of high molecular weight PTFE (Sample 3) yielded a better than 6-fold improvement in wear rate over the low molecular weight PTFE, or about a thirty-fold improvement relative to the unfilled elastomer.

TABLE 10A

Wear and Abrasion Testing at 100 psi

| Property | Units | Sample 1 | Sample 2 | Sample 3 (high molecular weight PTFE) | Sample 4 (low molecular weight PTFE) |
|---|---|---|---|---|---|
| Plastic/Elastomer | wt. % | 0/100 | 0/100 | 10/90 | 10/90 |
| Sample Isolation | | cast | milled gum | cast | milled gum |
| coefficient of friction | | 1.111 | 1.296 | 0.761 | 0.921 |
| Wear Rate | $10^{-7}$ in/min | 815 | 877 | 25 | 169 |
| Wear Factor | | 48,900 | 52,600 | 1,500 | 10,100 |
| Total Wear | mils | 20 | 27.8 | 16.9 | 27.4 |
| Duration | hours | 3.2 | 1.9 | 96 | 6.3 |
| Temperature | ° F. | 113.1 | 122.4 | 107.0 | 112.5 |

EXAMPLE 14

SEM was performed on various examples set forth above. Post-cured samples of Examples 5, 6, and 7 were freeze-fractured using liquid nitrogen in order to expose a fresh surface for analysis, then coated prior to imaging in the SEM. Example 6 was included for the purpose of comparison to the two PTFE-containing samples. Magnification to 10,000× showed individual PTFE particles (typically around 0.2 microns) and showed no evidence of widespread fibrillation of the PTFE. These samples have been cast, layered, cured under pressure, and post-cured without causing fibrillation of the PTFE particles within the fluoroelastomer matrix. This is important when comparing the state of high molecular weight PTFE in these examples to the state of such PTFE in a milled form, such as in Example 17.

EXAMPLE 15

FIG. 1 shows a scanning electron micrograph of a Chemfab PTFE laminate. This figure has been included for the purpose of visually illustrating PTFE fibrillation, which appears as the winding rooting fibers in the figure. The SEM sample was prepared in the same manner noted in Example 14. The laminate was prepared by a process with induced shear as described in U.S. Pat. No. 5,141,800.

EXAMPLE 16

Table 11 describes samples that were evaluated using a Tinius Olsen melt indexer, which is designed to measure the flow rate of visco-elastic fluids (such as molten resins) in accordance with standard methods as defined by the American Society for Testing and Materials (ASTM) D 1238. This evaluation was performed in order to gauge better the subsequent processibility of these compositions. All experimental runs, with the exception of runs 7 and 17, employed films cast from aqueous dispersions. Run 17 used a sample of PTFE and THV that was isolated by co-coagulation and air drying (see Example 22B below). Run 7 used a sample of conventional Viton composition with peroxide cure, which was freshened on a two roll mill. Runs 16, 18–20, 25–27, 29, and 30 used films which were cast by hand. Such films were created by dipping a small piece of Melinex (generally about 3"×4") in the casting fluid and drying in an oven at 200° F. for 1 minute. This dipping and drying was repeated until a final thickness of 5 mm was reached. Such hand samples were exposed to this drying temperature for a shorter time than films derived from the process detailed in Example 4. This is important when interpreting the data in this table, since hand samples are less cured than samples prepared on larger equipment such as that described in Example 4. A less cured elastomer will exhibit different flow characteristics than one which is further cured (Table 12). All remaining melt indexer runs used film generated on pilot equipment as was detailed in Example 4.

The shear stress calculated for the device set up as indicated in Table 11 was 23.8 psi, a very low pressure when compared to typical elastomer or plastic processing. The shear rate was under 10/sec, a value comparable to that employed in compression molding operations.

Table 11 indicates the weight percent of plastic and elastomer as well as the sources of these components: T30B (PTFE) and T121A (FEP) are products of E.I. DuPont de Nemours & Company, Inc., Wilmington, Del., D6027 (PTFE) is a product of Ausimont USA, Thorofare, N.J. Samples that did not contain added curative are indicated by underlining the run number and sample composition values. Samples were charged to the melt indexer chamber and preheated at the indicated temperature for the indicated length of time. At the end of the preheat time the indicated weight was applied to induce flow of the sample. The times at which flow then began and ended (where applicable) are indicated in the table, as well as the flow rate as determined by the weight of sample collected over even time intervals.

Figure 2:
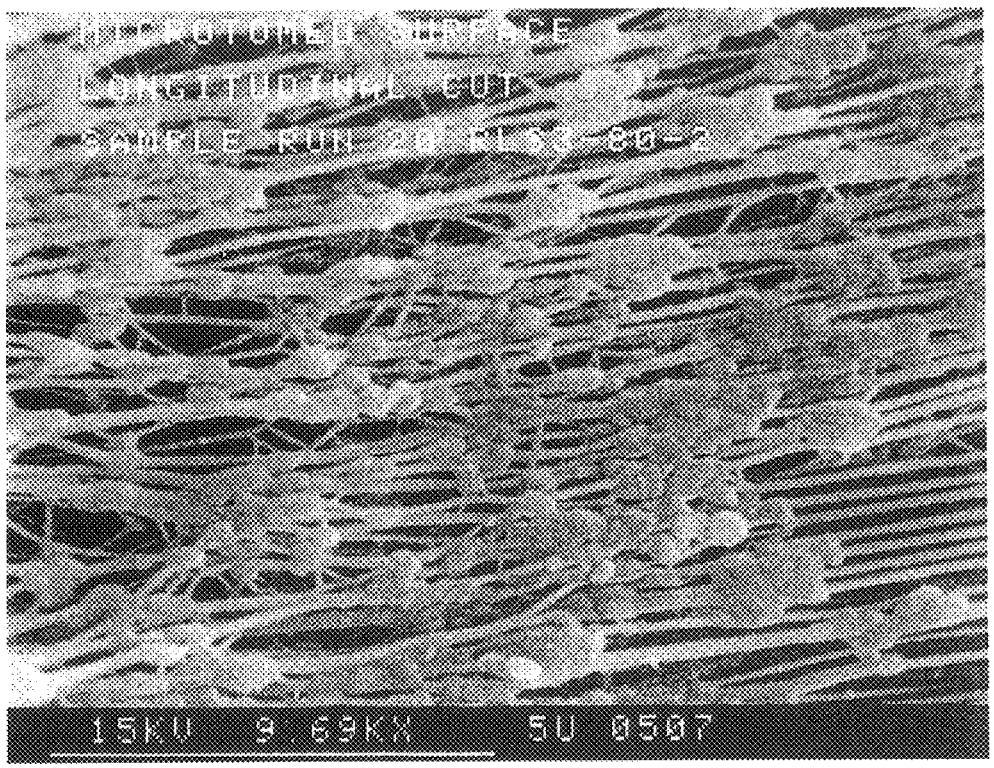
FIGS. 2 and 3 show scanning electron micrographs illustrating fiber formation of a T30B hand-cranked sample discussed in the specification.
Figure 3:
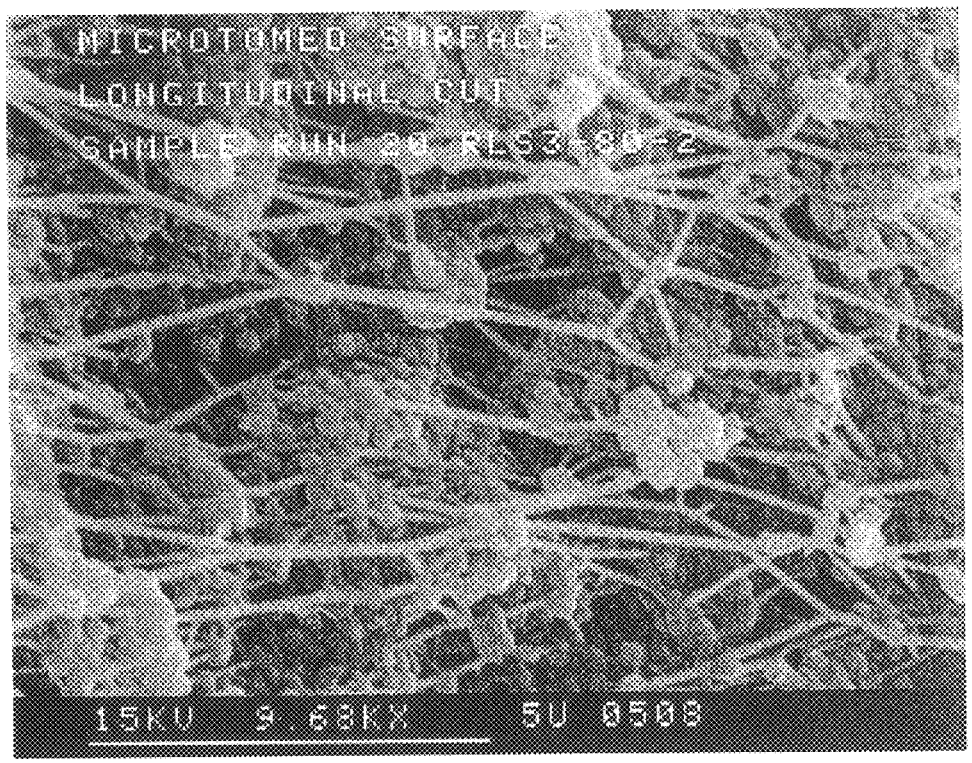
Figure 4A:
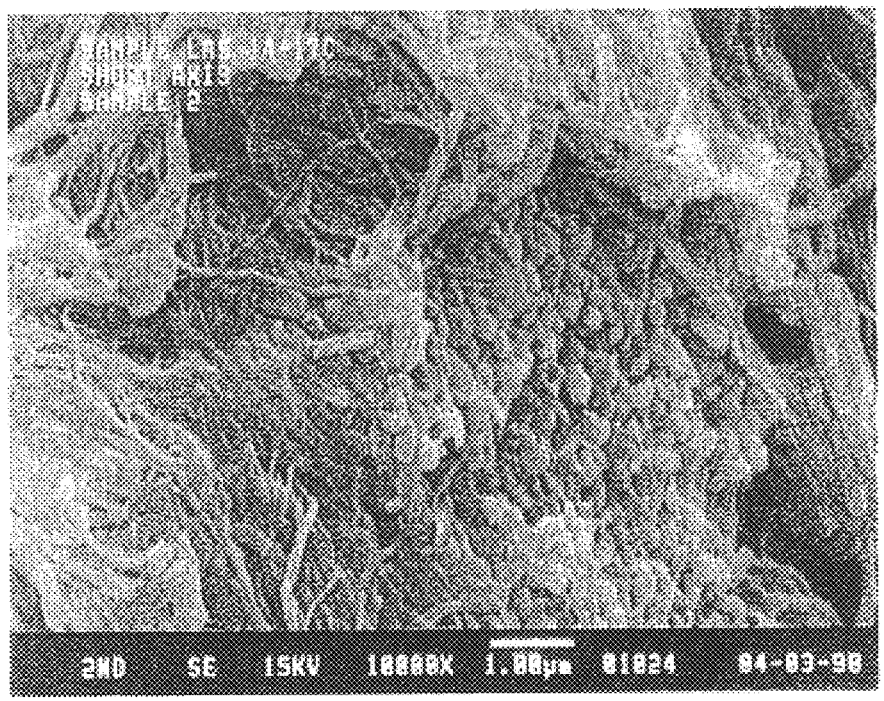
FIGS. 4A through 4L are scanning electron micrographs taken at 10,000×magnification, except for 4B (2,600×), of a milled-film sample containing a high molecular weight PTFE composition of the invention isolated in a matrix by a low shear process of the invention.
Figure 4B:
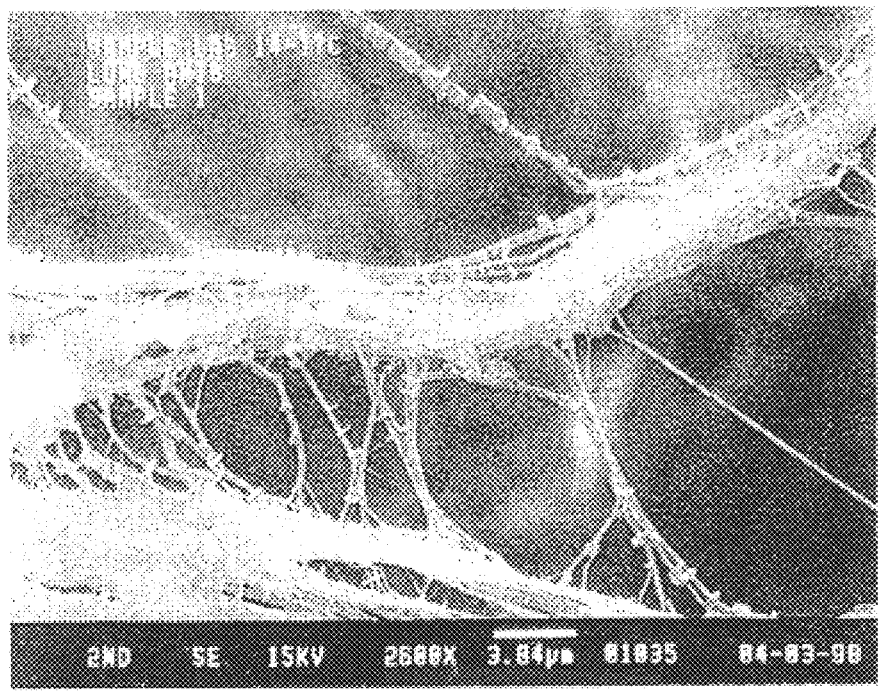
Figure 4C:
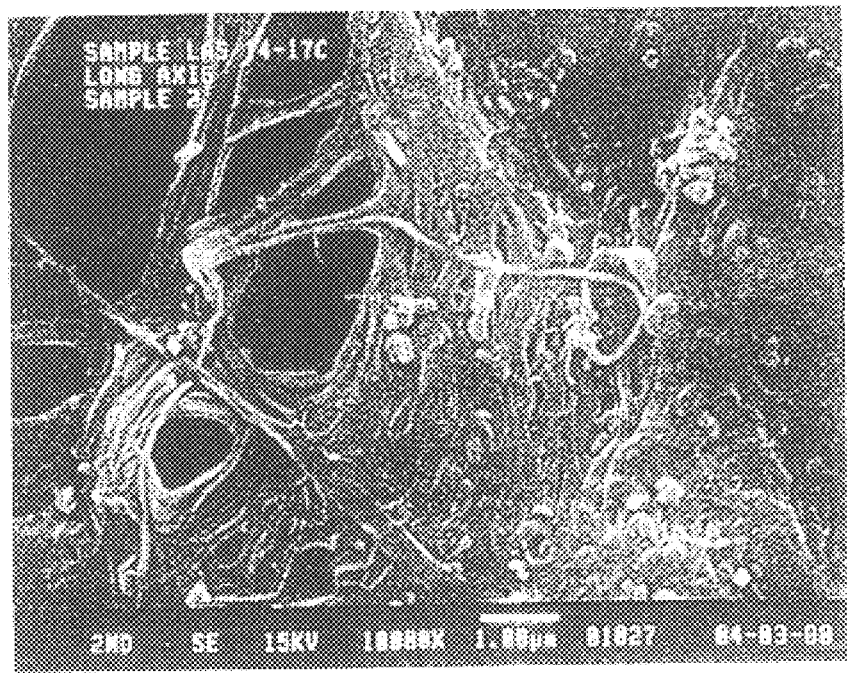
Figure 4D:
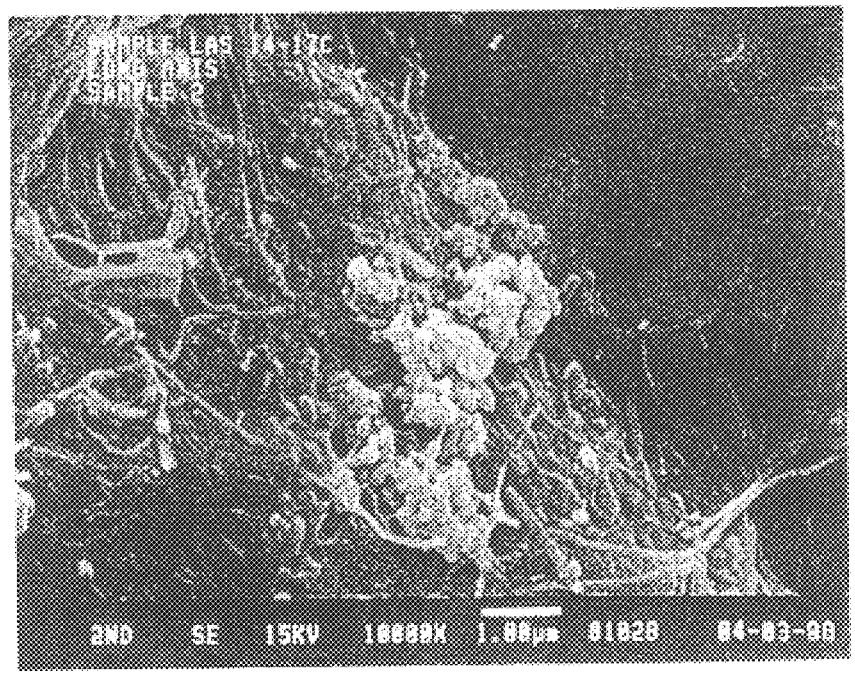
Figure 4E:
Figure 4F:
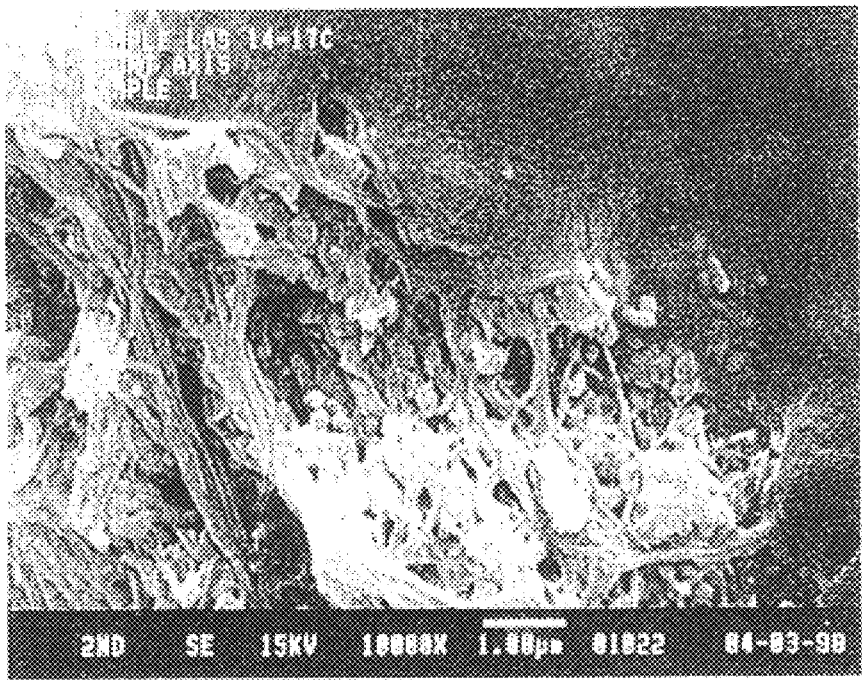
Figure 4G:
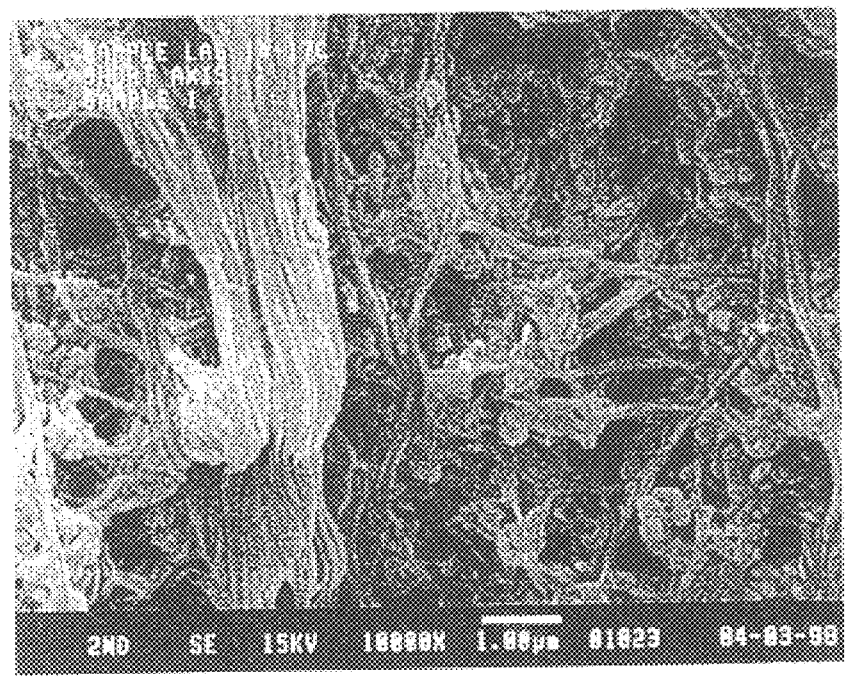
Figure 4H:
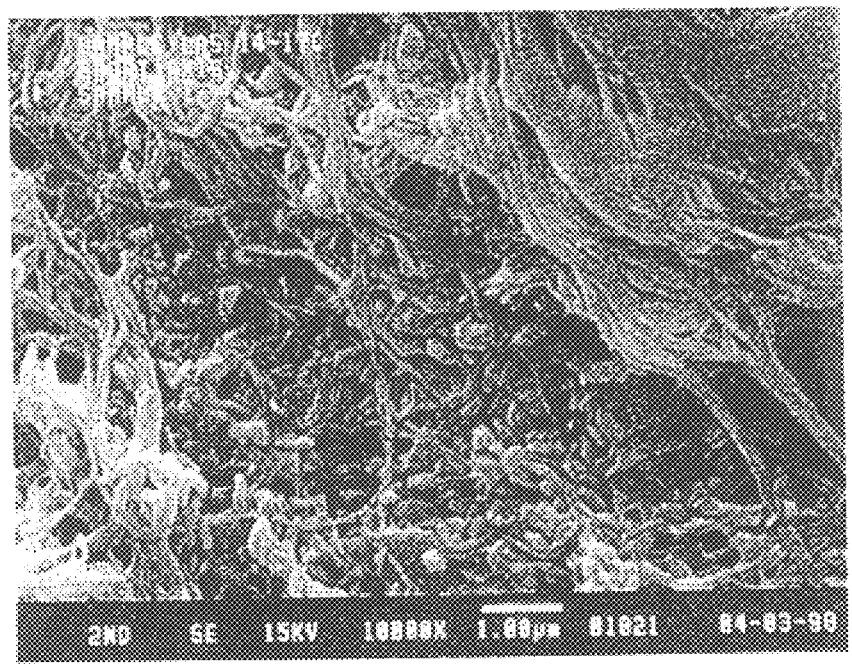
Figure 4I:
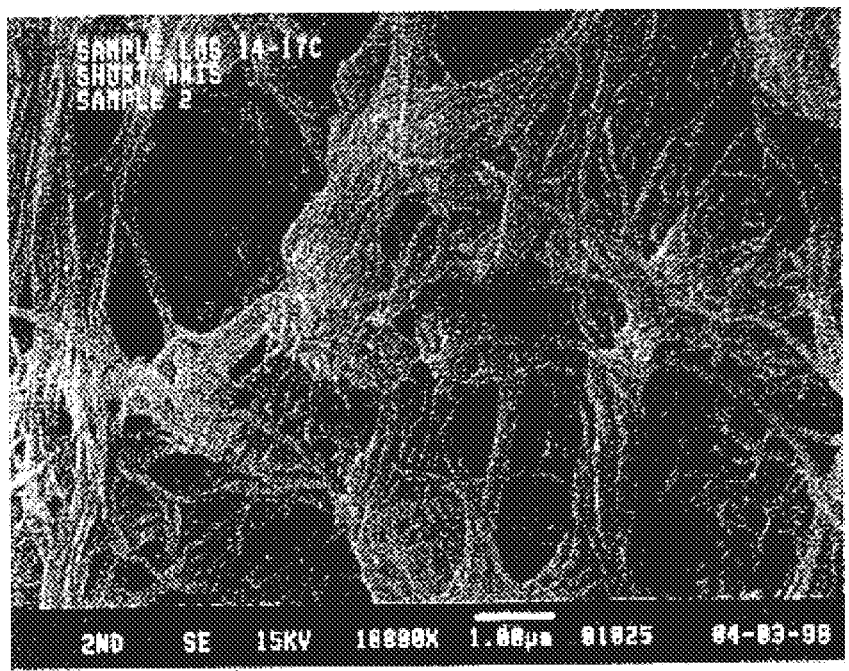
Figure 4J:
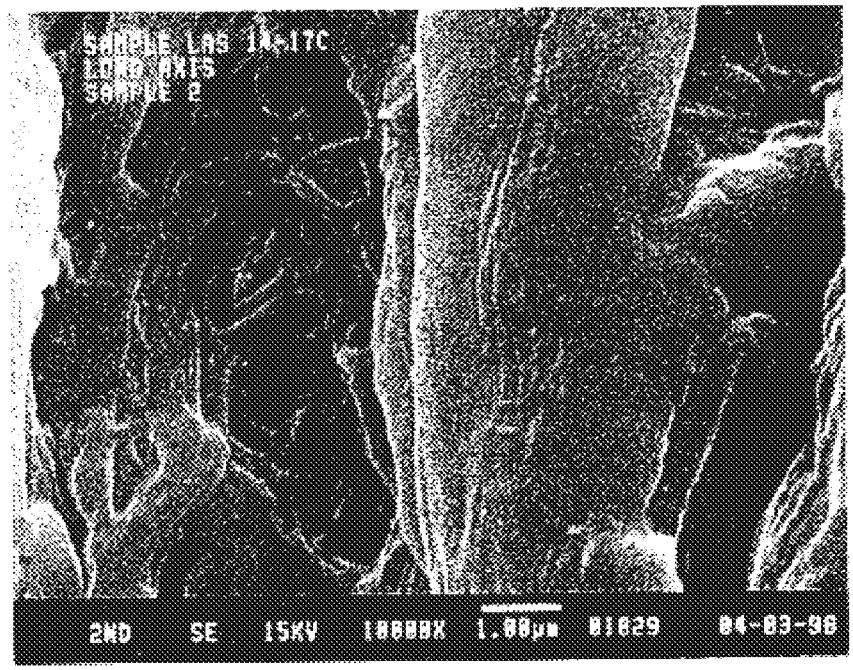
Figure 4K:
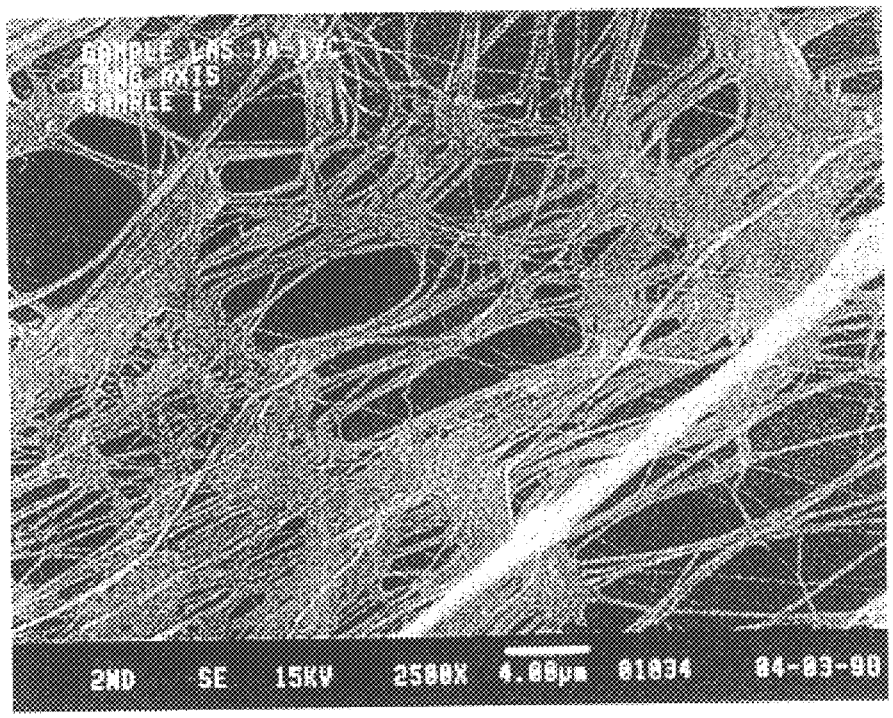
Figure 4L:
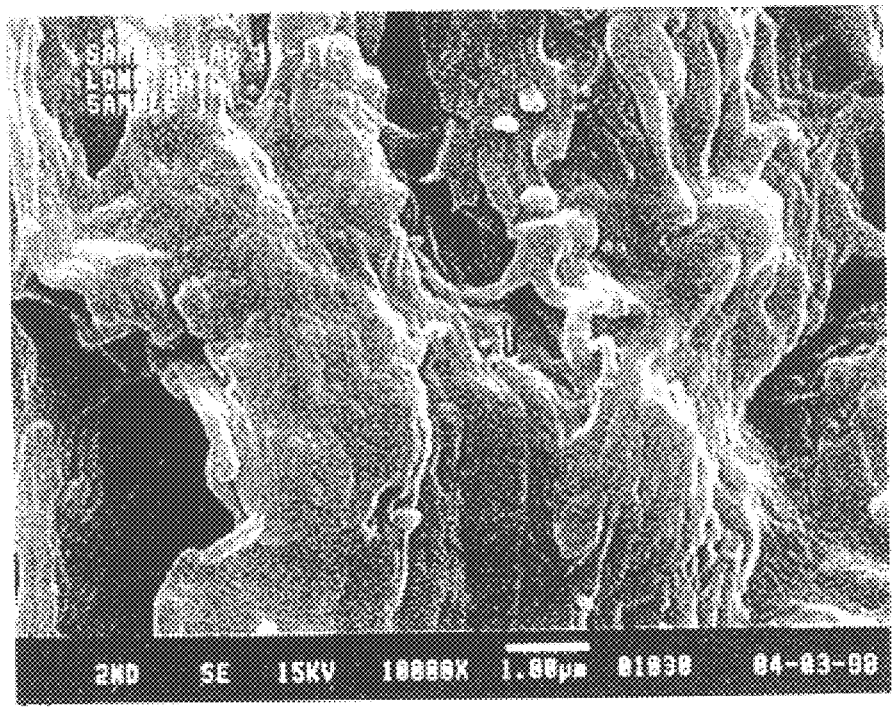

The three fluoroelastomer resins run through the melt indexer as cast film, without curative, all exhibited different flow rates, with TN-1 latex the fastest (run 29), E14673 intermediate (run 30), and L10180 the slowest (runs 18, 19). Rates for PTFE isolated as a cast film without curative components differed depending upon source. Neither T30B (run 20) nor D6027 (run 27) flowed upon application of the 18 kg weight. The T30B, however, could be hand-cranked through the melt indexer (at an unknown pressure and stress), while the D6027 could not be forced through. SEM of the T30B hand-cranked sample along the axis of extrusion shows the dramatic fibrillation which is possible with the higher molecular weight PTFE which has been used in these experiments (FIGS. 2 and 3). This fibrillation does not occur with the very low molecular weight PTFE micropowders, such as MP1000, which are generally added to currently available commercial PTFE-containing FKM (as defined by the ASTM-D1418) compounds (Example 12).

Curing is occurring in samples with Diak #3, as compared to those without, even at the modest pressure and temperature of these melt indexer runs. A 30% PTFE/10% FEP/60% FKM composition with Diak #3 (run 8) ceased to flow at 14 minutes into the test, whereas the comparable composition without Diak #3 (run 9) flowed sooner, and beyond the 14 minute mark. Similarly a 40% PTFE/60% FKM composition containing Diak #3 (run 23) exhibited a lower flow rate than the comparable composition without Diak #3 (run 16).

FEP appears to behave as a process aid and appears to have an optimum amount with regard to maximizing flow. A composition of 40% FEP/60% FKM with or without curative (runs 14 and 21) did not exhibit flow under the test conditions, A 10% PTFE/ 30% FEP/ 60% FKM under the same conditions (run 13) had a very modest flow of 0.01 g/min, while the 20% PTFE/20% FEP/60% FKM analog (run 10) had a flow of 0.06 g/min. Comparing the behavior of two hand samples, the composition of 5% FEP/35% PTFE/60% FKM (run 26) exhibited a flow rate three times that of a composition of 1% FEP/39% PTFE/60% FKM (run 25).

Table 12 illustrates how variable processing heat history contributed to varying degree of cure as measured by melt flow in the melt indexer. Hand samples were exposed to less cumulative heat than pilot samples and even when comparing such samples in the "green" state (before press curing), they are different in terms of degree of cure. The table is grouped by composition and in all cases when comparing a hand versus a pilot sample, the flow rate was higher for the hand sample, or was evident in the hand sample, and non-existent in the pilot sample (runs 35 vs. 8, 36 vs. 10, 37 vs. 14, 38 vs. 23, 39 vs. 12).

TABLE 11

Evaluation of Compositions via Melt Indexer
Compositions are by Weight Percent

| Run # | Hand vs. Pilot | PTFE T30B | PTFE D6027 | FEP T121A | FKM L10180 | FKM TN-1 | FKM E14673 | ZAK 5050 (1) | Rainbow (2) | Temp (° F.) | Applied Weight (kg) | Preheat Time (min) | Flow Rate (g/min) | Free Flow Window (3) (min) |
|---|---|---|---|---|---|---|---|---|---|---|---|---|---|---|
| 1 | P | | | | 100 | | | | | 275 | 4.9 | 7 | NA | NA |
| 2 | P | 40 | | | 60 | | | | | 311 | 9.8 | 7 | NA | NA |
| 3 | P | 40 | | | 60 | | | | | 350 | 9.8 | 5 | NA | NA |
| 4 | P | 40 | | | 60 | | | | | 350 | 18 | 7 | NA | NA |
| 5 | P | | 40 | | | | 60 | | | 350 | 18 | 7 | NA | NA |
| 6 | P | 40 | | | 60 | | | | | 220 | 18 | 7 | NA | NA |
| 7 | Other | | | | | | | | 100 | 220 | 18 | 7 | 0.07 | 11–13 |
| 8 | P | 30 | | 10 | 60 | | | | | 220 | 18 | 7 | 0.07 | 8–14 |
| (4) 9 | P | 30 | | 10 | 60 | | | | | 220 | 18 | 7 | 0.07 | 7.5–14+ (5) |
| 10 | P | 20 | | 20 | 60 | | | | | 220 | 18 | 5 | 0.06/ (6) | 6–11.5 |
| 11 | P | | 40 | | | | 60 | | | 220 | 18 | 5 | NA | NA |
| 12 | P | | 40 | | | 60 | | | | 220 | 18 | 5 | 0.06 | 6–18.5+ |
| 13 | P | 10 | | 30 | 60 | | | | | 220 | 18 | 5 | 0.01 | 9–11.5 |
| 14 | P | | | 40 | 60 | | | | | 220 | 18 | 5 | NA | NA |
| 15 | P | | 40 | | 60 | | | | | 220 | 18 | 5 | 0.03 | 7–11 |
| 16 | H | 40 | | | 60 | | | | | 220 | 18 | 5 | 0.15 | 6–25+ |
| 17 | Other | | | | | | | 100 | | 220 | 18 | 5 | NA | NA |
| (7) 18 | H | | | | 100 | | | | | 220 | 18 | 5 | 0.01 | 7.5–19.5+ |
| 19 | H | | | | 100 | | | | | 220 | 18 | 5 | 0.01 | 5.5–20+ |
| 20 | H | 100 | | | | | | | | 220 | 18 | 5 | NA | NA |

| Run # | | PTFE T30B | PTFE D6027 | FEP T121A | FKM CF6200 | FKM TN-1 | FKM E14673 | | MT Carbon Black | Temp (° F.) | Applied Weight (kg) | Preheat Time (min) | Flow Rate (g/min) | Free Flow Window (min) |
|---|---|---|---|---|---|---|---|---|---|---|---|---|---|---|
| 21 | P | | | 40 | 60 | | | | | 220 | 18 | 5 | NA | NA |
| 22 | P | 40 | | | 60 | | | | 10 | 220 | 18 | 5 | NA | NA |
| 23 | P | 40 | | | 60 | | | | | 220 | 18 | 5 | 0.04 | 5.5–15.5 |
| 24 | P | | | | 70 | | | | 30 | 220 | 18 | 5 | NA | NA |
| 25 | H | 39 | | 1 | 60 | | | | | 220 | 18 | 5 | 0.25 | 5.0–30.0 |
| (8) 26 | H | 35 | | 5 | 60 | | | | | 220 | 18 | 5 | 0.77 | 5–18 |
| 27 | H | | 100 | | | | | | | 220 | 18 | 5 | NA | NA |
| 28 | P | | | | 60 | | | | 40 | 220 | 18 | 5 | NA | NA |
| (9) 29 | H | | | | | 100 | | | | 220 | 18 | 5 | .21 | 5.0–25.0+ |
| 30 | H | | | | | | 100 | | | 220 | 18 | 5 | 0.04 | 7.0–25.0+ |

NA denotes no flow observed
(1) Co-precipitate of THV and PTFE, both raw dispersions (Example 22B)
(2) Peroxide cured terpolymer containing 30 phr of MP1000 PTFE (Example 12)
(3) Free flow after indicated preheat; once weight was applied
(4) All underlined compositions indicate curative was not added
(5) + indicates sample was still flowing when weights were removed
(6) Forced flow at variable rate
(7) Zinc oxide was deleted from this formulation as well, harder to remove from chamber than sample with ZnO, #19.
(8) Flowed extremely well, only material which completely emptied out of core chamber
(9) Flowed as soon as weights were applied, and rate increased with time

TABLE 12

Comparison of Hand and Pilot Samples - Grouped by Composition
Melt Index Experiments - 18 kg applied weight, 220° F., 5 minute preheat
Compositions are by Weight Percent

| Run # RLS4-1 | Process | T30B | D6027 | T121A | THV 350C | THV 530R (1) | CF6200 | TN-1 | Flow Rate (g/min) | Free Flow Window (min) | Comments |
|---|---|---|---|---|---|---|---|---|---|---|---|
| 31 | H | 20 | | | 20 | | 60 | | 0.15 | 5–20+ | |
| 32 | H | | | | 40 | | 60 | | 2.64 | 5–8 (3) | |
| 33 | H | 35 | | | 5 | | 60 | | 0.63 | 5–17 (3) | |
| 34 | H | | | | | 40 | 60 | | 0.07 | 5–19 | |
| 35 | H | 30 | | 10 | | | 60 | | 0.11 | 5–20+ | |
| 8 | P | 30 | | 10 | | | 60 | | 0.07 | 8–14 | 7 min preheat |
| 9 | P | 30 | | 10 | | | 60 | | 0.07 | 7.5–14+ | 7 min preheat |
| 36 | H | 20 | | 20 | | | 60 | | 0.07 | 5–16 | |
| 10 | P | 20 | | 20 | | | 60 | | 0.06 | 6–11.5 | |
| 37 | H | | | 40 | | | 60 | | 0.03 | 5–14 | |
| 14 | P | | | 40 | | | 60 | | NA | NA | |
| 21 | P | | | 40 | | | 60 | | NA | NA | |
| 38 | H | 40 | | | | | 60 | | 0.15 | 5–20 | |
| 23 | P | 40 | | | | | 60 | | 0.04 | 5.5–15.5 | |
| 16 | H | 40 | | | | | 60 | | 0.15 | 6–25+ | |
| 39 | H | | 40 | | | | | 60 | 0.86 | 5–14 (3) | |
| 12 | P | | 40 | | | | | 60 | 0.06 | 6–18.5+ | |

(1) THV 530R is raw 30% solids dispersion with melt temperature range 302–356° F.
(2) + indicates sample was still flowing when weights were removed
(3) All material flowed, chamber emptied

EXAMPLE 17

In order to highlight the potential difference in these systems between high and low molecular weight PTFE, that is, fibrillatable and non-fibrillatable PTFE, as well as conventional methods versus the present methods of processing, the following set of experiments, represented as Examples A–D in Table 13 below, were performed using these two styles of PTFE and holding the other ingredients as constant as possible. Because conventional milling was used for half of these samples, a relatively modest loading of 30 phr PTFE was chosen. The low molecular weight PTFE was MP1000. The high molecular weight PTFE was AD1LN (61% solids aqueous dispersion, ICI Americas, Exton, Pa.) or Fluon CD123 (PTFE molding powder, ICI Americas, Exton, Pa.). The FKM fluroelastomer used was E14674 for film casting (Example 1) and the gum version of that dispersion, FT2481 (Dyneon), was used for milling. Process aids were specific to either film casting or conventional milling. Triton X-100 was used in casting (25% aqueous solution made from concentrate, Union Carbide, Danbury, Conn.), while standard carnauba wax was used in milling. Milling was performed (Rainbow Master Mixing, Inc., Akron, Ohio) on a two roll mill starting at room temperature. The carnauba wax was incorporated first, followed by the PTFE. Curatives were not used in this set of examples.

MP1000 low molecular weight PTFE incorporated easily into the FT2481 in Example C. When CD 123 high molecular weight PTFE was added to the elastomer, for Example D on the mill, it caused the banded elastomer to break up and interfered with normal sheeting on the rollers. The mixture became warm to the touch and became stiffer the longer the matrix was processed. Upon completion of milling, Example C was a normal, smooth, flat slab of well-mixed elastomer, while Example D containing high molecular weight PTFE was not smooth, but rather dramatically irregular, with a knotted, striated texture. This was expected behavior from a PTFE of fibrillatable molecular weight and was a dramatic example of why fibrillatable PTFE is not a practical additive in a conventional dry mix process which introduces substantial shear. (Compare this to isolation of high molecular weight PTFE in FKM discussed in Example 14.)

Formulation and film casting of Example B were similar to that described in Example 4 above. Formulation of Example A was complicated by the fact that MP1000 is a powder, not an aqueous dispersion. A castable fluid was prepared from 43% by weight MP1000, 55% by weight deionized water, 0.2% by weight active Fluorad FC118 surfactant (20% aqueous solution, 3M, St. Paul, Minn.) and 2.3% by weight active Triton X-100 (25% aqueous solution). These were charged to a vessel sitting in a constant temperature water bath and mixed with an overhead paddle stirrer while bringing the mixture up to 75° C. (above the 64° C. cloud point of Triton X-100). This slurry was then cooled back down to room temperature while continuing stirring. The cooled slurry was then passed through a Microfluidizer® (Model M110-F, Microfluidics Corporation, Newton, Mass.) at 8,000–12,000 psi resulting in a stable aqueous suspension of MP1000 (42.9% solids). The Microfluidizer® was held in an ice-water bath in order to maintain the low temperature of the slurry while processing. At this point, Example A was then formulated similar to Example B in combining aqueous ingredients and the film was also cast in the fashion described in Example 4 above.

TABLE 13

| Example | A | B | C | D |
|---|---|---|---|---|
| Processing | cast | cast | milled | milled |
| Fluoroelastomer | E14674 | E14674 | FT2481 | FT2481 |
| PTFE | MP1000 30 phr | AD1LN 30 phr | MP1000 30 phr | AD1LN 30 phr |

TABLE 13-continued

| Example | A | B | C | D |
| --- | --- | --- | --- | --- |
| Process aid | Triton X-100 2 phr | Triton X-100 2 phr | carnauba wax 1 phr | carnauba wax 1 phr |
| Condition of isolate | smooth film | smooth film | smooth slab | textured slab |

Important again is the condition of the PTFE in the isolation process. While low molecular weight PTFE can be used as an additive in conventional milling as well as in the present methods of processing, without a change in the physical state of the PTFE, such is not the case with high molecular weight PTFE. The disclosed methods of isolation enable the isolation of PTFE in an elastomer matrix in an unfibrillated, but fibrillatable state.

EXAMPLE 18

Uncured fluoroelastomer of the type used in Example 17 is soluble in solvents such as methylethylketone (MEK). Solvation of uncured elastomer has been used in order to ascertain the condition of PTFE in these mixtures since PTFE is not soluble in such solvents.

Cast films (Examples 17A and 17B) containing low and high molecular weight PTFE, respectively, were milled in order to illustrate the transition from fibrillatable, but unfibrillated, to fibrillated PTFE. Milling was performed (Akron Rubber Development Laboratories, Inc., Akron, Ohio) on a two roll mill preheated to 150° F. Once again, the composition containing MP1000 low molecular weight PTFE easily knitted together and banded on the rolls to produce a smooth-textured slab, similar to the sample which was originally mixed on the mill (Example 17C). Sample 17B, containing high molecular weight PTFE, toughened and heated up while processing, and was in general hard to sheet out due to its rough texture. Once completed, the milled version of 17B appeared the same as sample 17D, although 17B was originally isolated as a smooth 5 mil film, containing unfibrillated PTFE.

Samples 17A and 17B, as well as their milled counterparts, were then suspended in stirring, warm MEK (60° C.) for 4 hours in order to dissolve FKM elastomer, which was not cured in these examples. Three samples disintegrated totally due to this treatment: 17A, and its milled counterpart, as well as 17B. The fluoroelastomer dissolved in the MEK and the PTFE, thus liberated from the matrix, settled out as a fine precipitate, whether it was low molecular weight PTFE (17A and 17A milled), or high molecular weight PTFE (fibrillatable) isolated in the matrix in a low shear process (but not fibrillated, 17B). The milled version of 17B, which exhibited a very rough texture, retained some of its original weight, while also retaining the original textured three-dimensional shape. A later extraction of the milled version of 17B in room temperature MEK after 6 days resulted in loss of two thirds of the original weight, but retention of the original textured three-dimensional structure. Thermal gravimetric analysis (TGA) of the undissolved third revealed a sample comprised of 77% PTFE and 23% FKM by weight, a reversal of the original 23% PTFE/ 77% FKM. Unlike the low molecular weight PTFE examples, or the unfibrillated high molecular weight PTFE example, this high molecular weight PTFE example has retained a definite three-dimensional structure, despite solvation of 90% of the surrounding elastomer, due to PTFE fibrillation. SEM photographs of this milled film (17B) extracted in MEK, (FIGS. 4A–4L) show a tangled and complex network of PTFE fibrils, along with some of the remaining elastomer, consistent with what was observed with the naked eye.

EXAMPLE 19

Figure 5:
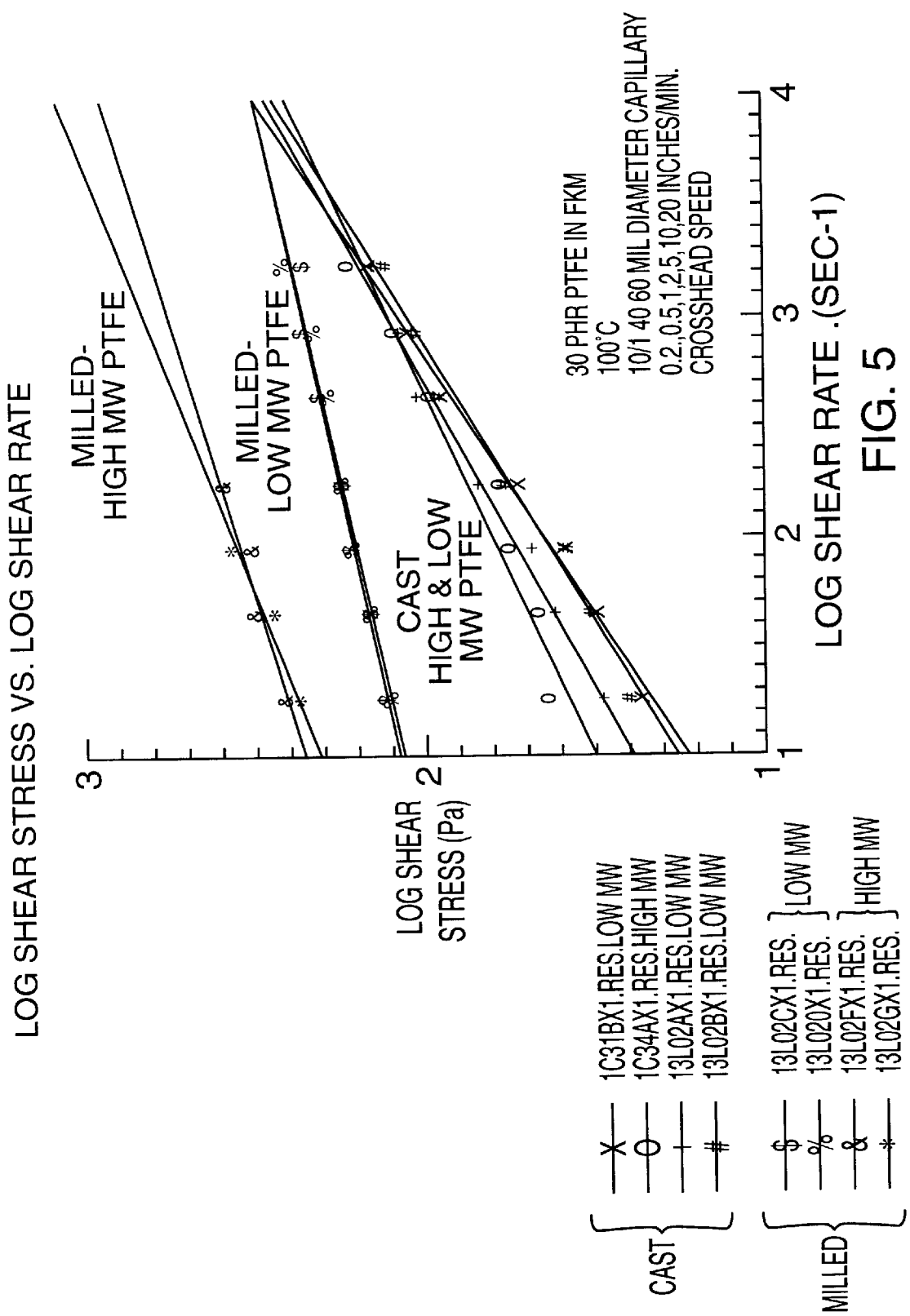
FIG. 5 is a graph demonstrating the log shear stress versus the log shear rate of low and high molecular weight PTFE-containing compositions prepared by casting or milling processes.
Figure 6A:
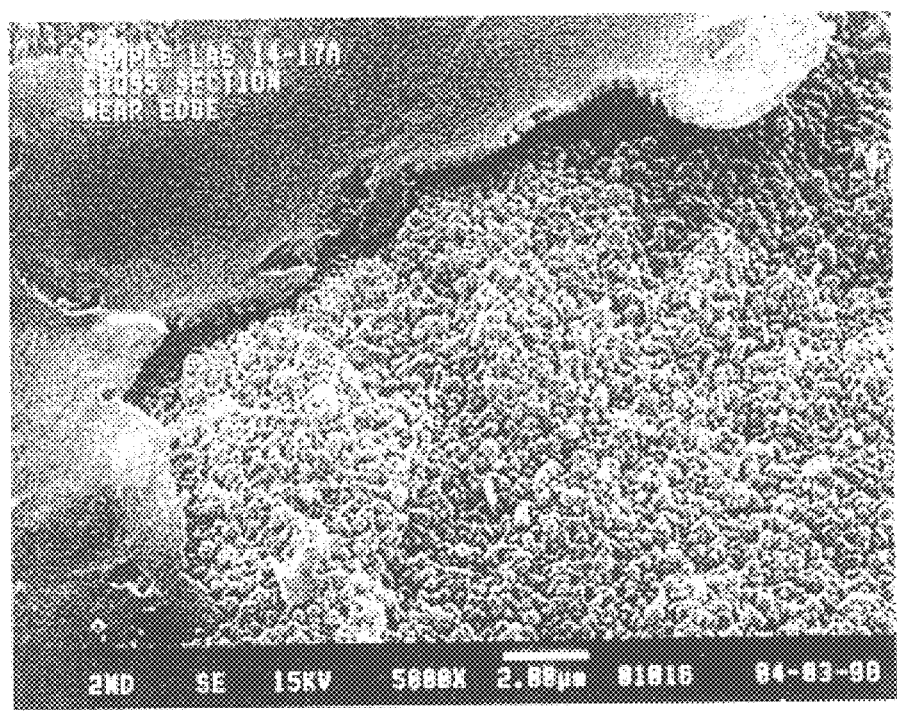
FIGS. 6A through 6D are scanning electron micrographs of a high molecular weight PTFE-containing composition of the invention.
Figure 6B:
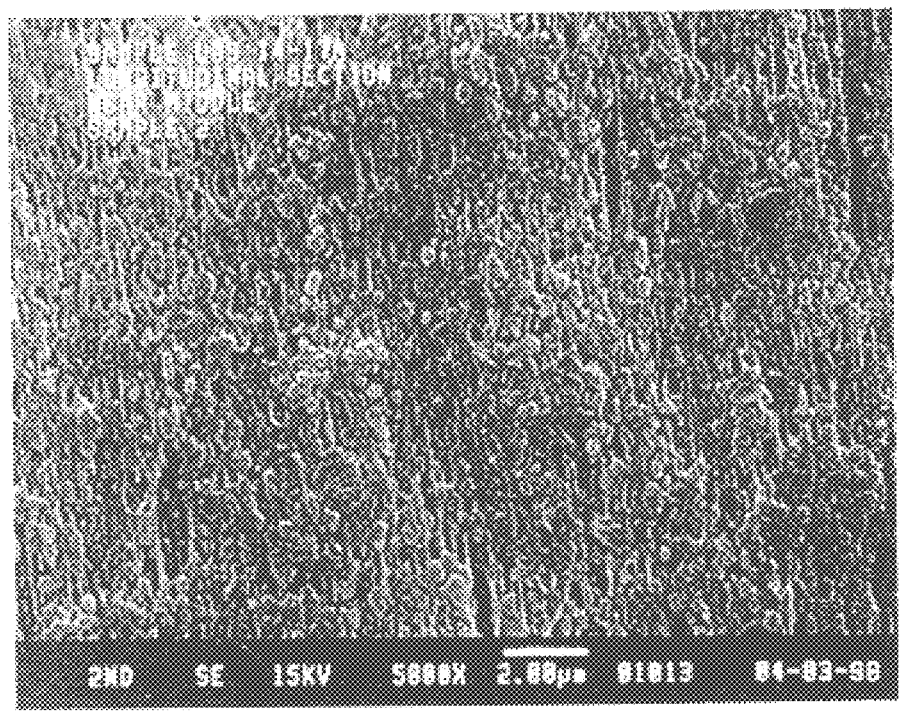
Figure 6C:
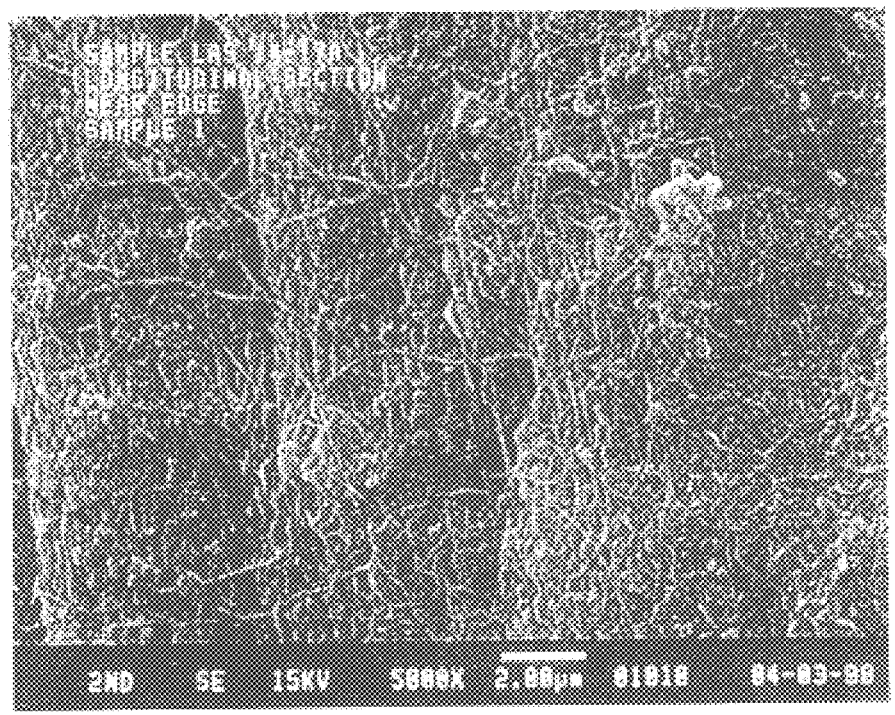
Figure 6D:
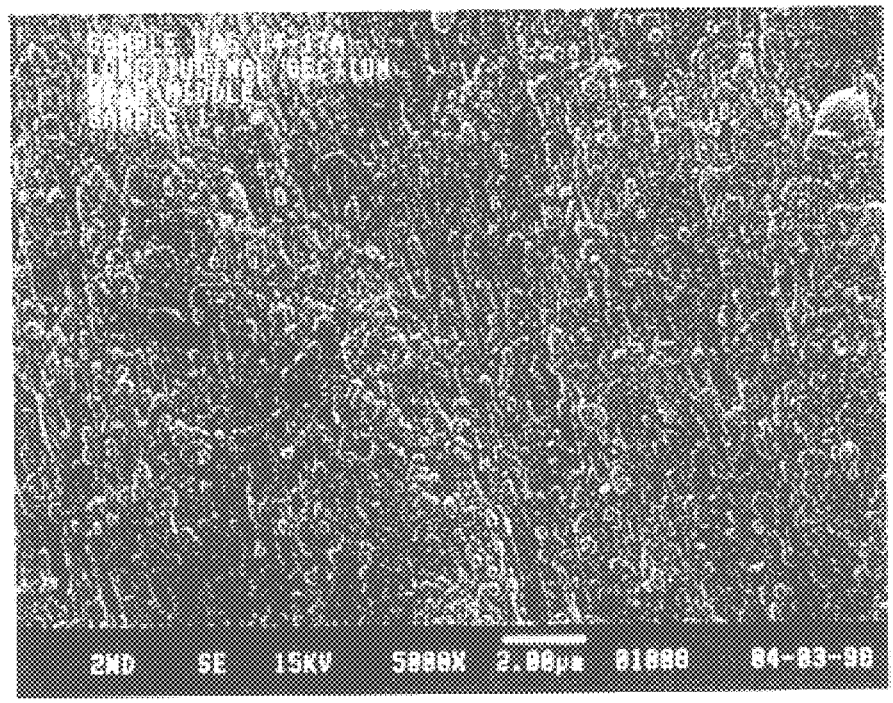
Figure 7A:
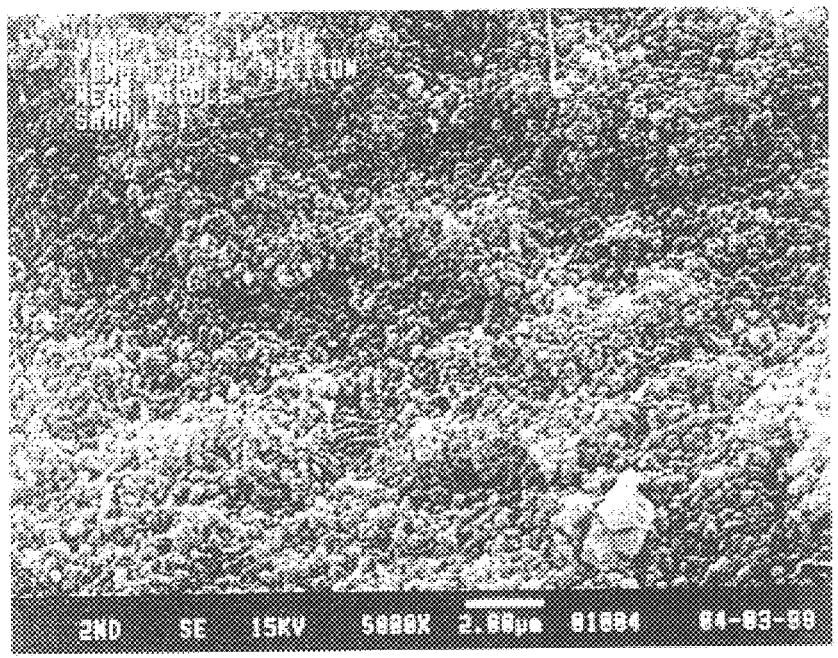
FIGS. 7A through 7D are scanning electron micrographs of a low molecular weight PTFE-containing composition.
Figure 7B:
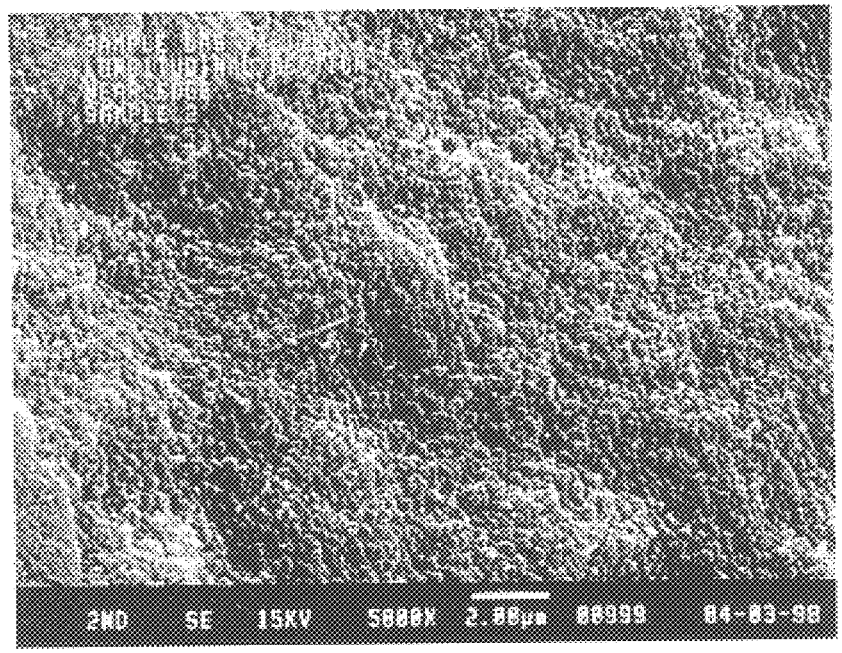
Figure 7C:
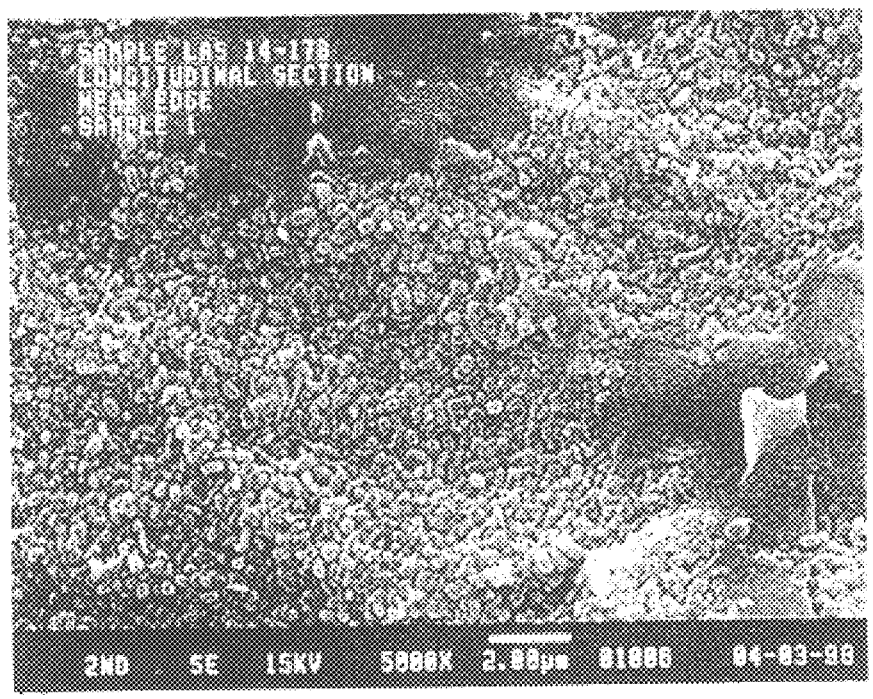
Figure 7D:
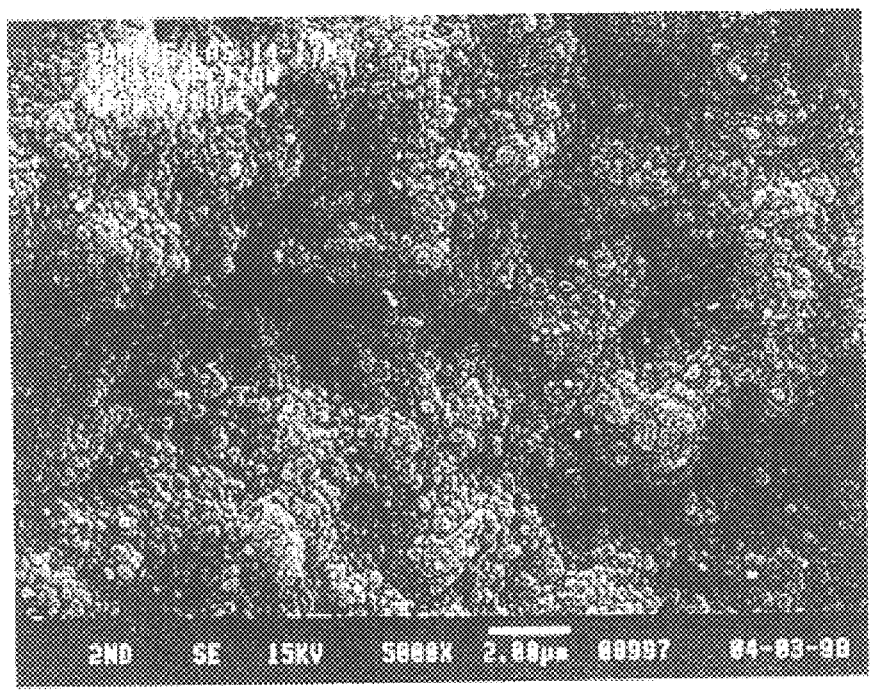

Samples generated in Example 17 were processed through an Instron Model 3213 capillary rheometer at modest temperature (80–120 ° C.). Capillaries used ranged from 50 to 60 mils with a length to diameter ratio range of 10/1 to 40/1. FIG. 5 shows the log shear rate versus log shear stress for samples A–D at 100° C. through a 60 mil 10/1 L/D capillary. Crosshead speed ranged from 0.2 to 20 inches per minute.

As seen in FIG. 5, cast films containing both low and high molecular weight PTFE exhibited the same Theological behavior under these conditions. The high molecular weight PTFE has been isolated in a form which is fibrillatable, but not yet fibrillated (this sample was later fibrillated by milling in Example 18). Samples of the cast films which were run at a crosshead speed of 20"/min. were subjected to a shear stress of 154 psi and shear rate of about 2600/sec (mild conditions compared to PTFE paste extrusion). These two extrudates were extracted in MEK to remove fluoroelastomer and analyzed by SEM. FIGS. 6A–6D are scanning electron micrographs of a high molecular weight PTFE-containing sample showing the beginnings of fibrillation along the axis of extrusion, as well as overall particle elongation, due to the shear of the rheometer. FIGS. 7A–7D are scanning electron micrographs of low molecular weight PTFE-containing sample showing round particles, as expected for this control of non-fibrillatable PTFE.

The milled samples in FIG. 5 exhibit very different Theological behavior based on the condition of PTFE in these samples. As seen in the figure, the high molecular weight PTFE sample generated through milling experienced shear, sufficient to result in fibrillated PTFE in the matrix. Passing such a sample through the rheometer resulted in a higher shear stress for any given shear rate, holding all other conditions constant. In fact this milled sample which contained fibrillated PTFE could not be passed through the rheometer at the higher crosshead speeds due to the pressure generated by the sample and the pressure limit of the system. FIG. 5 also shows that the milled sample containing low molecular weight PTFE, by contrast, could be passed through the capillary rheometer even at the highest crosshead speed.

EXAMPLE 20

A cast film sample (3.8 pounds) containing high molecular weight PTFE (40 weight %), fluoroelastomer (60 weight %), zinc oxide, and Diak #3 curative similar to that described in Example 4 was sent to Akron Rubber Development Laboratory for milling. Milling was performed for a half hour at a beginning roll temperature of 90° F., ending roll temperature of 162° F. and a material temperature of 187° F. The material was consistently fed to the rolls in the same direction, resulting in a long thin strip. Normally, milled samples are folded and rotated to promote good mixing of components. The purpose of this milling, however, was not to mix (the cast film already contained well-dispersed ingredients prior to milling), but rather to induce shear in the matrix in a constant uniaxial direction. This was done to controllably fibrillate the PTFE dispersed in the sample in the direction of the milling. Wide angle X-ray scattering (described in Example 32) of this uniaxially-milled sample clearly showed orientation of the crystalline (PTFE) portion of the sample. By contrast, the milled sample described in Example 18 (17B milled) did not show orientation by wide angle X-ray scattering. This sample was fibrillated, as clearly seen with the unaided eye as well as by SEM, but the fibrillation was random, not oriented. In this instance (Example 20), the orientation of the PTFE fibrillation has been controlled by controlling the milling direction, as verified by wide angle X-ray scattering. Controlling the fibrillation of PTFE dispersed in elastomer would be of benefit in some applications of such a blend.

EXAMPLE 21

A series of compositions which ranged from 100% fluoroelastomer to 80% PTFE/20% fluoroelastomer in 10% increments was generated in the manner of Example 4. The high molecular weight PTFE used was AD1LN (61% solids, ICI, Bayonne, N.J.) and the fluoroelastomer used was E14674, described in Example 1. All compositions were isolated as a free, manageable film and surprisingly, samples containing as much as 80% by weight unfused and unoriented PTFE could be handled as free film. A set of control samples using a comparable gum elastomer and low molecular weight PTFE (M1000) was also prepared via milling. These controls ranged from 100% elastomer to 30% PTFE/70% FKM. The cast samples, which averaged 5 mils in gauge, were plied to approximately 30 mils. Both cast and milled samples were cured in a mold at 350° F. for ½ hour at 555 psi, then post-cured for 22 hours at 400° F.

Figure 8:
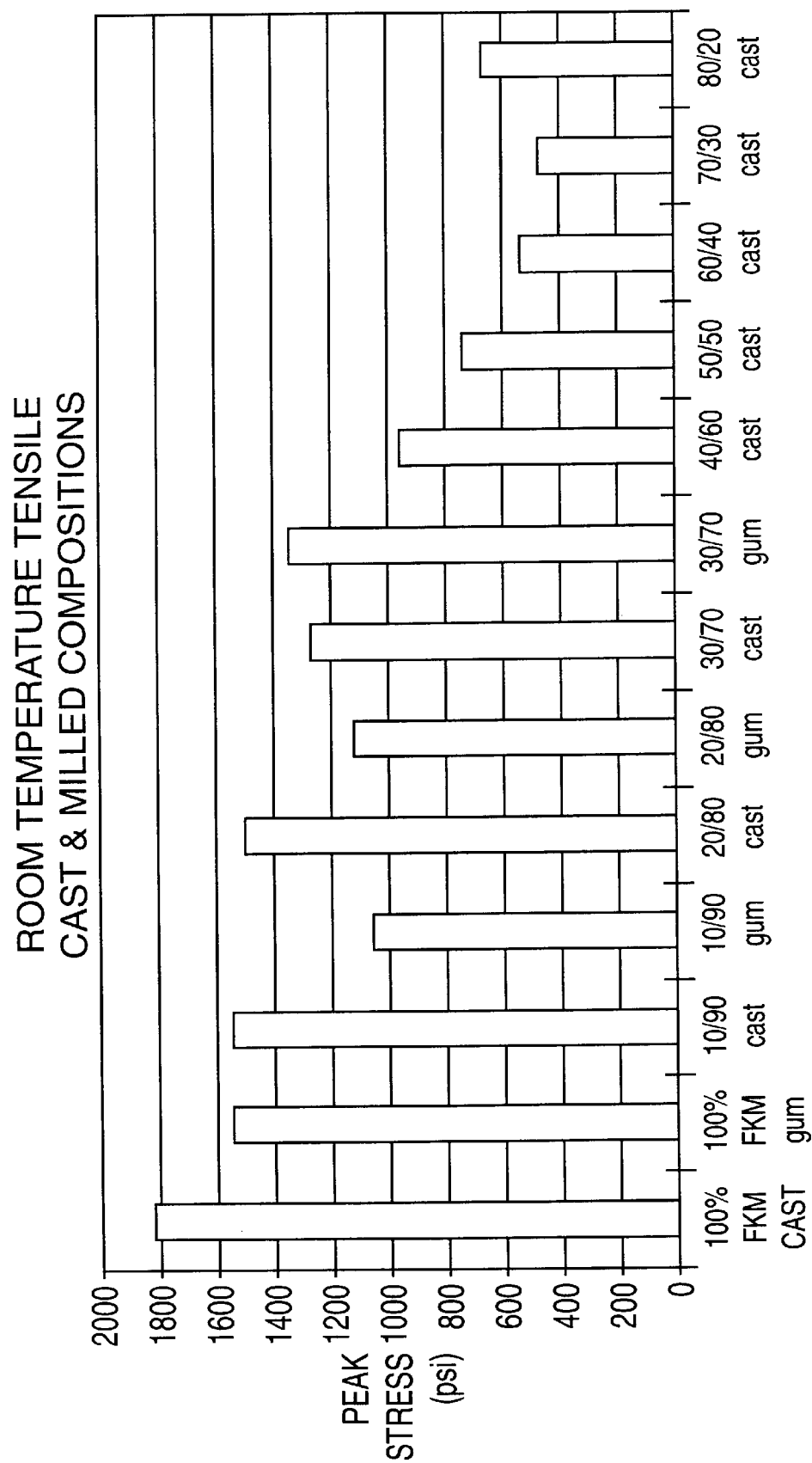
FIG. 8 is a bar graph demonstrating tensile measurements of compositions containing PTFE at various concentrations (percent by weight).
Figure 9:
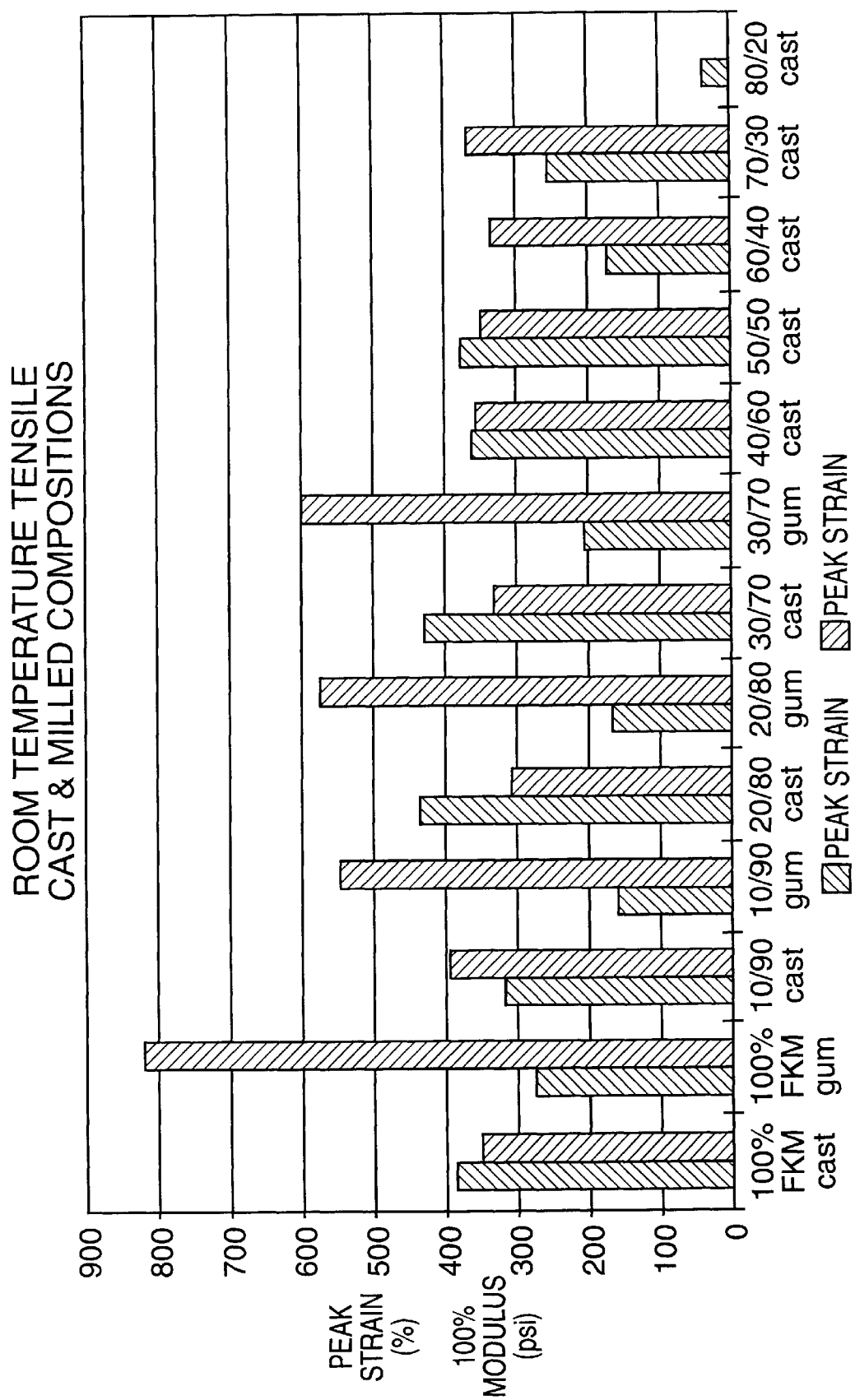
FIG. 9 is a bar graph demonstrating elongation and 100% modulus of compositions containing PTFE at various concentrations (percent by weight).

These materials were tensile-tested according to ASTM D412 using die C and the results are shown in FIGS. 8 and 9. In FIG. 8 the room temperature tensile strength data is displayed for all thirteen compositions. Overall there is a trend towards lower tensile strength with increasing PTFE loading. In the cage of the four pairs of samples which compare cast and milled compositions and, therefore, high and low molecular weight PTFE, the cast compositions exhibit a higher tensile strength in all but the last of the pairs (30/70). The room temperature tensile pulls of samples from 100% FKM through 50 PTFE/50 FKM exhibit a classic elastomeric curve; that is, increasing tensile strength at a relative constant slope until break, with the maximum strength at break. Tensile pulls of 60/40, 70/30, and 80/20 PTFE/FKM exhibit a classic plastic curve with a maximum strength, a drop in strength to some plateau, then eventual break at the end of the plateau, with the maximum strength occurring not at the break, but early in the pull. For this reason it is more accurate to describe the tensile strength of such a mixture of samples as peak strength, rather than strength at break. It would be expected that this transition from elastic to plastic behavior would be present in other material combinations, but as the starting materials are varied it could occur at a different relative composition.

In FIG. 9 room temperature peak strain and modulus at 100% elongation are displayed for all thirteen samples. The data show that in cast compositions which contain high molecular weight PTFE, the elongation as compared to that of a 100% elastomer composition, does not drop dramatically until the PTFE filler level has exceeded 50% by weight. The milled compositions exhibit a reduction in elongation upon addition of the low molecular weight PTFE, which increase somewhat in the 30/70 composition. It does not, however, return to its original value. In the case of modulus at 100% elongation, clearly the milled samples show higher modulus for all four pairs of compositions, with the filled compositions being lower than the 100% elastomer composition. The cast compositions, while lower in modulus, exhibit a consistent modulus value above the 50% by weight filler level.

Figure 10:
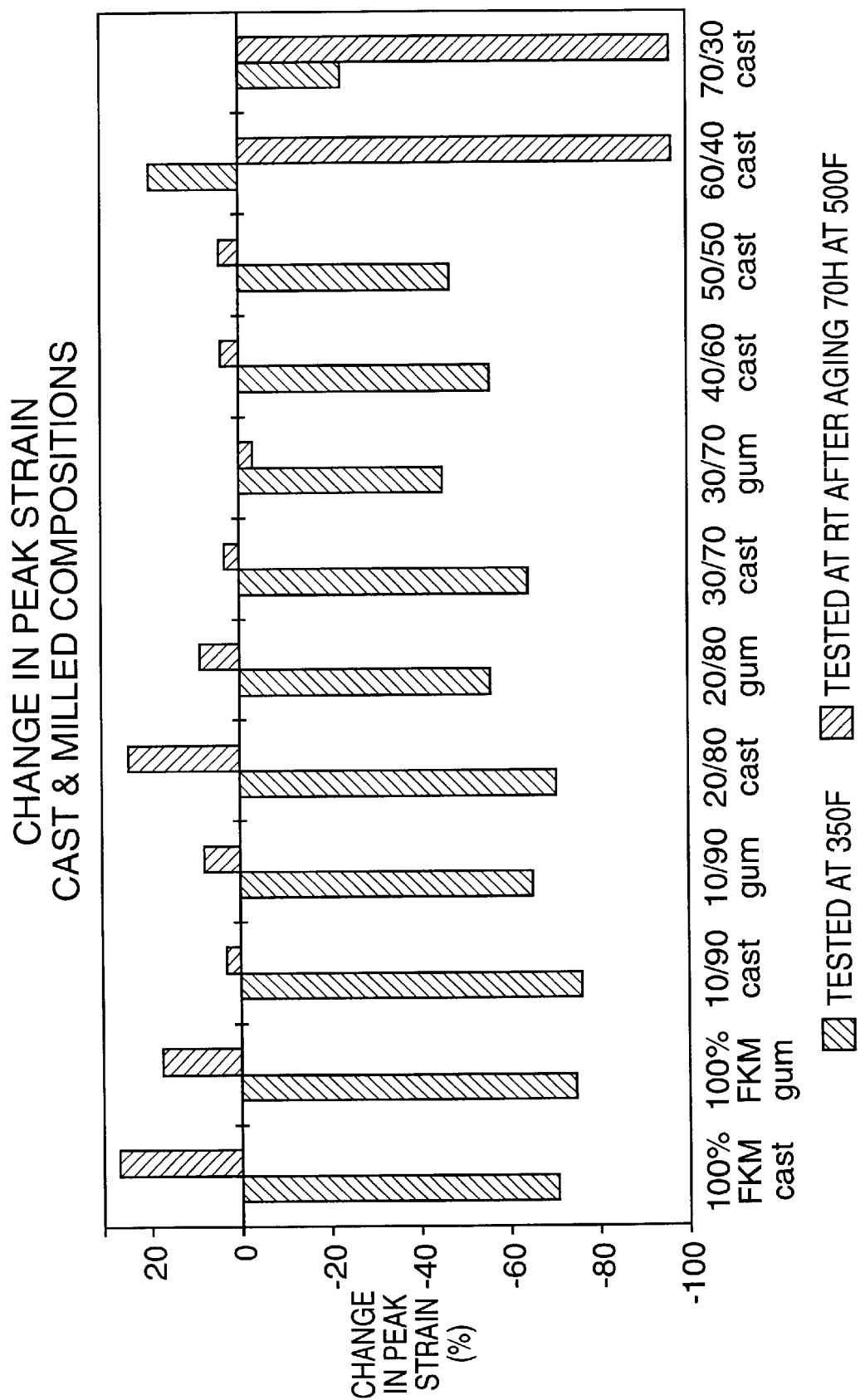
FIG. 10 is a bar graph showing the change in peak strain of cast and milled compositions.

Materials were subjected to tensile testing at elevated temperature (350° F.) as well as subsequent to air aging at 500° F. for 70 hours. The tensile values were then contrasted with the original values seen in FIGS. 8 and 9. In FIG. 10 the hot peak strain (elongation) of twelve of the original thirteen compositions can be seen. Throughout the 50% filler level, hot peak strain was roughly 50%–80% lower than the strain at room temperature. The 100% cast elastomer sample was slightly less reduced than the 100% milled sample. This is reversed for the filled samples which are somewhat less reduced than the cast samples. All exhibit dramatic loss of elongation, however. The 60/40 and 70/30 specimens exhibit plastic behavior and a relatively modest elongation at room temperature, accounting for the unusual data seen for these two samples. Slight increases in elongation after air aging are likely due to cleavage of crosslinks during the aging process. This can be seen in cast as well as in milled samples.

Figure 11:
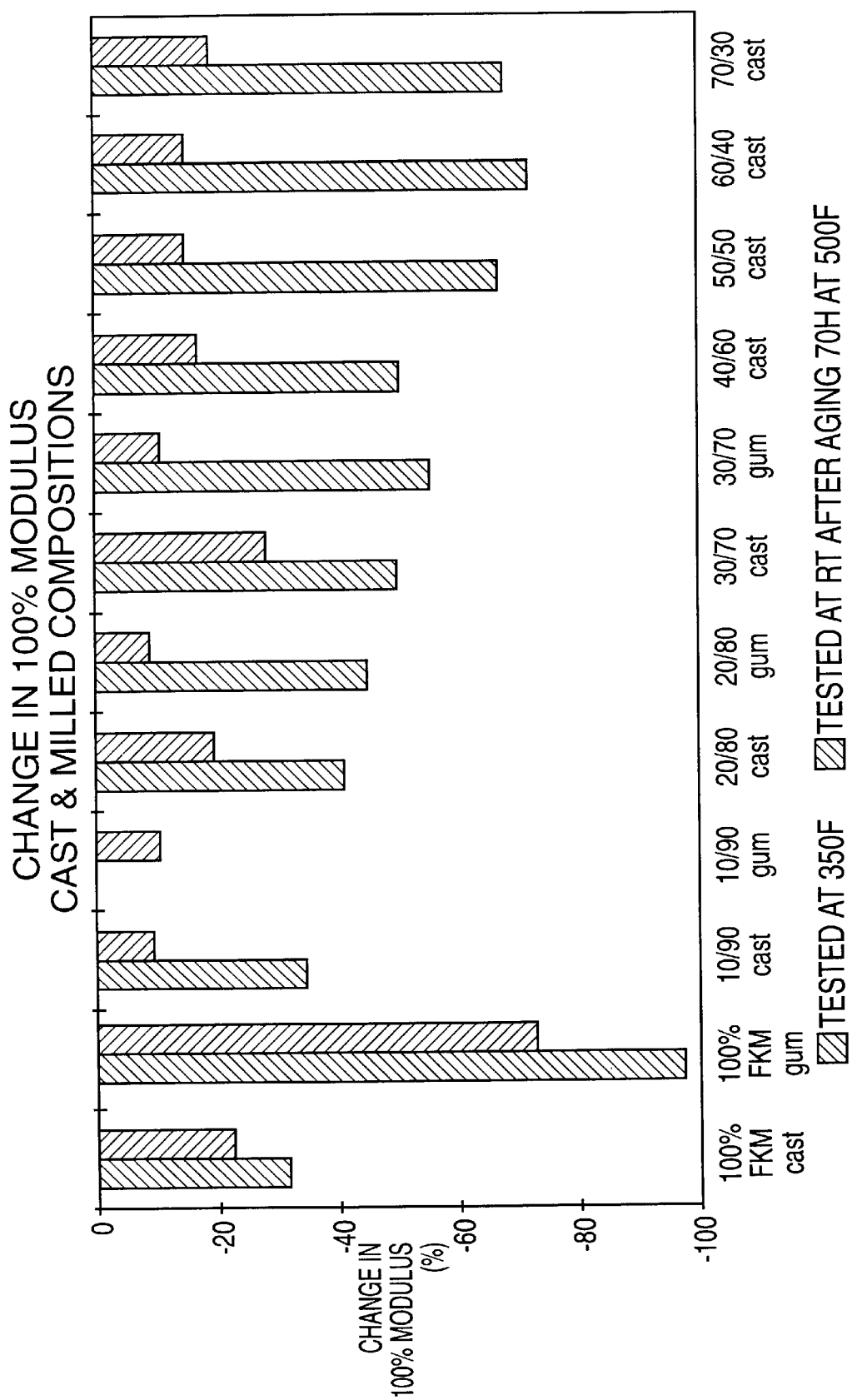
FIG. 11 is a bar graph showing the change in 100% modulus in cast and milled compositions.

In FIG. 11 change in modulus at 100% elongation for twelve of the original thirteen samples is displayed. There is a dramatic difference in retention of tensile strength at high temperature or after aging in the case of a cast vs. milled composition of pure elastomer, with the cast composition being clearly superior. Once these samples are filled with PTFE, however, the cast and milled samples are comparable in their loss of properties, whether due to hot tensile testing or the results of air aging. In the case of hot tensile testing there is a trend towards greater property loss corresponding to increasing filler PTFE content, without regard to PTFE molecular weight. In the case of property loss after air aging, there appears to be no such trend.

Figure 12:
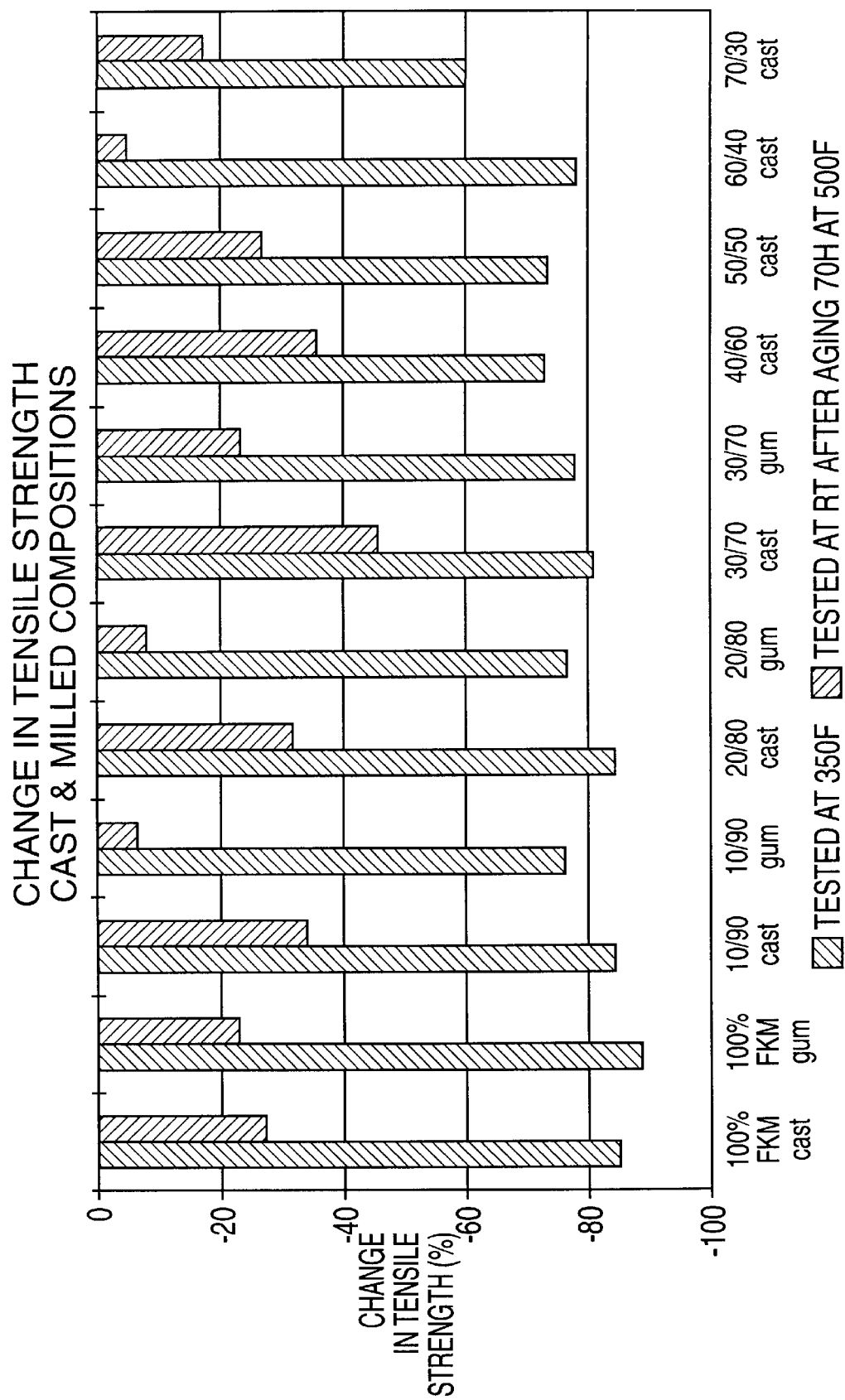
FIG. 12 is a bar graph showing the change in tensile strength in cast and milled compositions.

In FIG. 12, change in tensile strength for twelve of the original thirteen samples is displayed. Hot tensile strength is universally poor at these conditions, without regard for filler level or type, with losses of 75%–85% through the 60/40 filler level. In the case of air-aged samples, however, low molecular weight PTFE-filled gum samples experience lower losses in tensile strength than their counterparts filled with higher molecular weight PTFE. The tensile strengths of the high molecular weight PTFE filled compositions, however, were higher at room temperature at the outset.

Figure 13:
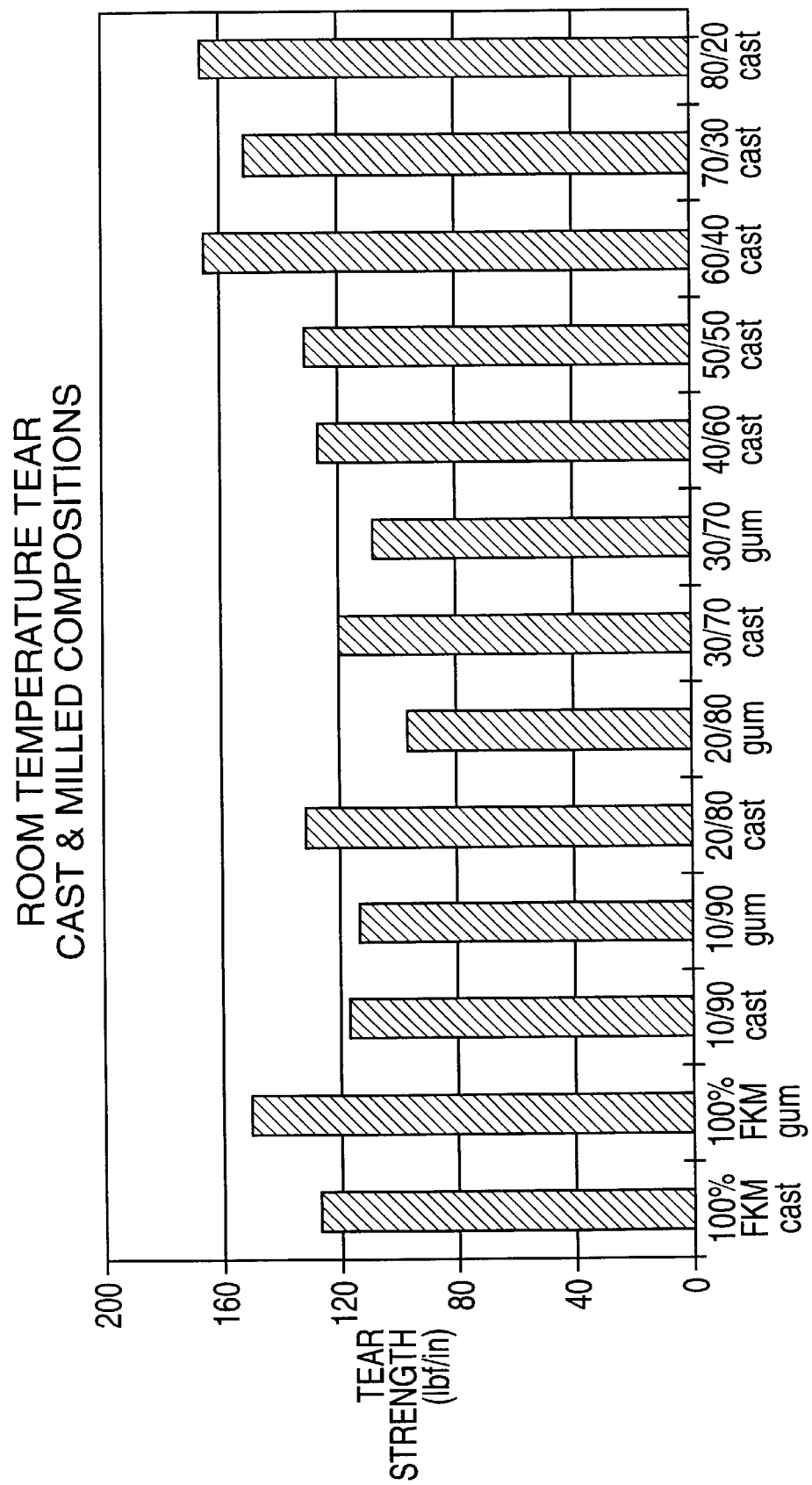
FIG. 13 is a bar graph showing the tear strength at room temperature of cast and milled compositions.

Test of strength (ASTMD624, die B) at room temperature were performed on these compositions, as well as the companion tests at elevated temperature and after air aging. In FIG. 13 tear strength through the 50% PTFE loading level ranges from about 100 to 150 lb.ft./in. The cast compositions containing 60% or more high molecular weight PTFE exhibit tear strengths at the high end of this range or higher, but are much more rigid and plastic-like in character. While the milled 100% FKM exhibits a higher tear strength than its cast companion, the high molecular weight PTFE-filled samples are slightly higher in tear strength than their low molecular weight PTFE-filled companions. The high molecular weight PTFE in the cast, filled compositions is fibrillatable, but purposefully not fibrillated, in the samples in this series. The formation of a network of PTFE fibrils would be expected to result in a significant improvement in tear strength, as demonstrated in Example 25.

Figure 14:
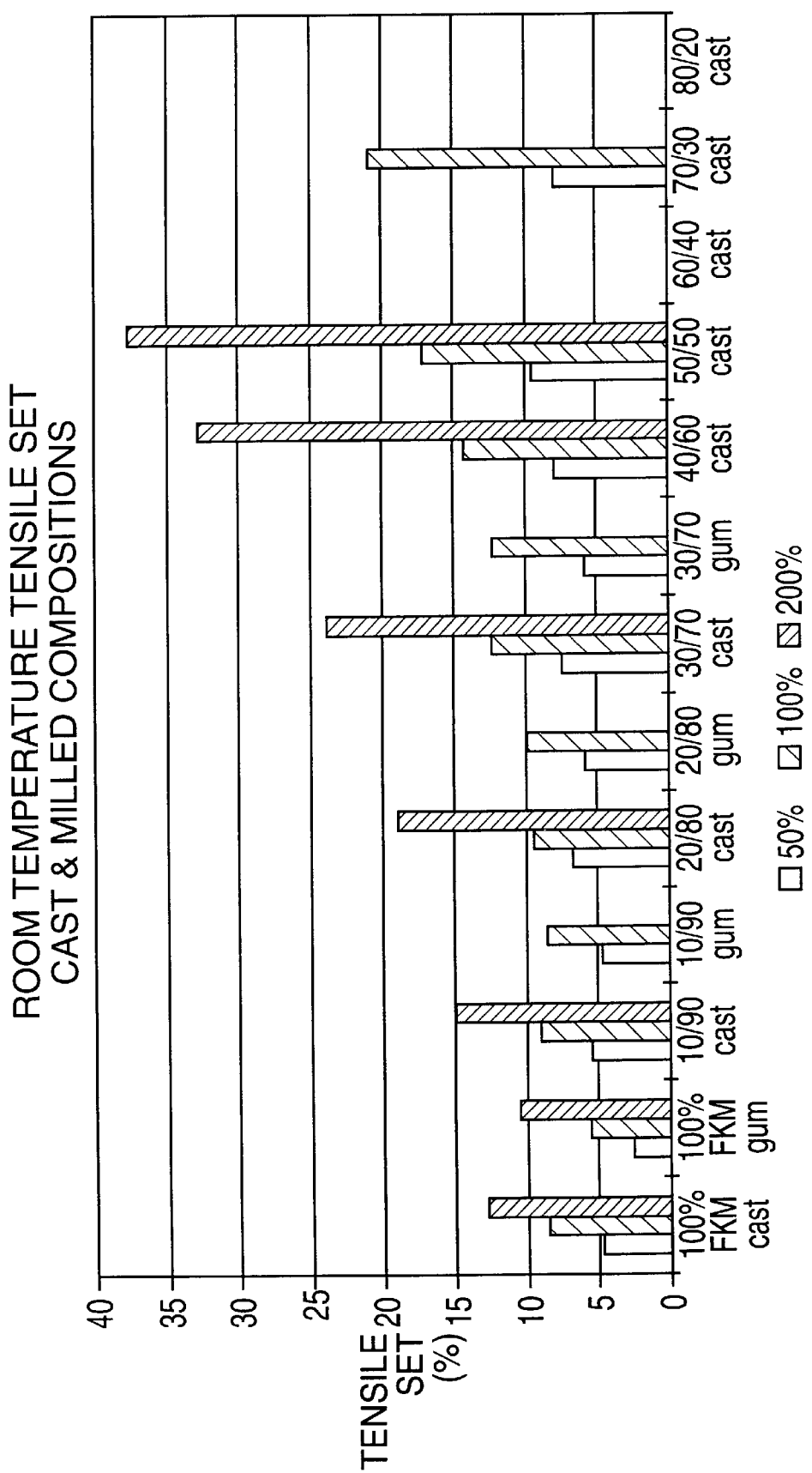
FIG. 14 is a bar graph showing the tensile set at room temperature of cast and milled compositions.

Tensile set is an important measure of elastic behavior, as it measures elastic recovery from a tensile deformation. A lower value represents a recovery close to the original dimensions of the challenged part. In FIG. 14 tensile set is displayed for the thirteen original samples at three different sample elongations, 50%, 100%, and 200%. In the compositions with a more plastic character, tensile set data is poor or non-existent. This is not surprising, given that we have subjected a plastic sample to a test which measures elastic behavior. As filler level increases, the tensile set values also increase, regardless of PTFE type. This would be the expected behavior due to other fillers as well, such as carbon black, clay, or silica. In the paired samples, the tensile set data for high molecular weight PTFE-filled samples are higher or equivalent to those of the low molecular weight PTFE-filled samples, with one very important exception. There are no 200% elongation tensile set data for the three gum samples loaded with low molecular weight PTFE. As was seen in FIG. 9, these low molecular weight PTFE-filled gum compositions exhibit low elongation relative to their cast counterparts, and they cannot withstand elongation to 200%, especially when followed by the 10 minute holding period at elongation prescribed by the tensile set test.

Figure 15:
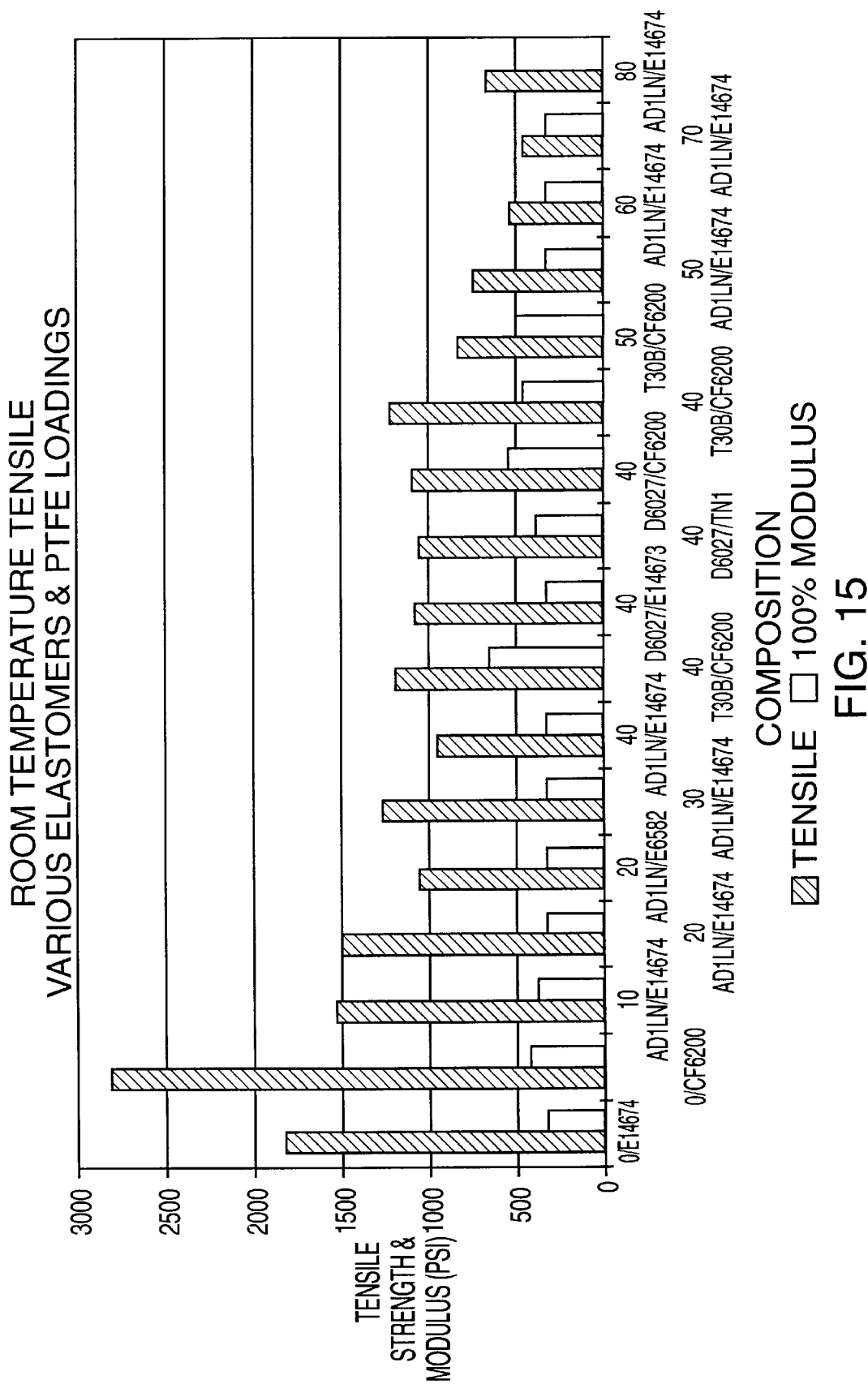
FIG. 15 is a bar graph showing the tensile strength and modulus at room temperature of various elastomers and PTFE at increasing loadings.
Figure 16:
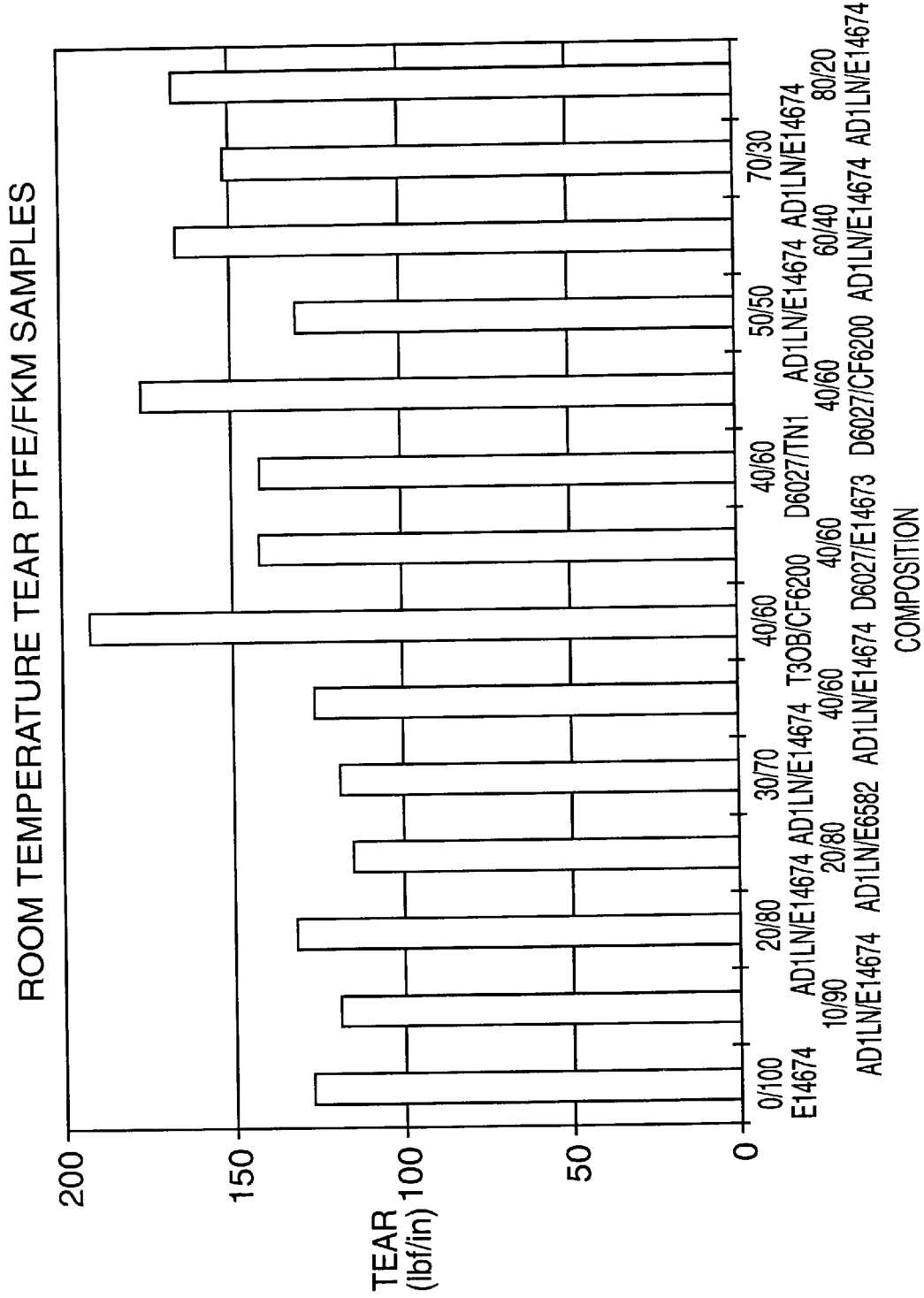
FIG. 16 is a bar graph of the tear strength at room temperature of PTFE/FKM compositions.

The cast samples detailed in this example have been compared to cast samples prepared in the course of this work as described in Example 4. FIG. 15 compares the tensile strength and modulus at room temperature of Example 21 cast samples (therefore containing high molecular weight PTFE) with cast samples derived from other high molecular weight PTFE latexes and other elastomer latexes as described in Example 1. The x-axis of this figure is arranged by increasing PTFE content. As was seen in FIGS. 8 and 9, there is a general trend of decreasing tensile strength with increasing filler loading, as well as relatively constant modulus values despite increasing PTFE content. This is an important distinction since the tensile strength is a value at failure for elastomeric samples, while modulus is a value at a given stress, but not at failure. The data in FIG. 15 show that samples exhibiting superior tensile strength and modulus in this group all contain the same elastomer, CF6200. This is the creamed version of L10180, an elastomer described in Example 1 and notable for its relatively large particle size, 0.35μ. This elastomer is also known to have a higher molecular weight than the others used in the samples presented in FIG. 15. Those skilled in the art of polymer manufacture and application realize the improvement in physical properties which follow from increases in molecular weight. They also realize the challenges presented by processing such higher molecular weight materials in conventional processes such as milling and extrusion. For many polymers, there is a cut-off in molecular weight beyond which such a polymer cannot be efficiently processed by such conventional means. Our isolation processes have no such limitations with regard to the molecular weight of the polymeric substituents, and we, therefore, may obtain the benefits in physical strength of such higher molecular weight materials without the limitations of mixing ingredients with conventional equipment. This is displayed again through tear strength data in FIG. 16. Within the group of blends exhibiting elastomeric-type tensile behavior, that is, those no higher than 50% by weight of high molecular weight PTFE, the two samples with higher tear strengths are those containing the higher molecular weight elastomer present in CF6200.

EXAMPLE 22

The first blend of co-coagulated fluoroplastics was prepared starting with an unstabilized, high molecular weight PTFE dispersion, AD058 (ICI Americas, Bayonne, N.J., 1.165 s.g., 24.8% solids, pH 3.0, surface tension 72 dynes/cm) and unstabilized. THV 330R (TFE/HFP/VF$_2$ terpolymer, Dyneon, Oakdale, Minn., 1.19 specific gravity (s.g.), 33.7% solids, pH 6.0, surface tension 68 dynes/cm). The term "unstablized" refers to a lack of hydrocarbon surfactants which are normally added after polymerization. Both dispersions were diluted to 18% solids with deionized water, then equal volumes (1.5 liters) of each were charged to a 5-liter, 3-necked flask. Glass rods (½" diameter) were inserted through both outer necks to act as baffles. A folding blade paddle was inserted in the center neck and turned via an overhead stirrer at a rate of approximately 200 rpm. The mixture coagulated after approximately eight minutes, yielding white particulate solids in a slightly milky liquid. The solids were filtered off using cheesecloth and spread evenly into a metal pan to dry in a convection oven for 15 hours at 110° C. The dried coagulate was gently broken (so as not to fibrillate the PTFE) into small hard lumps using a screen with a ⅛" open mesh.

EXAMPLE 23

Co-coagulation was accomplished in a 10 gallon stainless steel pot which was 18" tall and 15" in diameter. Baffles were used to modify the pot by welding four pieces of 1.5" stainless steel angle iron vertically and evenly spaced along the interior. The stirrer used was made from a ⅜" aluminum rod with three 1"×7" flat blades welded perpendicular to the rod and spaced equidistant around the rod. The blades were displaced along the length of the rod at 0, 7, and 12 inches from the bottom of the rod.

A 50/50 by weight mixture of high molecular weight PTFE and THV was charged to the vessel using material as described in Example 22, in the proportions and order detailed in Table 14.

TABLE 14

| Component | Volume (ml) | Description |
|---|---|---|
| PTFE | 5988 | AD057, 26.4% solids, 1.178 s.g., pH 3.6 |
| THV | 4640 | 330R, 33.7% solids, 1.19 s.g., pH 6 |
| NaCl solution | 4252 | 0.1 M |
| deionized water | 8508 | |
| sulfuric acid | 4 | 96.7% reagent grade |

After mixing for four minutes at approximately 215 rpm another 4 ml of sulfuric acid was added. After 23 minutes the mixture resembled a thin gel and after 105 minutes mixing was stopped as a fine white powder had coagulated out of the dispersion. The powder was dry to the touch in air and the remaining liquid was very clear. The powder was filtered out of the liquid with cheesecloth and air-dried overnight at ambient temperature. The composition of the isolated powder was determined by TGA to be 42% PTFE/58% THV by weight.

EXAMPLE 24

The 42/58 PTFE/THV isolated powder generated in Example 23 was extruded in a 1" 3HP single-screw extruder. The extruder was equipped with a grooved feed throat, a 1:1.4 screw, and a ¼" rod die. The screen and breaker plate were not used. The temperatures used were 200, 300, and 400° F. along the barrel and 400° F. at the die. The screw speed was 10 rpm and material extruded at 1100 psig to produce a rod which was subsequently pelletized by feeding through a chopper. The pelletized material was re-extruded with temperatures of 150, 250, and 350° F. along the barrel and a die temperature of 350° F. The melt temperature of THV 330R is about 300° F. The rod extrudate of this second extrusion was left intact.

EXAMPLE 25

A film was made from the rod extrudate of Example 24 by pressing a short length of the rod in a Carver press at 350° F. with forces of 0 tons gauge for 1 minute, to 50 tons gauge for 1 minute, then 90 tons for 2 minutes. This produced a clear film (TPP5-47B) approximately 12 mils thick. The composition of the film was determined by TGA to be 40% by weight PTFE/60% THV. Films used to compare properties of this PTFE/THV construction to more standard materials were made by laminating thinner film stock together. A 9 mil THV comparator was made from two cast films made from THV 330R, which were then laminated together in the Carver press. An 11 mil high molecular weight PTFE/FEP film was made by laminating two DF1700 films (Chemfab Corp., Merrimack, N.H.) together at the FEP faces.

Tear Strength Initiation tests (Table 15) were performed on an Instron model 4208 with a 100 pound load cell, 2"/minute crosshead speed, and 2 inch gauge length on an ASTM D624 Die C specimen. The PTFE/THV film containing fibrillated PTFE as a result of the extrusion process exhibits superior resistance to tear in these samples as compared to standard cast THV or PTFE/FEP.

TABLE 15

Tear Initiation

| Film | Thickness (mil) | Tear Initiation Strength(lb.) |
|---|---|---|
| PTFE/THV TPP5-47B | 12 | 19.9, 14.0 |
| PTFE/FEP | 11 | 5.5, 5.8, 5.5, 6.2 |
| THV | 9 | 4.7, 3.8 |

Tensile Strength tests (Table 16) were performed using an Instron Model 4208 with a 100 pound load cell, 2"/minute crosshead speed, 2" gauge length, on ½" wide specimens. While breaking strength was comparable in these samples, elongation (expressed as deformation at break) is lower in the case of a fibrillated PTFE dispersed in THV as compared to the standard cast film.

TABLE 16

Tensile Strength Test

| Film | Thickness (mils) | Breaking Strength (lb.) | Deformation at Break (in.) |
|---|---|---|---|
| TPP5-47B | 12 | 20.5, 27.6, 37.5 | 0.8, 1.0, 0.9 |
| PTFE/FEP | 11 | 25.9, 28.9, 27.5 | 12.7, 13.2, 12.8 |

Hydrostatic burst tests were performed on a Mullen Diaphragm Burst Tester. The 11 mil PTFE/FEP film burst at 65 pounds pressure, while the 12 mil PTFE/THV (with PTFE fibrillated via extrusion) film sustained 265 pounds of pressure before a small hole was initiated along an edge of the test zone. THV alone would not be expected to exhibit such an improvement in burst pressure; the improvement is attributable to PTFE fibrillation. The fibrillated PTFE in a THV matrix provides an obvious improvement in tear strength.

Tear Strength propagation tests (trouser tear) (Table 17) were performed on an Instron Model 4208 with a 100 pound load cell, 10"/minute crosshead speed, and a 2" gauge length. The fibrillated PTFE in a THV matrix provides an obvious improvement in tear strength.

TABLE 17

Tear Strength Propagation Test

| Film | Thickness (mils) | Tear Strength Propagation (lb.) |
|---|---|---|
| TPP5-47B | 12 | 10.4, 12.6 |
| PTFE/FEP | 11 | 1.5, 1.5 |

Figure 17:
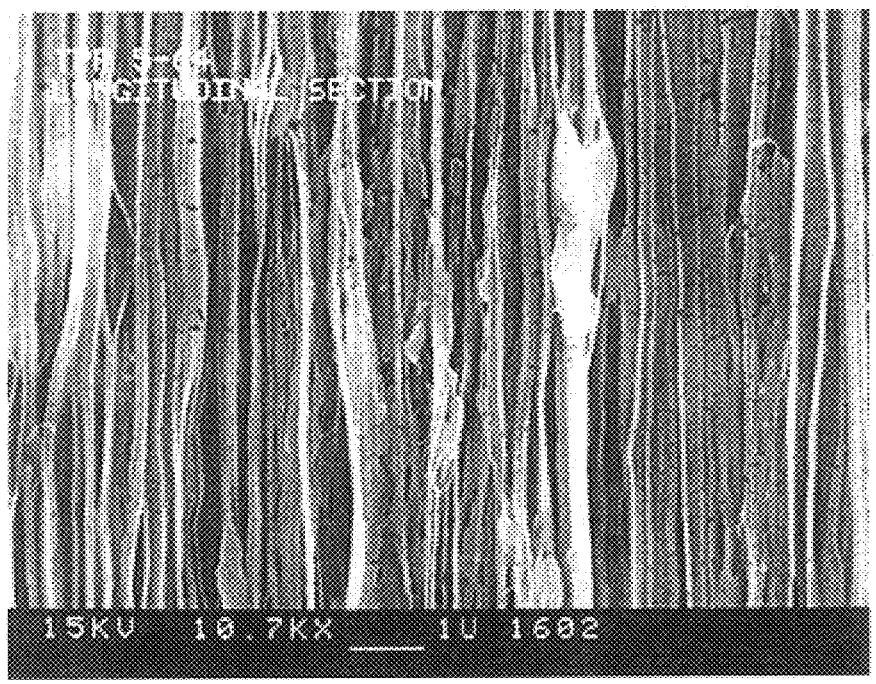
FIG. 17 is a scanning electron micrograph at 10,000× magnification of a PTFE-containing composition of the invention showing fibrillated PTFE.
Figure 18:
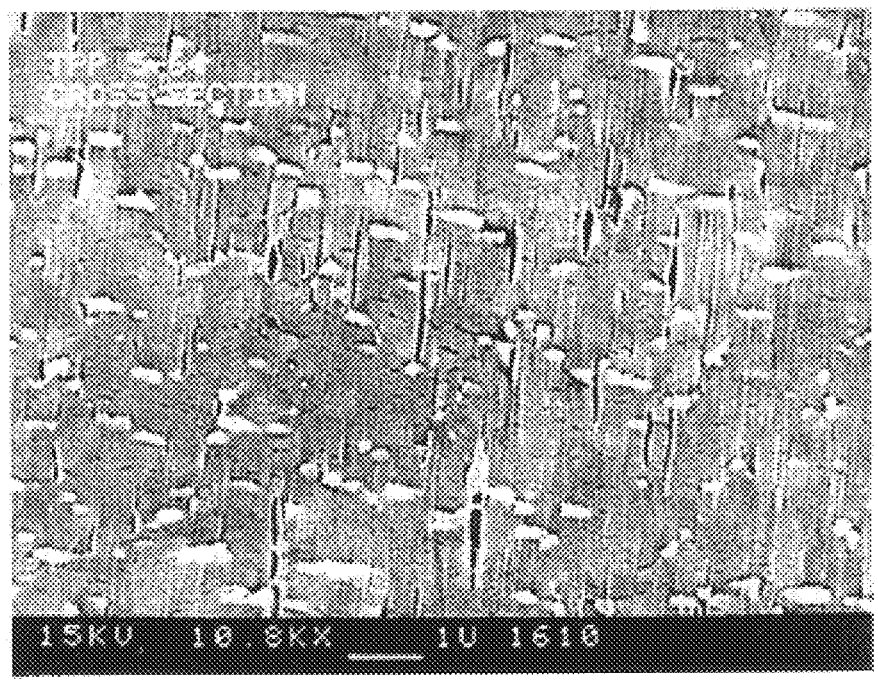
FIG. 18 is a scanning electron micrograph at 10,000× magnification of a cross-section of a PTFE-containing composition of the invention.
Figures 19, 20:
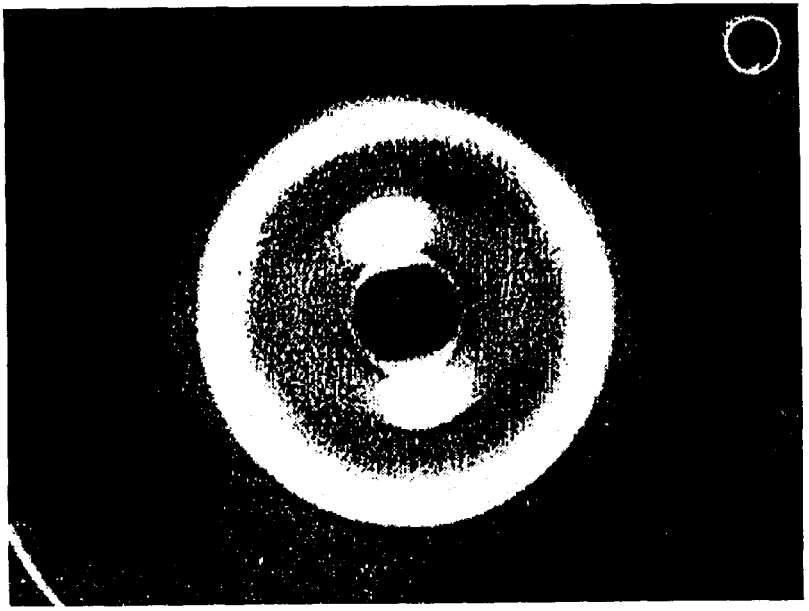
FIGS. 19 and 20 are photographs of wide-angle x-ray (WAXS) analysis of the present compositions containing PTFE.
Figure 21A:
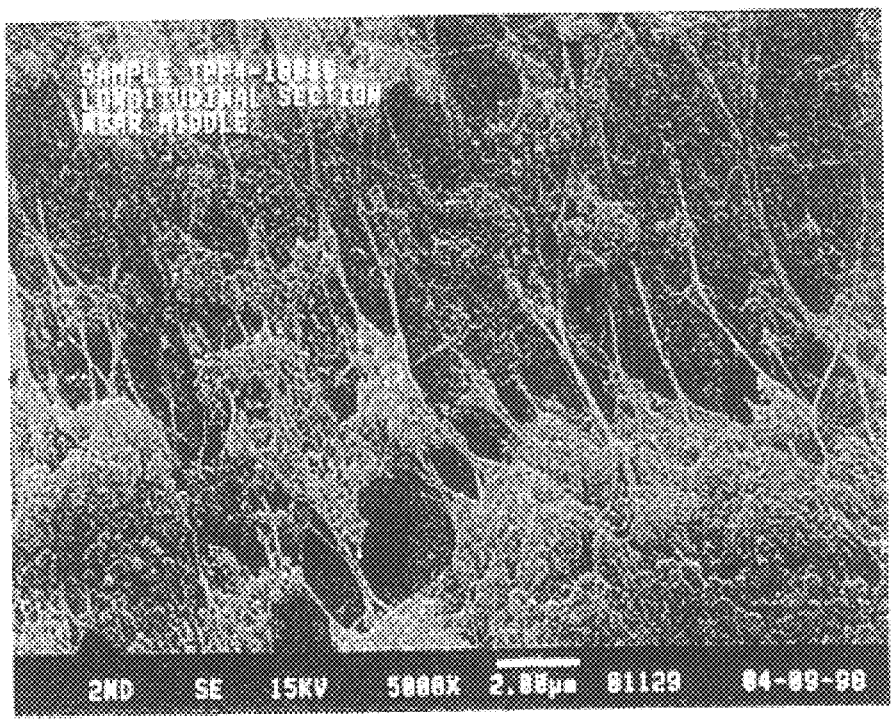
FIGS. 21A through 21I are scanning electron micrographs taken at 2,500 through 10,000×magnification of extruded compositions containing PTFE.
Figure 21B:
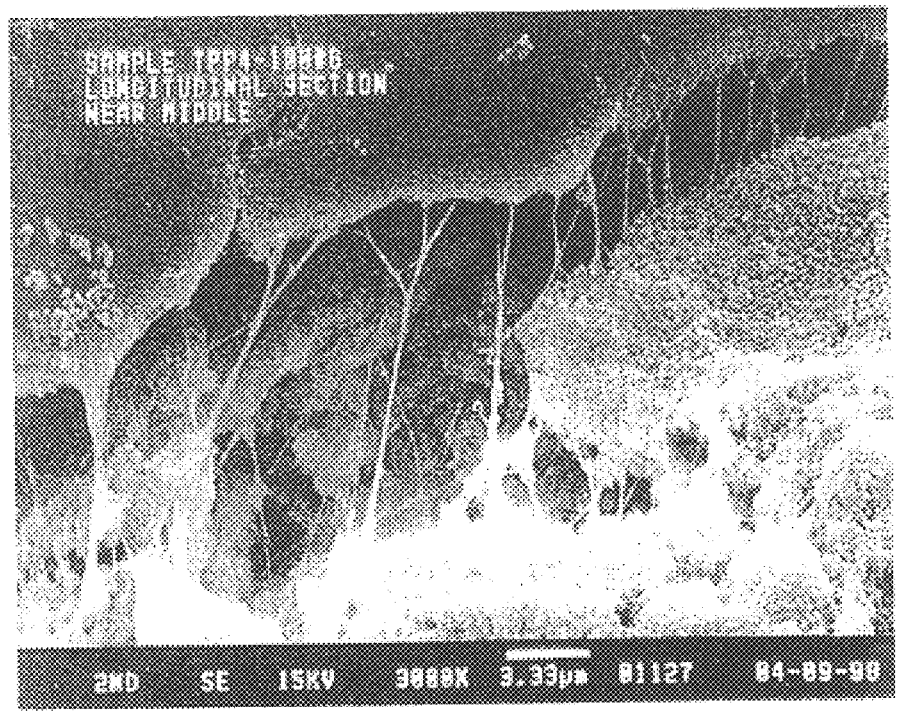
Figure 21C:
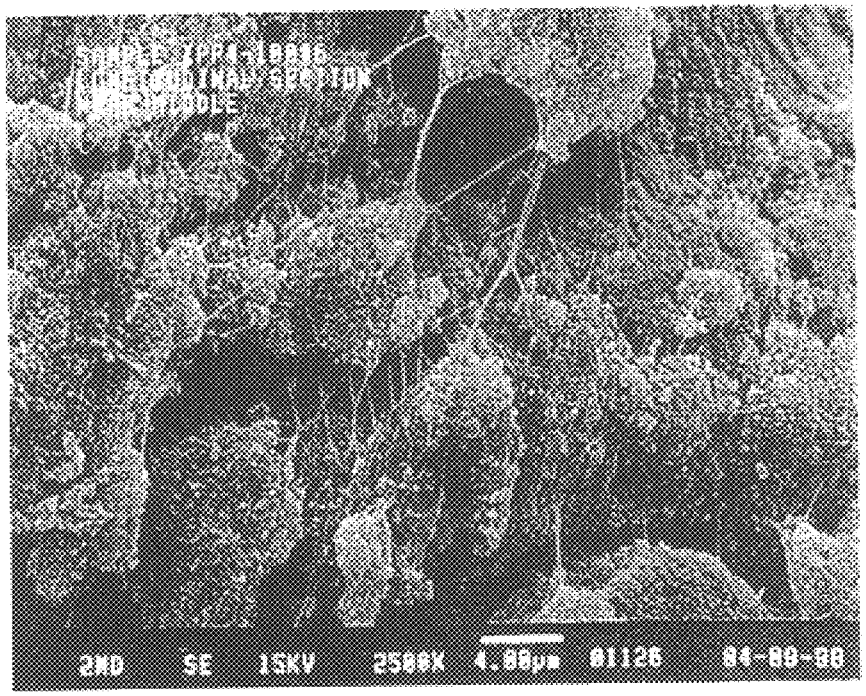
Figure 21D:
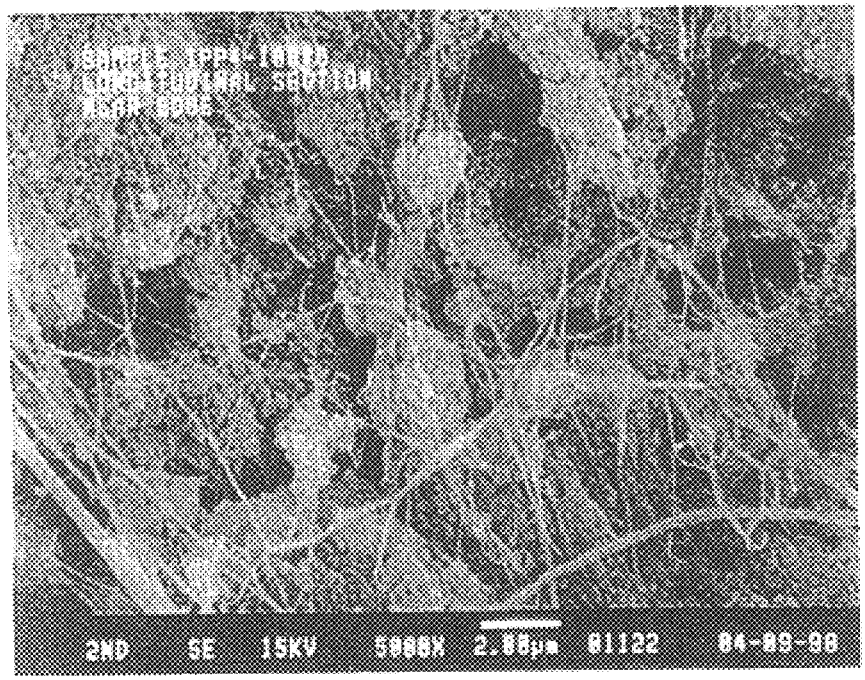
Figure 21E:
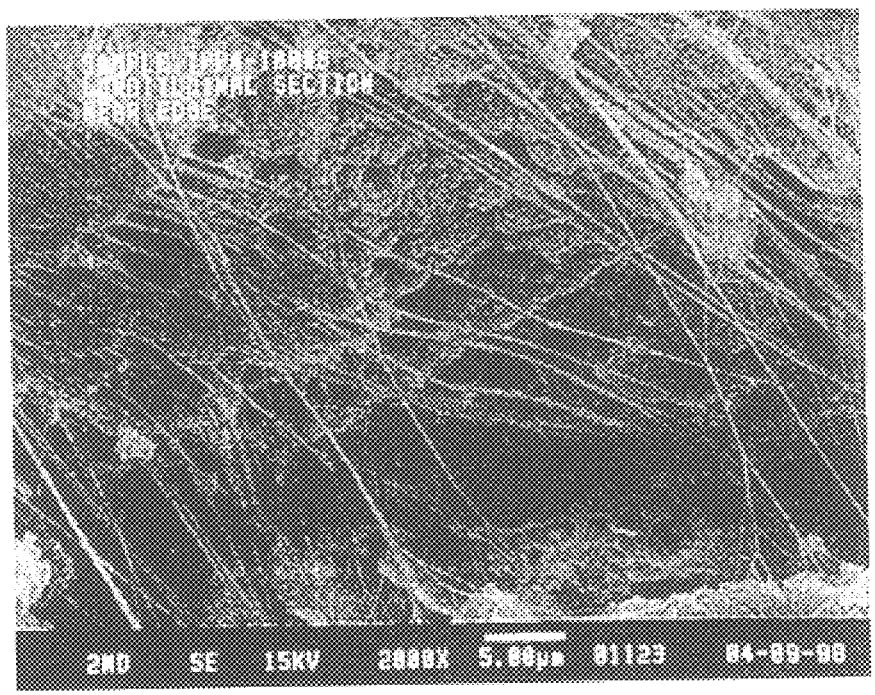
Figure 21F:
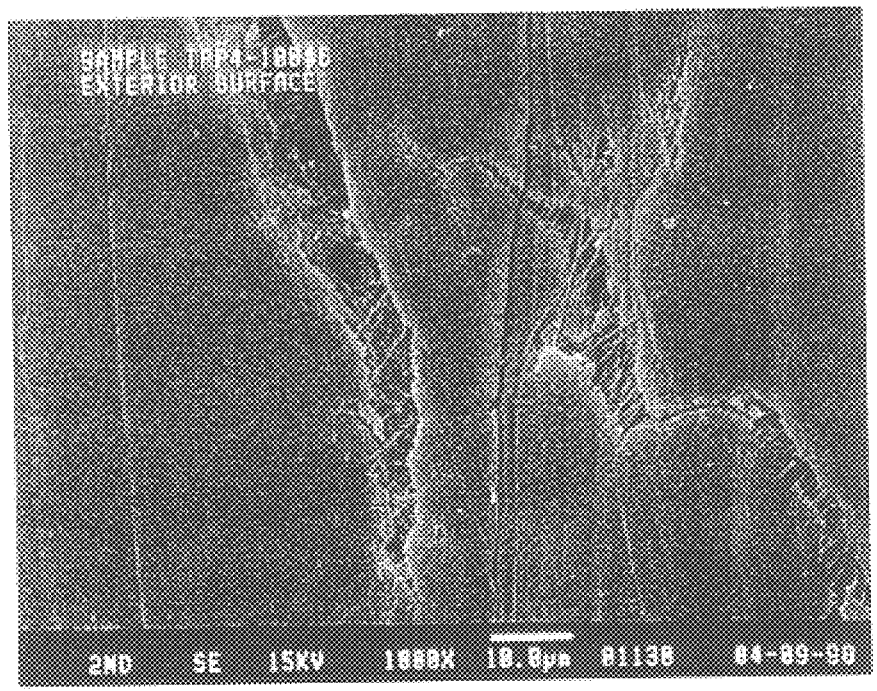
Figure 21G:
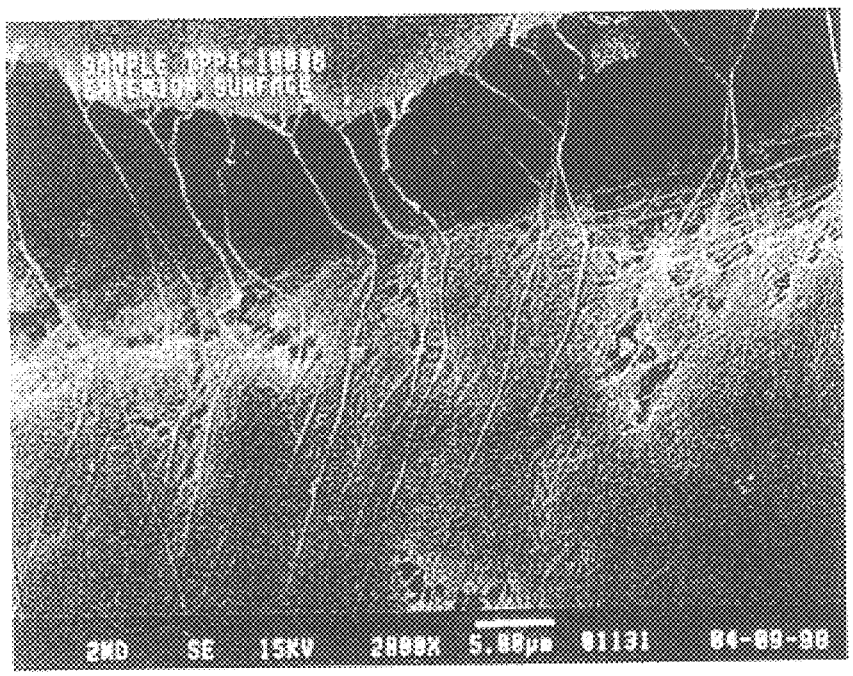
Figure 21H:
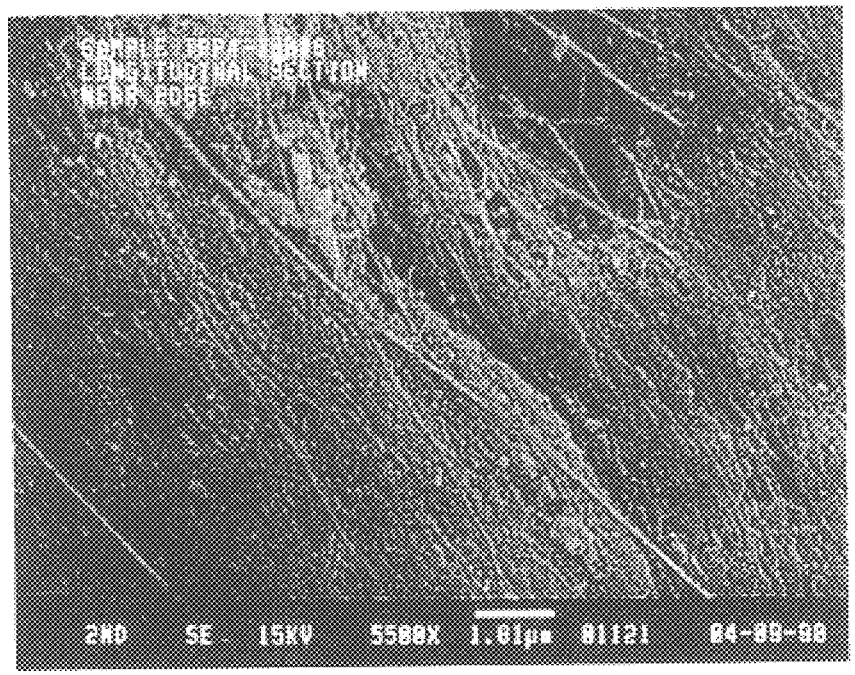
Figure 21I:
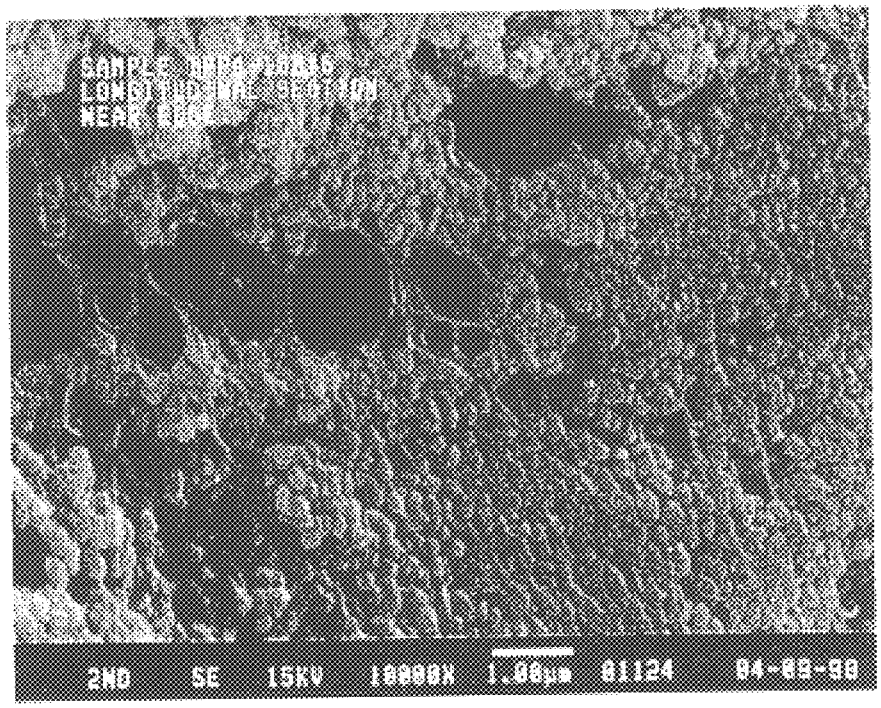

Samples of a similarly extruded rod of high molecular weight PTFE/THV were analyzed by SEM and wide-angle x-ray scattering (WAXS) in order to elucidate the oriented nature of the PTFE within the matrix. SEM was performed at Analytical Answers (Woburn, Mass.). A sample of extruded rod was prepared by microtoming directly along the axis of extrusion as well as across the face of the rod. SEM at 10,000×magnification clearly showed fibrillated, oriented PTFE along the axis of extrusion (FIG. 17), with the ends of the PTFE fibrils clearly viewed on end (FIG. 18). WAXS was performed at Virginia Polytechnic Institute (Blacksburg, Va.). Nonuniformity of the intensity of the scattered X-rays is indicative of orientation in a crystalline PTFE domain in the specimen. (FIGS. 20 and 21)

EXAMPLE 26

The aqueous formulation used in this example was 955 ml of high molecular weight PTFE (DuPont T30B, 60% solids, 1.506 s.g.) and 1121 ml THV (Dyneon 350C, 51% solids). The formulation was cast at 12 feet per minute onto a dimensionally stable carrier with a PTFE surface, then dried in a vertical oven. The drying zones were 245° F., then 480° F., proceeding vertically. After eight layers were cast onto the carrier the material was calendered twice at 1500 psi gauge, 10 feet per minute, and 180° F. Two pieces of the coated and calendered carrier were sealed to each other at 350° F., 80 psig, for 30 seconds in a Carver press. A two-ply film was stripped from between the two carriers, then fused in a convection oven at 660° F. for 30 seconds. Two pieces of the two-ply film were then heat sealed together in a Carver press at 350° F. for 1 minute, yielding a well-consolidated 7.5 mil film.

Tensile tests were performed on the 7.5 mil cast and pressed film on an Instron Model 4208 with a 100 pound load cell and crosshead speed of 0.5"/minute. Gauge length was 0.5 inches. Tensile data for these samples are presented in Table 18 and are compared to a similar composition which was extruded, then pressed (Example 25), resulting in fibrillation of PTFE and reinforcement of the matrix. The improvement in break strength seen in the table for the extruded sample is due to this reinforcement.

TABLE 18

Tensile Strength of PTFE/THV Compositions

| Film | Thickness (mils) | Test Speed (in./min.) | Break Strength (lb.) | Deformation at Break (in.) |
|---|---|---|---|---|
| Example 25 extruded & pressed | 12 | 2.0 | 20.5, 27.6, 37.5 | 0.8, 1.0, 0.9 |
| Example 26 cast & pressed | 7.5 | 0.5 | 4.2, 5.0 | 0.09, 0.145 |

EXAMPLE 27

PTFE and THV were co-coagulated from unstabilized dispersions using the same equipment described in Example 23. Materials were added as shown in Table 19.

TABLE 19

| Component | Volume (ml) | Description |
|---|---|---|
| PTFE | 5189 | AD057, high molecular weight |
| THV | 4640 | 330R |
| NaCl solution | 4252 | 0.1 M |
| deionized water | 8508 | |

After approximately four minutes of mixing, 4 ml of $H_2SO_4$ was added. After mixing for a total of 70 minutes, a fine, air dry, white powder had coagulated. The powder was filtered and dried in a manner similar to that in Example 23. TGA of the powder indicated a final mixture of 52% by weight PTFE and 48% by weight THV.

The coagulated powder was lubricated by mixing 140 grams of the powder with 125 g deionized water and 70 g of a 6% by weight Triton X-100 in water solution. The mixture was charged to a ball mill and mixed for 26 hours. The mixture was then air-dried for 24 hours, followed by drying in a vacuum oven for seven hours at 110° C.

The lubricated powder was processed through an Instron model 3213 capillary rheometer. The capillary used was 0.8853 inches long and 0.0595 inches in diameter. The rheometer was run at 90° C., well below the melt temperature of both polymers, and with a plunger rate of 2 inches per minute. The applied shear stress was 123 pounds per square inch, and the shear rate was 178 sec$^{-1}$. TGA of the extrudate indicated a final mixture of 51% by weight PTFE and 49% by weight THV, verifying that the mixture was successfully processed without substantially altering the ratio of the two polymer components.

SEM of the extrudate clearly showed fibrillation within the matrix and even in fissures seen in photographs of the exterior of the extrudate.

EXAMPLE 28

This example demonstrates solvent-lubricated extrusion of PTFE/THV, below the melting points of both polymers. A co-coagulation of PTFE and THV was performed as described in Example 22 with the relative proportions of the polymers at 70% by weight PTFE and 30% by weight THV. The dried powder was mixed with about 17% by weight Isopar H as a lubricant and mixed on a drum roller for 20 minutes, which is standard for PTFE processing. The lubricated crumb was then preformed at 210 psig (also standard for PTFE processing) into a tube shape with an inner radius of 0.5", outer radius of 1.75", and overall length of 4". The preform was quite smooth and easy to feed into the rain extruder. Extrusion was at 3750 psgi with a 1.75" ram through a die at 115° F. SEM of the extrudate (FIGS. 22A–22I, 2500 to 1 0,000×) shows the beginning of fibrillation, which is preferentially oriented as a result of the extrusion.

EXAMPLE 29

A blended composition of a 40/60 wt % PTFE/FKM was coagulated with curative from dispersion, washed, dried, and isolated. The high molecular weight PTFE used was AD310 (ICI, Bayonne, N.J.), 29.8 wt. % solids aqueous dispersion; the FKM used was E14674 terpolymer (Dyneon Corp.) (Example 1), 20.2 wt. % solids aqueous dispersion. The curatives used were $Mg(OH)_2$ as the acid acceptor (Phillips milk of magnesia, Bayer Corp., 7.8 wt. % solids aqueous dispersion), and Viton Curative 50 (VC50, DuPont, Wilmington, Del.). VC50 is a pelletized mixture of bisphenol AF and benzyltriphenylphosphonium chloride/bisphenol AF salt. The Viton Curative 50 was dispersed by grinding it in a mortar and pestle to a fine powder, and then sonicating it in isopropanol, 4.8 g VC50 per 100 ml isopropanol (VC50 dispersion). The Triton X-100 was used as a 25 wt % in water solution. Other curing additives which could be incorporated include $Ca(OH)_2$.

The co-coagulation vessel was a 5l stainless steel vessel. The pneumatic mixer used was fitted with a 2¾" inch propeller type blade, with a speed of about 600 rpm. 2000 g of 1 M KCl was charged to the vessel, and stirring was started and was continuous during all subsequent additions. $Mg(OH)_2$ dispersion (72.5 g) was charged to the vessel, followed by the AD310 dispersion (45 ml) and the VC50 dispersion (120 ml). A blend of 1200 g E14674 dispersion and 400 g AD310 dispersion was made, then poured into the co-coagulation vessel slowly, taking 2 minutes for complete addition. More AD3 10 dispersion (60 g) was then added. Triton X-100 solution (5.4 g) was added and the mixture was allowed to stir for 4 minutes to redisperse some of the solids which had appeared floating on the surface. The coagulated material was filtered off using multiple layers of cheesecloth, and then washed twice with deionized (DI) $H_2O$ by adding water, mixing, and refiltering. The sample was then dried in a vacuum oven at 105° C. for 12 hours. Co-coagulation of these materials can be done without the $Mg(OH)_2$, without the VC50, or without either curing component. This co-coagulation provided a mixture with the formulation shown in Table 20, and was crumb-like in consistency.

TABLE 20

Formulation for Curative Containing Coagulated Dispersion

| | phr |
|---|---|
| E14674 | 100 |
| AD310 | 70.8 |
| $Mg(OH)_2$ | 2.4 |
| VC50 | 1.9 |

Oscillating disk rheometry (ODR) was performed on the above sample, (Monsanto Rheometer 100, 350° F., 1° arc) and showed a $t_{s1}$(scorch time) of 21 minutes, a t(90) (time to 90% of maximum torque) of 108 minutes, and a total increase in torque of 16 lb-in (per ASTM D-2084). For samples analyzed with no VC50 and/or no $Mg(OH)_2$, there was no increase in torque. The sample from Table 20 (12 g) removed from the ODR, which contained a complete cure system, retained 92% of its weight after being subjected to methylethylketone (MEK, 100 ml, with stirring) for 15 hours at room temperature. A sample removed from the ODR of material similar to that in Table 20, but which only contained VC50 and lacked $Mg(OH)_2$ retained only 39.2% of its weight after similar MEK exposure, indicating a lower degree of cure.

EXAMPLE 30

A coagulation was done using the same materials as in Example 29. The VC50 and the milk of magnesia were premixed before adding to the coagulation mix, and will be referred to as the "VC50 curative blend". The VC50 curative blend was produced by sonicating the VC50 (4.6 g, ground) and the milk of magnesia (30 g) in isopropanol (100 g) until there were no large (>1 mm) visible chunks of VC50. The VC50 curative blend was more stable towards settling than the VC50 dispersion made in Example 29, and did not show signs of settling after two minutes.

The coagulation vessel used was a Waring blender. A salt solution was charged to the blender vessel (650 g, 1 M KCl), and the blender set to high power for the duration of the coagulation. Some of the AD310 dispersion was added (15 ml), interspersed with additions of the VC50 curative blend (105 ml). Order of addition was 5 ml AD310, 45 ml VC50 curative blend, 5 ml AD310, 60 ml VC50 curative blend, 5 ml AD310. The premixed AD310 (82 g) and E14674 (248 g) was then poured steadily into the blender. The total addition time was 1 minute. Another addition of AD310 (13 g) was made, followed by Triton X-100 (1 g of 25 wt % ×100 in water).

The coagulate was filtered off using a milk filter (Agway), washed three times with DI water (300 ml) with reblending and filtering each time, and then dried. The composition of the coagulate is shown in Table 21.

TABLE 21

Formulation for Curative Containing Coagulated Dispersion for Example 30

|  | phr |
| --- | --- |
| E14674 | 100 |
| AD310 | 66 |
| Mg(OH)$_2$ | 3 |
| VC50 | 9.2 |

Oscillating disk rheometry (ODR) was performed on the above sample, (Monsanto Rheometer 100, 350° F., 1° arc), and showed a $t_{s1}$ of 12.2 minutes, a t(90) of 38 minutes, and a total increase in torque of 29.8 lb.-in., an improvement in cure speed and final torque as compared to Example 29. For samples analyzed with no VC50 and/or no Mg(OH)$_2$, there was no increase in torque. The sample (12 g) removed from the ODR which contained both VC50 and Mg(OH)$_2$ retained 98% of its weight after being subjected to methylethylketone (MEK, 100 ml, with stirring) for 28 hours at room temperature. A sample (12 g) removed from the ODR of material which only contained VC50 and lacked Mg(OH)$_2$ retained only 31.2% of its weight after similar MEK exposure, indicating a lower degree of cure.

EXAMPLE 31

A 40/60 wt. % blend of AD310/E14674 was isolated similarly to Example 29. It consisted of the formula in Table 22, which contained no acid acceptor, so was therefore incapable of curing.

TABLE 22

Formula for Coagulated Dispersion for Example 31

|  | phr |
| --- | --- |
| E14674 | 100 |
| AD310 | 70.8 |
| VC50 Viton Curative 50 | 1.9 |

This material was extruded through a 0.03" capillary (L/D=66) at 150° C. using a capillary rheometer (Instron Corp., Model 3213, Canton, Mass.) at an extrudate speed of 23 inches/min.

Figure 22:
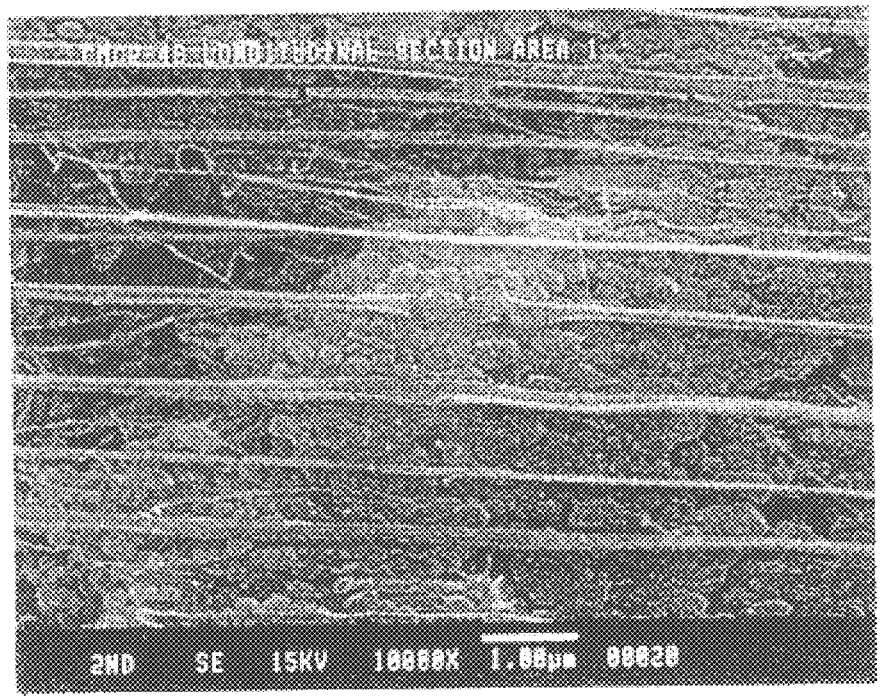
FIG. 22 is a scanning electron micrograph of a PTFE-containing composition which has been extruded, and which then had the non-PTFE component extracted.

Some of this extrudate was subjected to MEK extraction in a beaker with stirring for 12 hours at room temperature. The sample retained 38% of its initial weight, and was determined via TGA to be 95 wt. % PTFE. The sample was prepared for SEM analysis by hardening with osmium tetroxide, embedding in epoxy, and cutting in a microtome to expose a fresh surface just inside the edge of the extracted extrudate. SEM photographs at 10,000×magnification clearly show individual PTFE particles, as well as particles which have extended into fibers (FIG. 22). These fibers were oriented in the machine direction of the extrudate.

EXAMPLE 32

Figure 23:
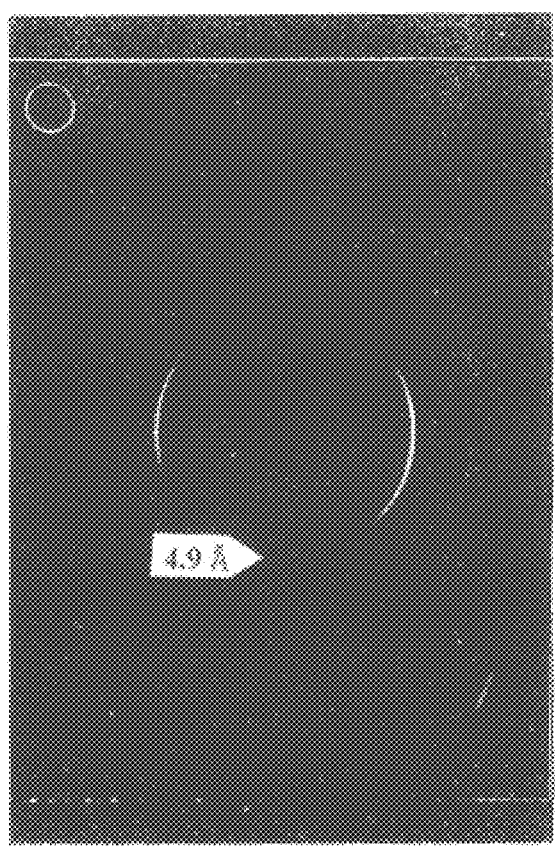
FIG. 23 is a photograph of a WAXS analysis of a PTFE-containing composition which has been extruded.

The isolated and processed material from Example 31 was analyzed by x-ray diffraction. Wide-angle X-ray scattering (WAXS) was performed on the above sample, and based upon the azimuthal dependence of the 4.9 Å reflection, it was determined that there was some orientation of the PTFE in the axial direction of the extrudate (FIG. 23). WAXS was performed on a Phillips model PW1720 generator with a Warhus camera. Nickel-filtered CuKα radiation was used with a wavelength of 1.542 Å and a pinhole collimator with a 0.020 inch diameter.

EXAMPLE 33

A co-coagulation of a 50/50 wt. % blend of AD310 aqueous dispersion (29.8% solids) and E6582 aqueous dispersion (31.6% solids, copolymer, Dyneon Corp.) was produced using a 5 gallon pail as the coagulation vessel. The mixer was an electric (0.5 Hp) Laboratory Dispersatore (Series 2000, model 84, Premier Mill Corp, USA). A salt solution (9 liters, 1.12 M NaCl) was charged to the 5 gallon pail, and stirring was started and was maintained throughout the co-coagulation. A premixed blend of AD310 aqueous dispersion (2346 g) and E6582 aqueous dispersion (2373 g) was poured steadily into the pail. The coagulated material was filtered through multiple layers of cheesecloth, and returned to the pail for repeated blending (3 times with tap water, then twice with deionized water, filtering through cheesecloth after each step), then dried. Final yield was 89%.

Figure 24:
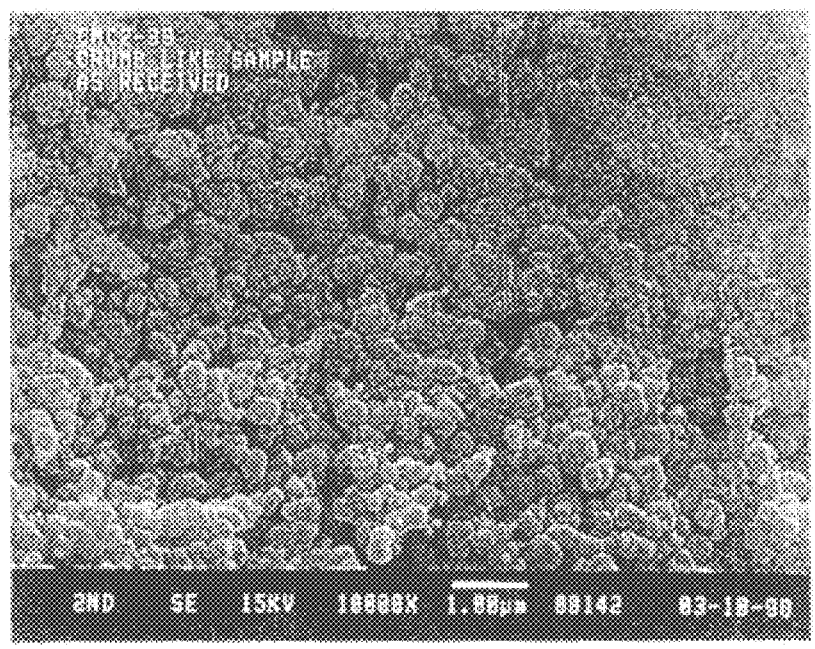
FIG. 24 is a scanning electron micrograph of a coagulated 50/50 (wt %) PTFE/FKM composition of the present invention.

To verify that isolation had occurred without fibrillation of the high molecular weight PTFE, a sample of this coagulated 50/50 AD310/E6582 material was sputter-coated with gold and examined by SEM. The SEM photographs showed that the sample contained essentially no evidence of fibrillation (FIG. 24).

Figure 25:
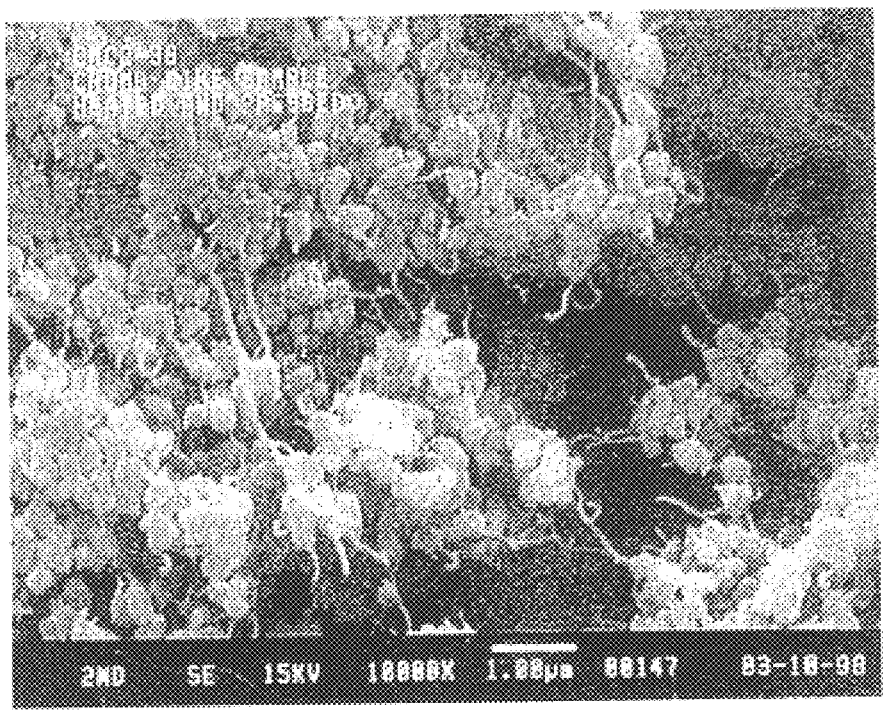
FIG. 25 is a scanning electron micrograph of a 50/50 (wt %) PTFE/FKM coagulate which was hand-pressed, inducing fiber formation of the PTFE.

A sample of this coagulated 50/50 AD310/E6582 material was then heated to 100° C. and hand-pressed between two steel plates (one of which was the SEM sample holder) in order to produce a smooth sample for analysis. The sample was then sputter-coated with gold and examined by SEM. The photographs showed that the sample contained evidence of fibrillation of the PTFE particles, which had occurred due to the applied hand pressure (FIG. 25).

EXAMPLE 34

In this example, Aclon PCTFE (polychlorotrifluorethylene modified with sufficient VF$_2$ and other comonomer to render the polymer fully amorphous; approximately greater than 18 wt. % VF$_2$) has been substituted for FKM. A co-coagulation of a 50/50 wt. % blend of PTFE and PCTFE was performed using a Waring blender as the co-coagulation vessel. A salt solution (395 g of 1.3 M NaCl) was charged to the blender, and the blender was set to high power and remained on high throughout the coagulation. The PTFE aqueous dispersion (167 g, AD310, ICI, Bayonne, N.J., 28.7 wt. % solids) was mixed with the PCTFE aqueous dispersion (105 g Aclon, 400 series, Allied Signal, Specialty Films, Morristown, N.J., 47.5 wt % solids) and diluted with deionized water (122 g). This blended aqueous dispersion was poured steadily into the blender, until addition was complete. The coagulated sample was vacuum-assist filtered with wet-strengthened filter paper (Whatman no. 114). The coagulated material was reblended and filtered three times with tap water, then twice with deionized water, and then dried in a vacuum oven at 90° C. for 24 hours.

Figure 26:
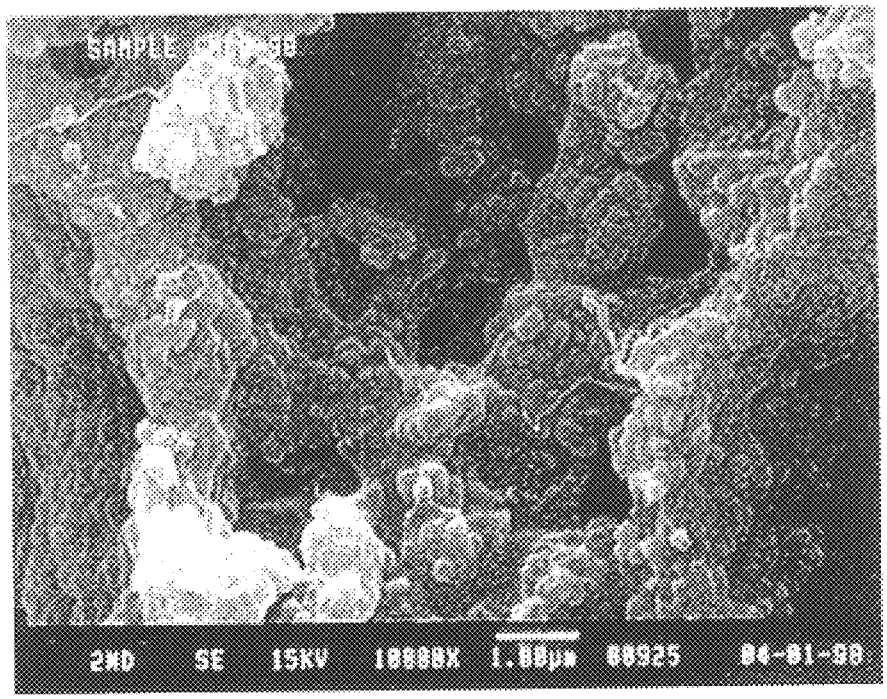
FIG. 26 is a scanning electron micrograph at 10,000× magnification of a coagulated PTFE-containing composition of the invention.

A sample of this coagulated AD310/Aclon material was sputter-coated with gold and examined by SEM at 10,000× magnification. The micrographs show that the sample contained essentially no evidence of PTFE fibrillation (FIG. 26).

Figure 27:
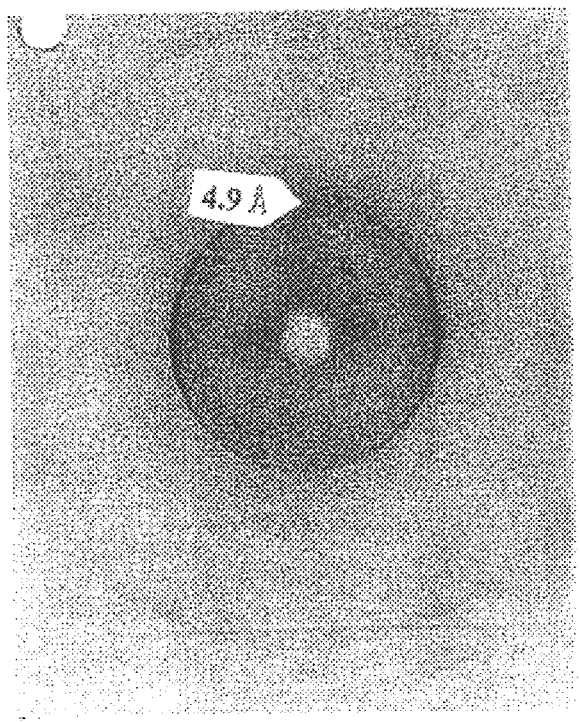
FIG. 27 is a photograph of a WAXS analysis of an extruded PTFE-containing composition.

This material was extruded through a 0.03" capillary (L/D=66) at 150° C. using a capillary rheometer at an extrudate speed of 38 in/min. As the material was extruded, it was drawn at 180 in./min. WAXS was performed on this extruded sample and indicated orientation of the PTFE crystalline regions, based upon the azimuthal dependence of the 4.9 Å reflection (FIG. 27).

EXAMPLE 35

A 40/60 wt. % blend of T30B (60 wt. % solids high molecular weight PTFE) and FKM (L10180, Example 1) was mixed with diamine curatives according to Example 4. The material was cast onto a carrier similar to Example 4, but after leaving the dispersion bath, the carrier passed between two rotating metering bars (rotating with web, #36, rotating 3×speed of web). The rotating metering bars were employed to gauge the sensitivity of the PTFE to fibrillation by shearing during the casting process outlined in Example 4. Seven layers were cast onto the carrier, with a total pickup of 4 mil, and a web speed of 2–4 feet per minute. The material was stored on a roll, with no interleaving paper.

Figure 28:
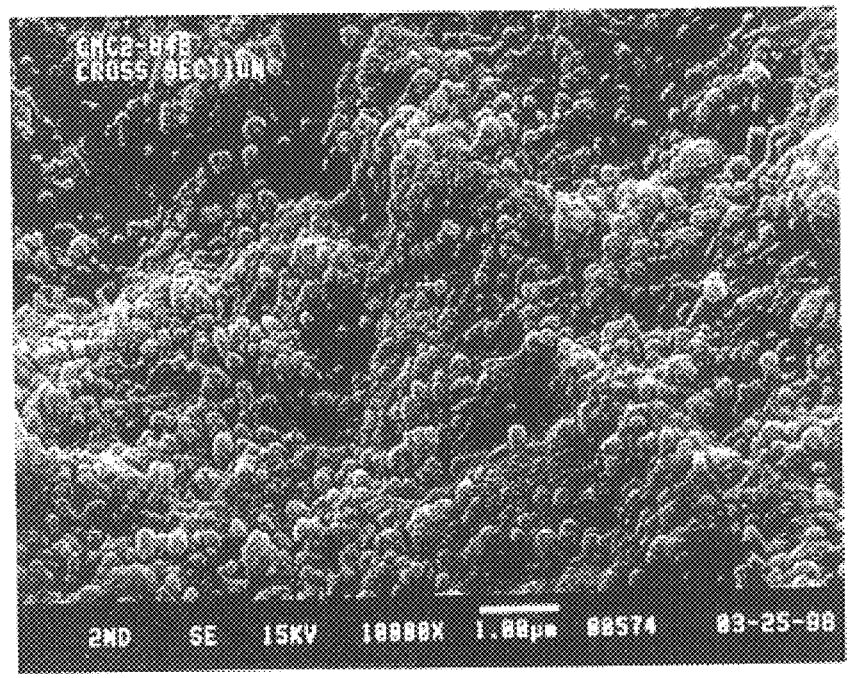
FIG. 28 is a scanning electron micrograph of a cross-section through a cast PTFE-containing composition of the invention, which was prepared by a freeze-fracturing technique.

In order to check for signs of fibrillation of the PTFE in this sample, some of the FKM matrix was dissolved away, and SEM photos were taken. A sample of the cast film (consisting of 5–7 consolidated layers) was subjected to refluxing MEK for 24 hours, with stirring. The sample was removed and dried. Thermal gravimetric analysis (TGA) showed the sample to be a 56/44 wt. % blend (PTFE/FKM), at 67.5% of its initial weight. SEM photographs taken of the surface and of cross sections produced by freeze-fracturing showed that the sample contained no evidence of PTFE fibrillation (FIG. 28).

EXAMPLE 36

A 50/50 wt. % blend of AD310/E14674 was isolated similarly to Example 31. It consisted of the formula in Table 23 and contained no acid acceptor, so was therefore incapable of curing.

TABLE 23

Formula for Coagulated Dispersion for Example 36

|  | phr |
|---|---|
| E14674 | 100 |
| AD310 | 100 |
| VC50 | 3.7 |

This material was extruded through a 0.03" capillary (L/D=66) at 150° C. using a capillary rheometer at an extrudate speed of 16 ft/min. The extrudate was drawn at 50 ft/min as it was extruded.

Figure 29:
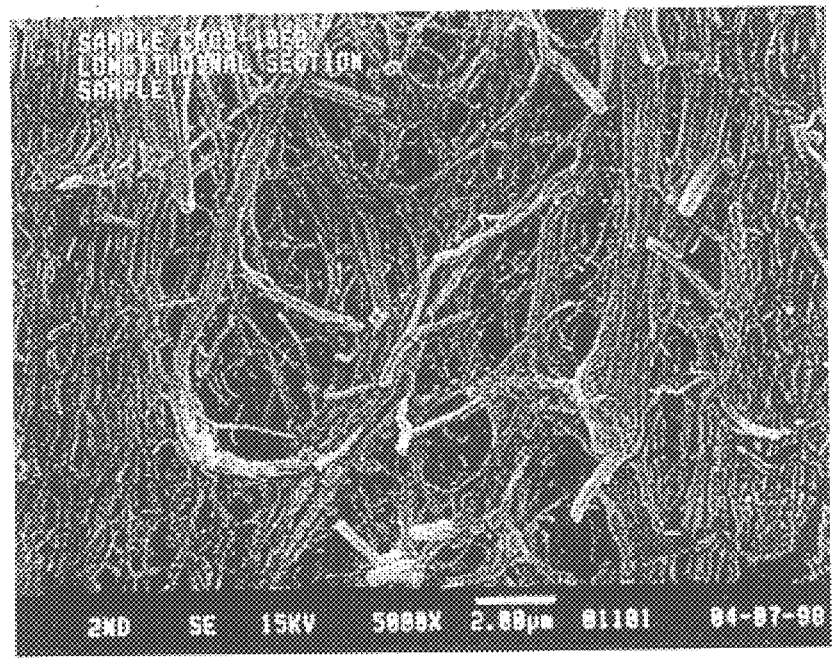
FIG. 29 is a scanning electron micrograph of a longitudinal section through a PTFE-containing composition which was extruded, then extracted with MEK.

Some of this extruded sample was subjected to MEK extraction in a Soxhlet extractor for 20 hours. The sample retained 49% of its initial weight. The sample was prepared for SEM by freeze-fracturing it to expose surfaces from the interior of the sample. SEM photographs at 10,000× magnification clearly showed individual PTFE particles, as well as particles which had extended into fibers (FIG. 29). These fibers were oriented mostly in the machine direction of the extrudate.

Figure 30:
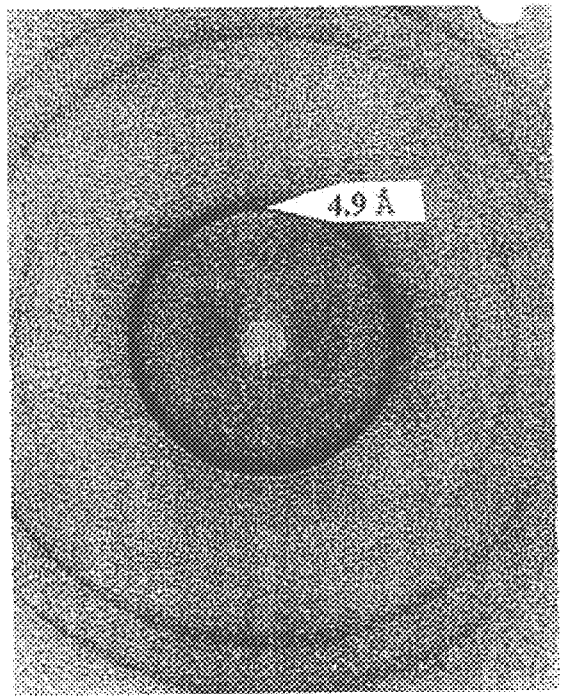
FIG. 30 is a photograph of a WAXS analysis of a PTFE-containing composition shown in FIG. 29.

Wide angle X-ray scattering (WAXS) was performed on the above sample. Based upon the azimuthal dependence of the 4.9 Å reflection, it was determined that there was some orientation of the PTFE in the axial direction of the extrudate (FIG. 30).

A control for the above 50/50 wt. % PTFE/FKM sample was prepared, using a low molecular weight PTFE micropowder (MP1000 micropowder, DuPont). The coagulation vessel used was a Waring blender. A salt solution was charged to the vessel (400 g, 1.14 M NaCl), and the blender set to high power for the duration of the coagulation. MP1000 micropowder was added to the vessel (50 g), followed by a wetting agent, Triton X-100 (1 ml of a 25 wt % solution in water) which allowed the MP1000 micropowder to be dispersed in the salt solution. A fluoroelastomer copolymer (E6582, Dyneon, 158 g, 30.2% solids) was charged to the vessel, producing a coagulated mixture. The coagulate was vacuum-filtered through Whatman 114 filter paper, and was then washed three times with tap water and twice with deionized water, blending and filtering between each step. The material was dried in a vacuum oven at 90° C. for 3 days.

This material was extruded through a 0.03" capillary (L/D=66) at 150° C. using a capillary rheometer at an extrudate speed of 16 ft/min. The extruded bead could not be drawn to greater than 20% elongation without breaking, a marked change from the similar sample containing high molecular weight PTFE.

Figure 31:
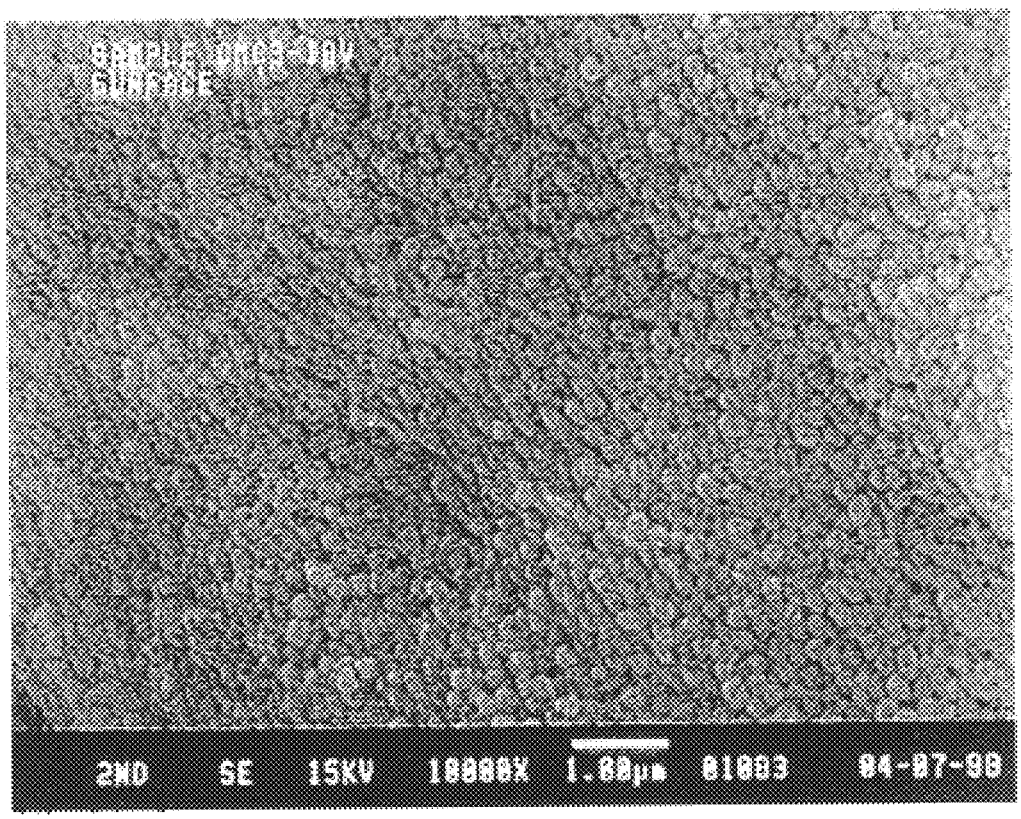
FIG. 31 is a scanning electron micrograph at 10,000× magnification of an extruded low molecular weight PTFE-containing composition which was subjected to MEK extraction.

Some of this extruded sample above was subjected to MEK extraction in a Soxhlet extractor for 20 hours. The sample retained 50% of its initial weight. The sample was prepared for SEM by freeze-fracturing it to expose fresh surfaces from the interior of the sample. SEM photographs at 10,000×magnification clearly showed that the sample was formed of individual PTFE particles, and contained no signs of fibrillation (FIG. 31).

Wide angle X-ray scattering (WAXS) was performed on the above sample. Based upon the azimuthal dependence of the 4.9 Å reflection, it was determined that there was no orientation of the PTFE in the axial direction of the extrudate, an expected result in the case of a blend containing PTFE which will not fibrillate.

EXAMPLE 37

Co-coagulation has been demonstrated which results in material other than crumbs or powders. Co-coagulation can also produce a gelled coagulate, which can be washed, dried, and formed in further processes. In a 400 ml beaker, AD310 dispersion (28.7% solids, 80 g) was combined with E14674 terpolymer dispersion (28.3% solids, 81.5 g) and gently mixed by swirling the combined dispersions in the beaker. A salt solution (140 g of 1 M NaCl) was poured into the beaker with manual agitation. After 30 seconds, the mixture had become a gelled mass, taking the shape of the interior of the beaker. When removed from the beaker, clear NaCl solution ran out from the sample, which then shrank to about 30% of its initial size as it air-dried.

EXAMPLE 38

This example demonstrates a low-shear, non-fibrillating isolation process for PTFE/FKM blends under freezing conditions. A blend of aqueous dispersions of PTFE (AD310, ICI, Bayonne, N.J.) and FKM (E14674 terpolymer, Dyneon) was made (45 g of each on a dry basis) in a plastic vessel, and gently stirred to ensure good mixing. The vessel was placed in a chest freezer at −15° C., and allowed to freeze solid. When removed from the freezer, the frozen mixture was taken out of the vessel and placed on a piece of filter paper at room temperature. As the frozen sample melted, the polymers maintained their position in a sponge-like state, as some of the water drained from the material. The gelled form was dried in an oven at 110° C. for 3 hours. The final weight of the sample was 84 g, and the sample had shrunk upon drying.

This method was repeated for blends of PTFE (AD310) and PCTFE (Aclon 400 series aqueous dispersion, AlliedSignal) following a similar procedure. When thawed, the material was not gel-like, but was a flaky powder, from which clear water ran off. For a sample of PTFE (AD310) and FFKM (PFR94, Ausimont perfluoroelastmer aqueous dispersion, Example 1) a sponge-like material was created, from which clear water could be squeezed out.

This method was repeated using liquid nitrogen instead of the freezer. The combinations used were AD310/E14674 and AD310/PCTFE. The material was showered into the liquid $N_2$, which produced frozen drops of material. When thawed, both combinations of these materials were similar in consistency to the companion samples produced in the −15° C. freezer.

EXAMPLES 39–43

Differential Young's Modulus Examples

40/60 PTFE/FKM (percentage by weight) composites, when pressed in a Carver press at pressures of at least 250 psi, exhibit differential radial modulus (Young's Modulus, referred to as "E" in the tables below) effects when tensile-tested with an Instron. Pancake-shaped samples are produced by the flow of the composite under the pressure, and the shearing and resulting fibrillation of the PTFE induces these effects. Sections from the pancakes cut parallel to a radius will exhibit a modulus as much as ten times those cut perpendicular to a radius (Examples 39, 42, and 43). The data show that the measured modulus increases on material further from the center of the pancake (Examples 39, 40, and 43). These effects have been demonstrated to be independent of the cure state of the elastomer (Examples 40 and 42). A control sample utilizing low molecular weight PTFE shows no increase in modulus along a radius as would be expected from a non-fibrillatable PTFE-containing blend (Example 41).

Tensile samples were cut by finding the center of the pancake, slicing a ½" wide strip which includes that center spot across the entire pancake and cutting two other ½" wide strips, of which the radii include the center point, perpendicular to the first strip. Such cuts form the pattern of a simple cross. These pancakes were typically 15 to 20 cm in diameter and 5 to 10 mils thick; the thickness in the center was as much as 50% more than that measured at the edge.

The following are examples illustrating these effects.

EXAMPLE 39

A 40/60 (percent by weight) composite of T30B PTFE/PFR94 FFKM was prepared by drying an aqueous latex blend of the two, which also included 2 phr succinic acid peroxide as curing agent, 2.5 phr DIAK #7 as coagent, and 2 phr magnesium hydroxide as acid acceptor. The dried rubbery compound was pressed in a Carver press at 140° F. at pressures ranging from 400 to 600 psi, and the resulting pancakes were re-folded into squares and re-pressed under identical conditions twice more, yielding white, homogeneous-looking pancake samples.

One of these pancakes was then pressed at about 825 psi for 45 minutes at 275° C. This pancake was cured, as it could not be refolded and re-flowed again at any temperature without yielding a crumbed mass. The pancake was sampled per the cross pattern, as described above, and tensile pulls were performed on sections near the center of the pancake as well as sections out as near to the rim of the pancake as practicable. The modulus (E) measured near the rim averaged 18,863 psi. The modulus of sections measured near the center averaged 6,605 psi.

The modulus of one section cut perpendicular to a radius, near the pancake rim, was 1,652 psi, about 9% that of the sections parallel to radii.

These trends are typical for composites processed at similar temperatures and pressures. Though the absolute numbers and ratios may vary with differing conditions, the trends persist.

EXAMPLE 40

A 40/60 (by weight percent) T30B PTFE/TFE-propylene copolymer elastomer composite, which is not crosslinkable by conventional elastomer curatives, was formulated in a similar manner to Example 39, with 2.5 phr succinic acid peroxide, 2.5 phr DIAK #7 and 2 phr magnesium hydroxide. A pancake of this composite was compressed at nearly 450 psi at 250° C. for 45 minutes. Sections near the rim averaged modulus of 17,486 psi. Sections tested nearer the center averaged 2,272 psi modulus. This data demonstrates that the effect of increasing modulus from the center is not caused by the ability of the elastomer to cure.

EXAMPLE 41

A 40/60 (percent by weight) MP1000 (low molecular weight PTFE)/TFE-propylene copolymer elastomer composite was formulated in a similar manner to Example 40. Two pancakes of this composite were pressed in a Carver press at 484 and 497 psi at 250° C. for 45 minutes. The first pancake was then subjected to tensile pulls from 18 various locations, from the center to the rim. The second was sampled in 19 locations. The tensile modulus of the first pancake averaged 878 psi, with a standard deviation of only 171 psi. The second yielded statistically identical results—tensile modulus averaging 878 psi with standard deviation of only 164 psi. Not only was this a small fraction of what was achieved with high molecular weight PTFE in Example 40, but also location of the tested sample was immaterial, as evidenced by the tight distribution of data. The results demonstrate that the high molecular weight of the PTFE confers the radial modulus effects and enables the achievement of high modulus when a PTFE/elastomer composite is repeatedly compressed at pressures ≧250 psi.

EXAMPLE 42

A 40/60 (percent by weight) T30B PTFE/TFE-propylene copolymer elastomer composite similar to that described in Example 40 was formed into a pancake and pressed in a Carver press at 200° C. for one hour at 500 psi. Even at these milder temperature and pressure conditions, compared especially to Examples 39 and 40, the composites exhibit a differential radial modulus effect. The five samples tensile-tested which were radially sampled averaged 4,206 psi modulus. The four samples tested which were on sections perpendicular to a radius averaged only 627 psi modulus.

EXAMPLE 43

One differential radial modulus effect, that of sections being parallel to radii exhibiting superior modulus to those perpendicular, can be obliterated by repeatedly reworking the composite below curing temperature or by repeatedly reworking a composite which does not cure. A 40/60 (percent by weight) T30B/PFR94 composite analogous to that described in Example 39 was prepared. The composite pancake was worked by folding it into a square and pressing it at 25000 pounds gauge (~600 psi) at 200° C. for 20 minutes for a given number of iterations, then folding into a square, subjecting to the same pressure, and curing at 250° C. for 45 minutes. Sections were then tensile-tested in the Instron apparatus, sampling both parallel and perpendicular to radii, as well as interior and rim samples. A tabulation of the results can be seen in Table 24, with n=the number of times the composite was pressed at 200° C. and modulus (E) reported in psi.

TABLE 24

| n | E parallel to radii | E perpendicular to radii | E interior sections | E rim sections |
|---|---|---|---|---|
| 1 | 25,045 | 4,202 | 14,950 | 25,045* |
| 2 | 27,740 | 7,799 | 7,681 | 27,740* |
| 3 | 26,945 | 23,446 | 15,538 | 25,305 |
| 5 | 17,042 | 28,538 | 12,432 | 22,700 |
| 7 | 35,590 | 42,208 | 20,749 | 40,979 |

*samples on simple cross only.

As seen in Table 24, as the composite is worked more and more prior to final temperature treatment (or cure), the edge areas greatly increase in modulus in the final cured product, and the modulus then becomes a function only of distance from the center of the composite. This effect was observed to materialize with three iterations. Prior to that, moduli of sections sampled perpendicular to a radius and near the rim were low.

The data show that the percent strain at break is reasonably well correlated (inversely) with the modulus. Thus, the MP1000/elastomer composites, with their moduli under 1000 psi, featured percent strains at break typically around 1300%, while the higher modulus samples usually displayed percent strains at break of 300% or less. This is consistent with the expected reinforcing effect of fibrillated PTFE.

EXAMPLE 44

This example describes the inducement of PTFE fibrillation, including identification of the fibrils via micro-FTIR. A 44/56 (percent by weight) composite of AD310 PTFE/PFR94 was fabricated by coagulating and drying an aqueous latex mixture, including curing agent, coagent, and acid acceptor as disclosed in Example 39. About 45 grams of the pancakes prepared in a similar manner as disclosed in Example 39 were pressed together into one mass at 140° F. for 15 minutes at ~900 psi through three press and refold cycles. The sample was then loaded into a 6"×6" mold, heated to 200° C. at 1100 psi, bumped by releasing the platens, compressed again at 1100 psi for 5 minutes at 200° C., bumped again by releasing the platens, and then compressed at 1225 psi at 200° C. for 30 minutes. The temperature of the press was then increased sequentially to 225° C. for 35 minutes, then 250° C. for 30 minutes.

The resulting flesh-colored pad removed from the mold was well-consolidated, and consisted of two dense plies, between which were discovered fibrils resembling cotton candy. These fibrils were approximately 10 $\mu$m in diameter and visible to the naked eye. Micro-FTIR analysis identified these as pure PTFE, confirming that the formation of fibrils of PTFE had been induced by the pressing described above.

EXAMPLE 45

This example describes the use of photoinitiators to effect crosslinking in the composites. A 40/60 (percent by weight) composite of T30B PTFE/PFR 94 FFKM was prepared by drying an aqueous latex blend which also included 4 phr of a photocuring agent (Darocur 1173; 2-hydroxy-2-methyl-1-phenyl-propan-1-one), a coagent (DIAK #7), and an acid acceptor (magnesium hydroxide). The dried latex was formed into pancakes via the method described in Example 39. These pancakes were exposed to various dosages of ultraviolet radiation using a UV Process Supply irradiation apparatus equipped with a mercury lamp which could be adjusted from 125 to 300 watts/inch power. Dosages ranged from zero up to an estimated 18 joules/cm$^2$.

Cure was proven by attempting to re-fold the pancakes into squares and re-pressing them at 140° F. at 500 psi or more. A cured pancake yielded a crumbed, incoherent mass. It was observed that the higher the total dose of UV radiation a pancake received, the greater its tendency to crumb on subsequent pressing at elevated temperatures.

In contrast, a 40/60 (percent by weight) composition of T30B PTFE/E14734 Dyneon TFE-propylene copolymer with photoinitiators could be re-pressed into coherent pancakes, no matter how high a photodose it received. This copolymer sample is not curable.

Also in contrast, a 40/60 (percent by weight) T30B/PFR 94 composite with no photoinitiator underwent a modulus decline of up to 50% upon similar irradiation and was reflowable with subsequent pressing at elevated temperatures.

What is claimed is:

1. A microfiber-reinforced solid composition produced by a process comprising:
   (i) providing a blended solid composition of polymeric components comprising one or more microparticulate fluoroplastic components having a particle size of 1 $\mu$m or less distributed homogeneously at the microparticulate level throughout the composition in an amount greater than 50% by weight based on total polymer, wherein at least one of said fluoroplastic components is a fibrillatable PTFE polymer having a melt viscosity at 380° C. of greater than 10$^9$ poise, said PTFE polymer in an essentially unfibrillated state; and at least one uncured elastomeric component; and
   (ii) subjecting the blended solid composition to a shear force that induces the PTFE component to fibrillate and create a microfibrous reinforcement within the blended composition.

2. The microfiber-reinforced composition according to claim 1, wherein the shearing process is conducted at a temperature below the melting point of any of the components of the composition.

3. The microfiber-reinforced composition according to claim 1, wherein the shearing process is conducted at a temperature chosen to selectively melt or soften one or more of the components of the composition other than the PTFE.

4. The microfiber-reinforced solid composition according to claim 1, wherein the composition is free of curatives during the process of subjecting the composition to a shear force.

5. The microfiber-reinforced solid composition according to claim 1, wherein the composition contains curatives during the process of subjecting the composition to a shear force.

6. The microfiber-reinforced solid composition according to claim 1, wherein the microfibrous PTFE reinforcement is aligned with and extended parallel to the direction of the applied shear force.

7. A microfiber-reinforced solid composition according to claim 1, wherein the microfibrous PTFE reinforcement is oriented uniaxially in the composition.

8. A microfiber-reinforced solid composition according to claim 1, wherein the microfibrous PTFE reinforcement is oriented multiaxially in the composition.

9. A microfiber-reinforced solid composition comprising a plurality of uniaxially oriented microfibrous PTFE reinforcements according to claim 7 layered as lamallae in varying orientations to create multiaxial reinforced lamellae.

10. A microfiber-reinforced solid composition according to claim 9, wherein the individual lamellae are co-cured during thermal consolidation.

11. A microfiber-reinforced solid composition produced by a process comprising:
   (i) providing a blended solid composition of polymeric components comprising a first microparticulate fluoroplastic component having a particle size of 1 μm or less distributed homogeneously at the microparticulate level throughout the composition in an amount greater than 50% by weight based on total polymer, said component including a fibrillatable PTFE polymer having a melt viscosity at 380° C. of greater than 109 poise and said PTFE in an essentially unfibrillated state; and
   one or more additional microparticulate fluoroplastic components distributed homogeneously at the microparticulate level throughout the composition, each of which has a melting or softening point below the melting point of the fibrillatable PTFE; and
   (ii) subjecting the blended composition to a shear force that induces the PTFE component to fibrillate and create a microfibrous reinforcement within the blended composition,
   wherein the composition contains curatives during the process of subjecting the composition to a shear force.

12. A microfiber-reinforced solid composition produced by a process comprising:
   (i) providing a blended solid composition of polymeric components comprising a first microparticulate fluoroplastic component having a particle size of 1 μm or less distributed homogeneously at the microparticulate level throughout the composition in an amount greater than 50% by weight based on total polymer, said component including a fibrillatable PTFE polymer having a melt viscosity at 380° C. of greater than 109 poise and said PTFE in an essentially unfibrillated state; and
   one or more additional microparticulate fluoroplastic components distributed homogeneously at the microparticulate level throughout the composition, each of which has a melting or softening point below the melting point of the fibrillatable PTFE; and
   (ii) subjecting the blended composition to a shear force that induces the PTFE component to fibrillate and create a microfibrous reinforcement within the blended composition,
   wherein the microfibrous PTFE reinforcement is oriented multiaxially in the composition.

13. A microfiber-reinforced solid composition produced by a process comprising:
   (i) providing a blended solid composition of polymeric components comprising a first microparticulate fluoroplastic component having a particle size of 1 μm or less distributed homogeneously at the microparticulate level throughout the composition in an amount greater than 50% by weight based on total polymer, said component including a fibrillatable PTFE polymer having a melt viscosity at 380° C. of greater than 109 poise and said PTFE in an essentially unfibrillated state; and
   one or more additional microparticulate fluoroplastic components distributed homogeneously at the microparticulate level throughout the composition, each of which has a melting or softening point below the melting point of the fibrillatable PTFE; and
   (ii) subjecting the blended composition to a shear force that induces the PTFE component to fibrillate and create a microfibrous reinforcement within the blended composition,
   wherein the microfibrous PTFE reinforcement is oriented axially in the composition, and the composition comprises a plurality of uniaxially oriented microfibrous PTFE reinforcements layered as lamallae in varying orientations to create multiaxial reinforced lamellae.

14. A microfiber-reinforced solid composition produced by a process comprising:
   (i) providing a blended solid composition of polymeric components comprising a first microparticulate fluoroplastic component having a particle site of 1 μm or less distributed homogeneously at the microparticulate level throughout the composition in an amount greater than 50% by weight based on total polymer, said component including a fibrillatable PTFE polymer having a melt viscosity at 380° C. of greater than 109 poise and said PTFE in an essentially unfibrillated state; and
   one or more additional microparticulate fluoroplastic components distributed homogeneously at the microparticulate level throughout the composition, each of which has a melting or softening point below the melting point of the fibrillatable PTFE; and
   (ii) subjecting the blended composition to a shear force that induces the PTFE component to fibrillate and create a microfibrous reinforcement within the blended composition,
   wherein the microfibrous PTFE reinforcement is oriented axially in the composition, the composition comprises a plurality of uniaxially oriented microfibrous PTFE reinforcements layered as lamallae in varying orientations to create multiaxial reinforced lamellae, and the individual lamellae are co-cured during thermal consolidation.

* * * * *

UNITED STATES PATENT AND TRADEMARK OFFICE
CERTIFICATE OF CORRECTION

PATENT NO.    : 6,417,280 B2
DATED         : July 9, 2002
INVENTOR(S)   : Effenberger et al.

It is certified that error appears in the above-identified patent and that said Letters Patent is hereby corrected as shown below:

Column 45,
Lines 31 and 54, delete "109 poise" and substitute therefor -- $10^9$ poise --.

Column 46,
Lines 16 and 41, delete "109 poise" and substitute therefor -- $10^9$ poise --.

Signed and Sealed this

Fifteenth Day of October, 2002

Attest:

Attesting Officer

JAMES E. ROGAN
Director of the United States Patent and Trademark Office